US012736142B2

(12) United States Patent
Kim et al.

(10) Patent No.: US 12,736,142 B2
(45) Date of Patent: Sep. 15, 2026

(54) BALL VALVE AND VEHICLE THERMAL MANAGEMENT DEVICE COMPRISING SAME

(71) Applicant: HANON SYSTEMS, Daejeon (KR)

(72) Inventors: Seong Hun Kim, Daejeon (KR); Sung Je Lee, Daejeon (KR); Hae Jun Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/874,375

(22) PCT Filed: Jul. 11, 2023

(86) PCT No.: PCT/KR2023/009856

§ 371 (c)(1),
(2) Date: Dec. 12, 2024

(87) PCT Pub. No.: WO2024/034878

PCT Pub. Date: Feb. 15, 2024

(65) Prior Publication Data

US 2025/0377046 A1 Dec. 11, 2025

(30) Foreign Application Priority Data

Aug. 8, 2022 (KR) ........................ 10-2022-0098488

(51) Int. Cl.
*F16K 11/087* (2006.01)
*B60H 1/00* (2006.01)
(Continued)

(52) U.S. Cl.
CPC ...... *F16K 11/0876* (2013.01); *B60H 1/00485* (2013.01); *B60H 1/323* (2013.01);
(Continued)

(58) Field of Classification Search
CPC ............. F16K 11/0876; F16K 11/0873; F16K 27/0245; F16K 5/0689; F16K 5/06;
(Continued)

(56) References Cited

U.S. PATENT DOCUMENTS 12,540,763 B2 * 2/2026 Kim ...................... F25B 43/006
2006/0162792 A1 * 7/2006 Oh ...................... F16K 11/0873 137/625.41

(Continued)

FOREIGN PATENT DOCUMENTS

| | | |
|---|---|---|
| DE | 11 2021 003 804 T5 | 5/2023 |
| DE | 11 2023 000 693 T5 | 11/2024 |
| KR | 10-2016-0074674 A | 6/2016 |
| KR | 10-2021-0109872 A | 9/2021 |
| KR | 10-2021-0126361 A | 10/2021 |
| WO | 2017138107 A1 | 8/2017 |

OTHER PUBLICATIONS

Dr. Enk, "Office Action for DE Application No. 112023002516.9", Dec. 16, 2025, DPMA, Germany.

*Primary Examiner* — Minh Q Le
(74) *Attorney, Agent, or Firm* — Bridgeway IP Law Group, PLLC; Jihun Kim

(57) ABSTRACT

An embodiment discloses a ball valve and a vehicle thermal management device including the same, in which the ball valve controls a movement of a refrigerant moving along the inside thereof or selectively expands the moving refrigerant by controlling a rotational position of a ball by using a ball having grooves and an actuator configured to control a rotation of the ball. Accordingly, the vehicle thermal management device may be implemented in a compact size while improving cooling/heating performance.

19 Claims, 40 Drawing Sheets

(51) Int. Cl.
*B60H 1/32* (2006.01)
*F16K 27/02* (2006.01)
*F16K 5/06* (2006.01)

(52) U.S. Cl.
CPC ...... *F16K 27/0245* (2013.01); *B60H 1/00899* (2013.01); *B60H 1/3228* (2019.05); *B60H 1/3229* (2013.01); *B60H 2001/3298* (2013.01); *B60Y 2200/91* (2013.01); *F16K 5/06* (2013.01); *F16K 5/0689* (2013.01); *F16K 11/0873* (2013.01)

(58) Field of Classification Search
CPC .............. F16K 27/003; B60H 1/00485; B60H 1/323; B60H 1/00899; B60H 1/3228; B60H 1/3229; B60H 2001/3298; B60Y 2200/91
USPC ...................................................... 137/625.46
See application file for complete search history.

(56) References Cited

U.S. PATENT DOCUMENTS

2018/0209548 A1* 7/2018 Zens ..................... F16K 5/0605
2020/0039323 A1 2/2020 He et al.
2020/0132204 A1* 4/2020 Krost .................... F16K 11/056
2021/0254728 A1* 8/2021 Le ......................... F16K 5/0642
2023/0073993 A1* 3/2023 Kim ........................ F25B 41/24
2023/0194136 A1* 6/2023 Kim ........................ F25B 45/00 62/324.4
2023/0271477 A1* 8/2023 Kim ................... B60H 1/00485 62/504
2024/0140162 A1* 5/2024 Tiemeyer ................ F25B 41/42
2024/0190209 A1* 6/2024 Kim ..................... B60H 1/3228
2025/0083492 A1* 3/2025 Deme ................. F16K 11/0876
2025/0155043 A1* 5/2025 Woo .................... F16K 11/0876
2025/0271065 A1* 8/2025 Hirt ..................... F16K 11/0876
2026/0009568 A1* 1/2026 Kim ........................ F25B 30/02
2026/0016207 A1* 1/2026 Kim ................... B60H 1/00921

* cited by examiner

BALL VALVE AND VEHICLE THERMAL MANAGEMENT DEVICE COMPRISING SAME

TECHNICAL FIELD

An embodiment relates to a ball valve and a vehicle thermal management device including the same. Specifically, an embodiment relates to a ball valve, which includes two grooves disposed in a ball to expand a refrigerant provided as a heat exchange medium, and a vehicle thermal management device including the same.

BACKGROUND ART

Vehicles are provided with an air conditioner for controlling interior air temperature. The air conditioner keeps a vehicle interior warm by generating warm air or keeps the vehicle interior cool by generating cold air. Here, a vehicle air conditioner may include a compressor, a condenser, an expansion valve, an evaporator, pipes connecting them, etc. to circulate refrigerant that is a heat exchange medium.

Most of the vehicles provided with such an air conditioner use an internal combustion engine driven using fossil fuels such as gasoline and diesel as an energy source. Therefore, there is a need for new energy sources due to various causes such as environmental pollution problems and decrease in oil reserves. Therefore, eco-friendly vehicles such as electric vehicles and fuel cell vehicles are emerging.

In the case of a vehicle using the internal combustion engine (hereinafter referred to as an “internal combustion engine vehicle”), a vehicle interior may be heated using cooling water cooling the internal combustion engine. For example, the internal combustion engine vehicle may be provided with a heating system using cooling water to heat the vehicle interior using heat absorbed from the internal combustion engine to heat the vehicle interior.

However, since vehicles using fuel cells, etc. do not use an internal combustion engine, there is a problem that a heating system that uses the internal combustion engine of the vehicle as a heat source cannot be used.

Therefore, the vehicles using fuel cells, etc. add a heat pump to an air conditioner and use the heat pump as a heat source, or are provided with a separate heat source such as an electric heater to heat a vehicle interior. Here, the heat pump may be a device for absorbing low-temperature heat and then transferring the absorbed heat to a high temperature. As an example, a heat pump has a cycle in which liquid refrigerant evaporates in an evaporator, takes heat from the surroundings to become a gas, and then liquefies while re-discharging heat to the surroundings by a condenser. When the heat pump is applied to electric vehicles or hybrid electric vehicles, there is an advantage in that it is possible to secure a heat source that is lack in conventional general air conditioners.

In a heat pump system in which such a heat pump is disposed, a vapor injection system may be used to improve cooling and heating performance. Here, the vapor injection system has a structure in which a refrigerant circulation system for cooling and heating allows gaseous refrigerant to re-flow into a compressor using a gas-liquid separator and supplies liquid refrigerant to an evaporator or a chiller.

Because a heat pump system in the related art uses a two-way expansion valve, a desired amount of refrigerant cannot flow, which causes a problem with dehumidification performance caused by a lack of refrigerant.

In case that a plurality of two-way expansion valves is used to solve the above-mentioned problem, there is a limitation in implementing a vehicle thermal management device with a compact size.

DISCLOSURE

Technical Problem

The embodiment provides a ball valve, which improves performance according to an air conditioning mode by controlling a position a ball having grooves, and a vehicle thermal management device including the same.

The embodiment provides a vehicle thermal management device that uses only a single gas-liquid separator and uses a three-way type valve, thereby excluding a check valve disposed at a gas outlet side of a gas-liquid separator in the related art.

The embodiment provides a vehicle thermal management device with a compact size by a modularized vapor injection module using a ball valve.

The embodiment provides a vehicle thermal management device that provides an optimized arrangement structure for respective components of a vapor injection module.

The embodiment provides a vehicle thermal management device that implements a bidirectional expansion mode by using a ball valve capable of expanding bidirectionally.

Objectives to be solved by embodiments are not limited to the objectives described above, and objectives which are not described above will be clearly understood by those skilled in the art from the following descriptions.

Technical Solution

The above-mentioned objects are achieved by a ball valve including: a housing including a first housing hole, a second housing hole, and a third housing hole disposed to communicate with one another; a ball rotatably disposed in the housing; and an actuator configured to rotate the ball, in which the ball includes: a ball body having a spherical shape; first and second holes disposed in the ball body and configured to communicate with each other; and two grooves formed to have a predetermined length in a circumferential direction of the ball body so as to be connected to the first hole, in which the second hole is disposed to correspond to the third housing hole, and in which the grooves of the ball communicate with the first housing hole or the second housing hole in accordance with a position of the ball.

In particular, the grooves of the ball may be positioned, by the actuator, at positions that do not communicate with the first housing hole and the second housing hole.

In particular, by the actuator, an end of one of the two grooves may be disposed to communicate with the first housing hole, and an end of the other of the two grooves may be disposed to communicate with the second housing hole.

The above-mentioned objects are achieved by a ball valve including: a housing including a first housing hole, a second housing hole, and a third housing hole disposed to communicate with one another; a ball rotatably disposed in the housing; and an actuator configured to rotate the ball, in which the ball includes: a ball body having a spherical shape; first and second holes disposed in the ball body and configured to communicate with each other; and two grooves formed to have a predetermined length in a circumferential direction of the ball body so as to be connected to the first hole, in which a diameter of the first hole, a diameter of the first housing hole, and a diameter of the second housing hole are larger than a width of the groove, in which the second hole is disposed to correspond to the third housing hole, and in which the grooves of the ball are positioned, by the actuator, at positions that do not communicate with the first housing hole and the second housing hole.

The above-mentioned objects are achieved by a ball valve including: a housing including a first housing hole, a second housing hole, and a third housing hole disposed to communicate with one another; a ball rotatably disposed in the housing; and an actuator configured to rotate the ball, in which the ball includes: a ball body having a spherical shape; first and second holes disposed in the ball body and configured to communicate with each other; and two grooves formed to have a predetermined length in a circumferential direction of the ball body so as to be connected to the first hole, in which a diameter of the first hole, a diameter of the first housing hole, and a diameter of the second housing hole are larger than a width of the groove, in which the second hole is disposed to correspond to the third housing hole, and in which by the actuator, an end of one of the two grooves is disposed to communicate with the first housing hole, and an end of the other of the two grooves is disposed to communicate with the second housing hole.

In particular, the first housing hole and the second housing hole may be disposed to face each other, and the ball may be configured to rotate about a rotation center within a range of 180 degrees.

In particular, the ball valve may include: a ring-shaped first sealing part disposed in the first housing hole while corresponding to the ball; and a ring-shaped second sealing part disposed in the second housing hole while corresponding to the ball.

In particular, an inner diameter of the first sealing part and an inner diameter of the second sealing part may be equal to a diameter of the first hole.

In particular, the ball valve may include: a support means configured to prevent separation of the first sealing part, in which the support means is detachably coupled in the first housing hole.

Meanwhile, a connection portion of the actuator may be disposed to overlap the second hole in an axial direction.

In particular, the first hole and the second hole may be disposed to be perpendicular to each other.

In addition, a flow rate of a refrigerant moving through the groove may be controlled in accordance with a rotational position of the ball at which an end of one of the grooves communicates with the first housing hole or the second housing hole.

In addition, a diameter of the first hole may be equal to a diameter of the second hole.

In addition, a diameter of the first hole may be smaller than a diameter of the second hole.

In addition, a depth of the groove may decrease toward an end side thereof.

The above-mentioned objects are achieved by a ball valve including: a housing including a first housing hole, a second housing hole, and a third housing hole disposed to communicate with one another; a ball rotatably disposed in the housing; a ring-shaped first sealing part disposed in the first housing hole while facing the ball; a ring-shaped second sealing part disposed in the second housing hole while facing the ball; and a support means configured to support the first sealing part, in which a diameter of the first housing hole is larger than a diameter of the second housing hole, in which the second sealing part, the ball, the first sealing part, and the support means are sequentially disposed in the housing through the first housing hole, and in which the support means is detachably coupled to the housing.

The above-mentioned objects are achieved by a vehicle thermal management device including: a compressor configured to compress and circulate a refrigerant; a first heat exchanger in which the compressed refrigerant is introduced and exchanges heat with another heat exchange medium; a second heat exchanger configured to exchange heat with air present outside an occupant compartment; a third heat exchanger mounted in an air conditioning device and configured to exchange heat with air discharged into the occupant compartment; and a vapor injection module configured to introduce a gaseous refrigerant into the compressor, in which the vapor injection module includes a first expansion means group, a second expansion means group, and one gas-liquid separator, in which a first expansion means of the first expansion means group and a third expansion means of the second expansion means group each include: a housing including a first housing hole, a second housing hole, and a third housing hole disposed to communicate with one another; a ball rotatably disposed in the housing; an actuator configured to rotate the ball; a ring-shaped first sealing part disposed in the first housing hole while facing the ball; and a ring-shaped second sealing part disposed in the second housing hole while facing the ball, in which the ball includes: a ball body having a spherical shape; first and second holes disposed in the ball body and configured to communicate with each other; and first and second grooves formed to have a predetermined length in a circumferential direction of the ball body so as to be connected to the first hole, and in which based on a rotation center, a first included angle defined between the two first and second grooves is smaller than a second included angle defined between one point disposed on an inner diameter of the first sealing part and one point disposed on an inner diameter of the second sealing part so as to be adjacent, in the circumferential direction, to the point disposed on the inner diameter of the first sealing part.

In particular, the refrigerant having passed through the second heat exchanger may be introduced into the first expansion means group in a cooling mode, and the refrigerant having passed through the first heat exchanger may be introduced into the second expansion means group in a heating mode.

In particular, the first expansion means group may include: the first expansion means; a second expansion means; and a third flow path configured to connect an outlet of the first heat exchanger to the first expansion means and the second expansion means, and the second expansion means group may include: the third expansion means; a fourth expansion means; and a fourth flow path configured to connect an outlet of the second heat exchanger to the third expansion means and the fourth expansion means through a third branching part.

In particular, the first expansion means and the third expansion means may be connected in parallel to a liquid outlet of the gas-liquid separator, the second expansion means and the fourth expansion means may be connected in parallel to an inlet of the gas-liquid separator, and a gas outlet of the gas-liquid separator may be connected to the compressor.

In particular, the vehicle thermal management device may include: a first line configured to connect the compressor, the first heat exchanger, the vapor injection module, the third heat exchanger, and an accumulator; a second line configured to connect the vapor injection module and the second heat exchanger; a third line configured to connect the vapor injection module and the compressor; a fourth line having one side connected to the first line between the third heat exchanger and the accumulator, and the other side connected to the second line between the second heat exchanger and the vapor injection module; and a chiller and a fifth expansion means disposed on the fourth line, in which the refrigerant moving along the fourth line and a coolant moving along a fifth line exchange heat with each other in the chiller.

Meanwhile, in a cooling/dehumidification mode of the vehicle thermal management device, the refrigerant having passed through the first heat exchanger may be introduced into the gas-liquid separator through the first expansion means, the second heat exchanger, and the fourth expansion means, the gaseous refrigerant separated by the gas-liquid separator may move to the compressor, the liquid refrigerant separated by the gas-liquid separator may be moved to the third heat exchanger by the third expansion means, the ball of the first expansion means may rotate to a position at which the first housing hole and the first hole face and communicate with each other, and the ball of the third expansion means may rotate to a position at which the second housing hole and the second groove partially face and communicate with each other.

In the cooling mode of the vehicle thermal management device, the ball of the first expansion means may rotate to a position at which the first housing hole and the first hole face and communicate with each other, and the ball of the third expansion means may rotate to a position at which the first housing hole and the first hole face and communicate with each other, such that the refrigerant having passed through the first heat exchanger bypasses the gas-liquid separator and is introduced into the third heat exchanger.

In a heating/dehumidification mode of the vehicle thermal management device, the ball of the first expansion means may rotate to a position at which the second housing hole and the second groove partially face and communicate with each other, the ball of the third expansion means may rotate so that both the first groove and the second groove are disposed in the second included angle, the refrigerant having passed through the first heat exchanger may be expanded by the second expansion means and then introduced into the gas-liquid separator, the gaseous refrigerant separated by the gas-liquid separator may move to the compressor, and the liquid refrigerant separated by the gas-liquid separator may be expanded by the first expansion means, passes through the second heat exchanger, and then moves to the compressor.

In addition, in the heating mode of the vehicle thermal management device, the ball of the first expansion means may rotate to a position at which the first housing hole and the first hole face and communicate with each other, the ball of the third expansion means may rotate so that both the first groove and the second groove are disposed in the second included angle, and the refrigerant having passed through the first heat exchanger may bypass the gas-liquid separator and be introduced into the accumulator through the second heat exchanger and the chiller.

In addition, in a dehumidification mode of the vehicle thermal management device, the ball of the first expansion means and the ball of the third expansion means may rotate to a position at which the second housing hole and the second groove partially face and communicate with each other, the refrigerant having passed through the first heat exchanger may be expanded by the second expansion means and introduced into the gas-liquid separator, the gaseous refrigerant separated by the gas-liquid separator may move to the compressor, the liquid refrigerant separated by the gas-liquid separator may branch to the first expansion means and the third expansion means, the refrigerant introduced into the first expansion means and expanded may pass through the second heat exchanger and be introduced into the compressor, and the refrigerant introduced into the third expansion means and expanded may pass through the third heat exchanger and be introduced into the compressor.

The above-mentioned objects are achieved by a vehicle thermal management device including: a compressor configured to compress and circulate a refrigerant; a first heat exchanger in which the compressed refrigerant is introduced and exchanges heat with another heat exchange medium; a second heat exchanger configured to exchange heat with air present outside an occupant compartment; a chiller; and a ball valve configured to move a refrigerant, which passes through the first heat exchanger, to at least any one of the second heat exchanger and the chiller, in which the ball valve includes: a housing including a first housing hole, a second housing hole, and a third housing hole disposed to communicate with one another; a ball rotatably disposed in the housing; an actuator configured to rotate the ball; a ring-shaped first sealing part disposed in the first housing hole while facing the ball; and a ring-shaped second sealing part disposed in the second housing hole while facing the ball, in which the ball includes: a ball body having a spherical shape; first and second holes disposed in the ball body and configured to communicate with each other; and first and second grooves formed to have a predetermined length in a circumferential direction of the ball body so as to be connected to the first hole, and in which based on a rotation center, a first included angle defined between the two first and second grooves is larger than a second included angle defined between one point disposed on an inner diameter of the first sealing part and one point disposed on an inner diameter of the second sealing part so as to be adjacent, in the circumferential direction, to the point disposed on the inner diameter of the first sealing part.

In addition, in an outdoor unit heat absorption mode of the vehicle thermal management device, the ball may rotate to a position at which the first housing hole and the first groove partially face and communicate with each other, and the refrigerant having passed through the first heat exchanger may bypass the chiller, be expanded in the ball valve, and then introduced into the second heat exchanger.

In addition, in a waste heat absorption mode of the vehicle thermal management device, the ball may rotate to a position at which the second housing hole and the second groove partially face and communicate with each other, the refrigerant having passed through the first heat exchanger may bypass the second heat exchanger, be expanded in the ball valve, and then introduced into the chiller, and the refrigerant and a coolant moving along a fifth line may exchange heat with each other in the chiller.

In addition, in a parallel heat absorption mode of the vehicle thermal management device, the ball may rotate to a position at which the first housing hole and the first groove partially communicate with each other and the second housing hole and the second groove partially communicate with each other, the refrigerant having passed through the first heat exchanger may implement bidirectional expansion in the ball valve and then be introduced into the second heat exchanger and the chiller, and the refrigerant and a coolant moving along a fifth line may exchange heat with each other in the chiller.

Advantageous Effects

According to the embodiment, the rotational position of the ball is controlled by using the ball having the groove and the actuator configured to control the rotation of the ball, such that the movement of the refrigerant moving along the inside of the ball valve may be controlled, or the moving refrigerant may be selectively expanded.

According to the embodiment, the vehicle thermal management device, to which the ball valve is applied, may be implemented, such that the refrigerant may be selectively expanded or the movement of the refrigerant may be controlled in accordance with the air conditioning mode.

Therefore, according to the embodiment, the refrigerant is selectively expanded or the movement of the refrigerant is controlled in accordance with the air conditioning mode of the vehicle thermal management device, such that the air conditioning performance may be improved.

In addition, it is possible to implement the vehicle thermal management device with a compact size by using the ball valve by improving a size of the thermal management device that uses a plurality of two-way valves. In this case, according to the embodiment, one of the heat exchange medium having passed through the internal heat exchanger and the heat exchange medium having passed through the external heat exchanger is selectively supplied to the single gas-liquid separator, such that a check valve, which has been disposed at a gas outlet side of a gas-liquid separator in the related art, is eliminated, which may improve the air conditioning performance and implement a more compact vehicle thermal management device.

According to the embodiment, with the vapor injection module that uses in common only the single gas-liquid separator connected to the plurality of expansion means, a compact size of the vehicle thermal management device may be implemented, which may improve the degree of design freedom of the vehicle thermal management device.

According to the embodiment, it is possible to efficiently manage the maintenance and repairing by means of the vapor injection module modularized for each component.

According to the embodiment, in the heating or dehumidification mode, heat (hereinafter, referred to as 'waste heat'), which is generated from the battery and discarded, may be used to improve the thermal management efficiency.

According to the embodiment, the rotational position of the ball is controlled by using the ball having the groove and the actuator configured to control the rotation of the ball, such that the bidirectional expansion of the refrigerant moving along the inside of the ball valve may be implemented. Therefore, it is possible to improve the thermal management efficiency by using waste heat, which is generated from the battery, by means of the ball valve capable of implementing the bidirectional expansion.

Various useful advantages and effects of the embodiments are not limited to the above-described contents and will be more easily understood from descriptions of the specific embodiments.

MODE FOR INVENTION

Figure 1:
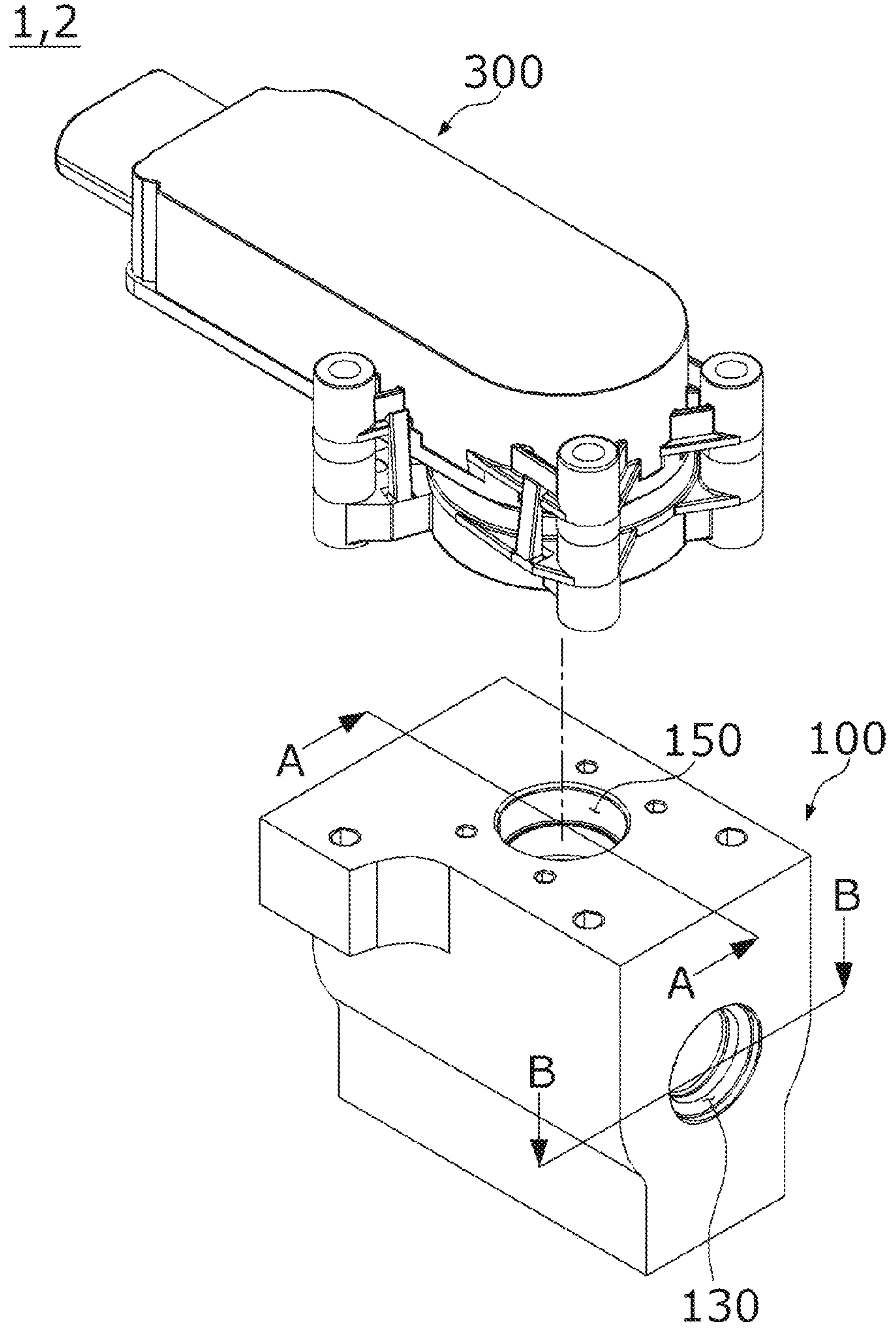
FIG. 1 is a view illustrating a ball valve according to an embodiment.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when embodiments are described in detail with reference to the accompanying drawings, components that are the same or correspond to each other will be denoted by the same or corresponding reference numerals in all drawings, and redundant descriptions will be omitted.

The drawings of the present invention clearly illustrate only main features for conceptually and clearly understanding the present invention. As a result, various modifications of the drawings are expected, and the scope of the present invention need not be limited to particular shapes illustrated in the drawings.

A vehicle may be provided with an air conditioner for controlling air temperature, humidity, cleanliness, ventilation, etc. and may create a comfortable environment in a vehicle interior using the air conditioner. Here, the air conditioner may be referred to as heating/ventilation/air conditioning (HVAC).

Further, the air conditioning device may include an expansion means configured to expand a refrigerant provided as a heat exchange medium. For example, a three-way valve may be used as the expansion means.

Therefore, a thermal management device according to an embodiment, which is disposed in a vehicle, may implement a more compact vehicle thermal management device capable of improving air conditioning performance by using a ball valve according to the embodiment that controls a movement of a refrigerant by rotating a ball or expands a refrigerant moving along a groove. In this case, the ball valve may be a three-way valve.

The components of the ball valve according to the embodiment, except for the ball, are configured to be used in common, which may improve productivity. Further, it is possible to block a flow of the refrigerant, which is the heat exchange medium, or implement a bidirectional expansion mode in the thermal management device, to which the ball valve is applied, only by replacing the ball.

Specifically, the components, except for the ball, are configured to be used in common by improving a structure provided to selectively replace only the ball, which may improve productivity of the ball valve according to the embodiment.

Further, the ball valve according to the embodiment may be applied to various thermal management systems only by replacing the ball, which may improve versatility of the ball valve according to the embodiment.

Hereinafter, an embodiment of the ball valve based on a shape of the ball will be described, and an operation of controlling the thermal management device to which the ball valve is applied will be described.

First Embodiment

Figure 2:
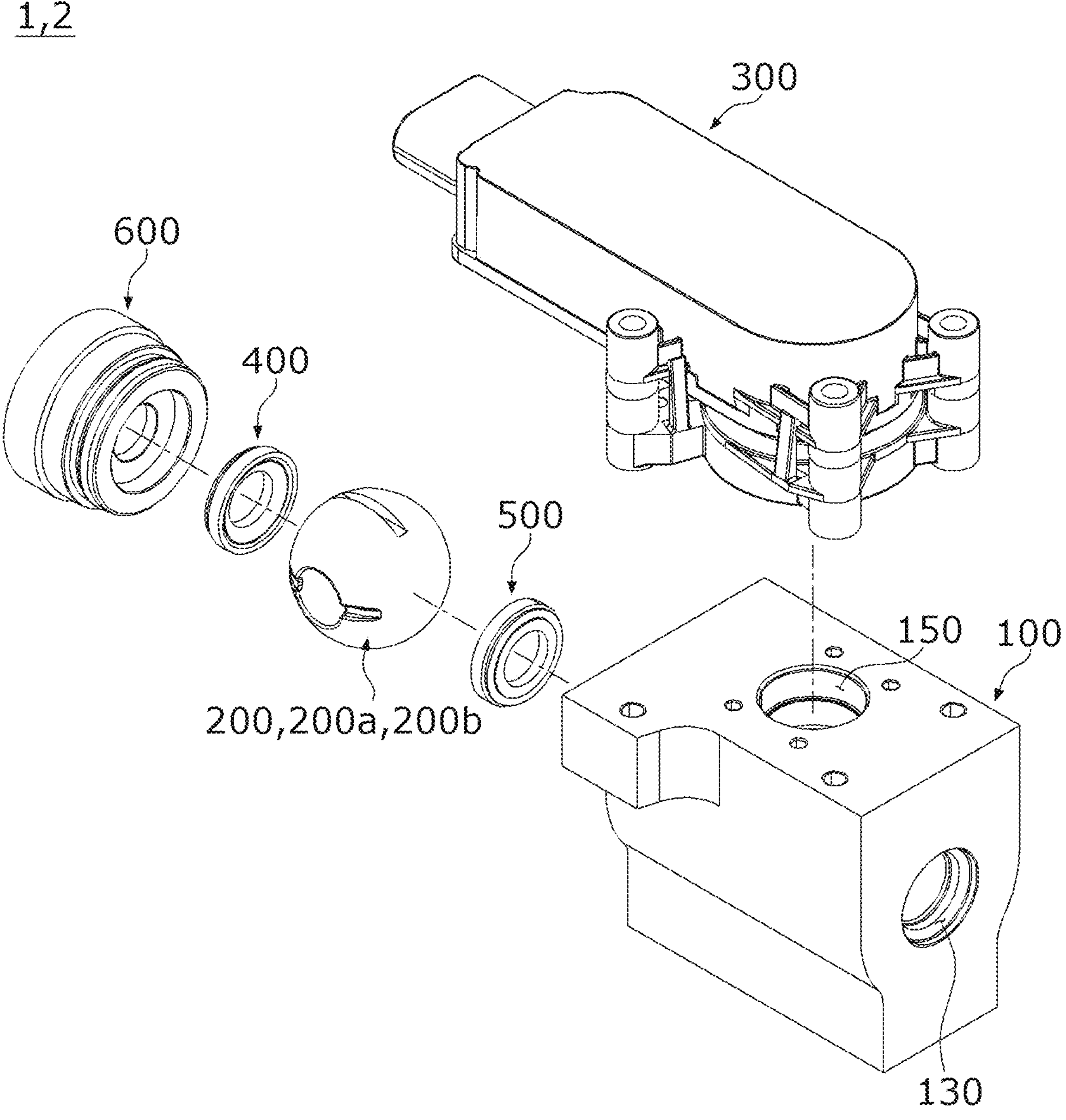
FIG. 2 is an exploded perspective view illustrating the ball valve according to the embodiment.
Figure 3:
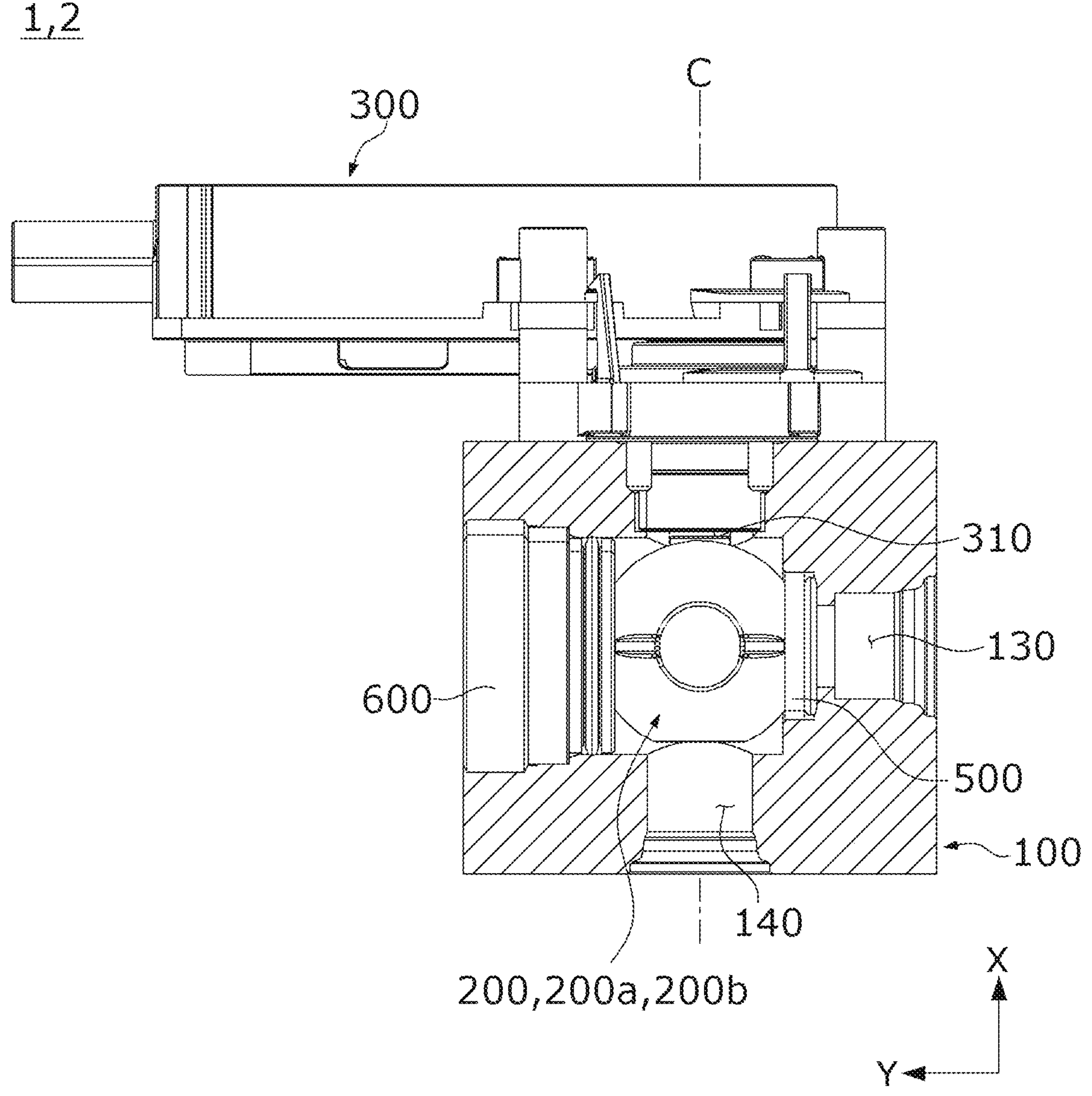
FIG. 3 is a view illustrating an arrangement relationship between a ball, a sealing part, and a support means disposed in a housing of the ball valve according to the embodiment.
Figure 4:
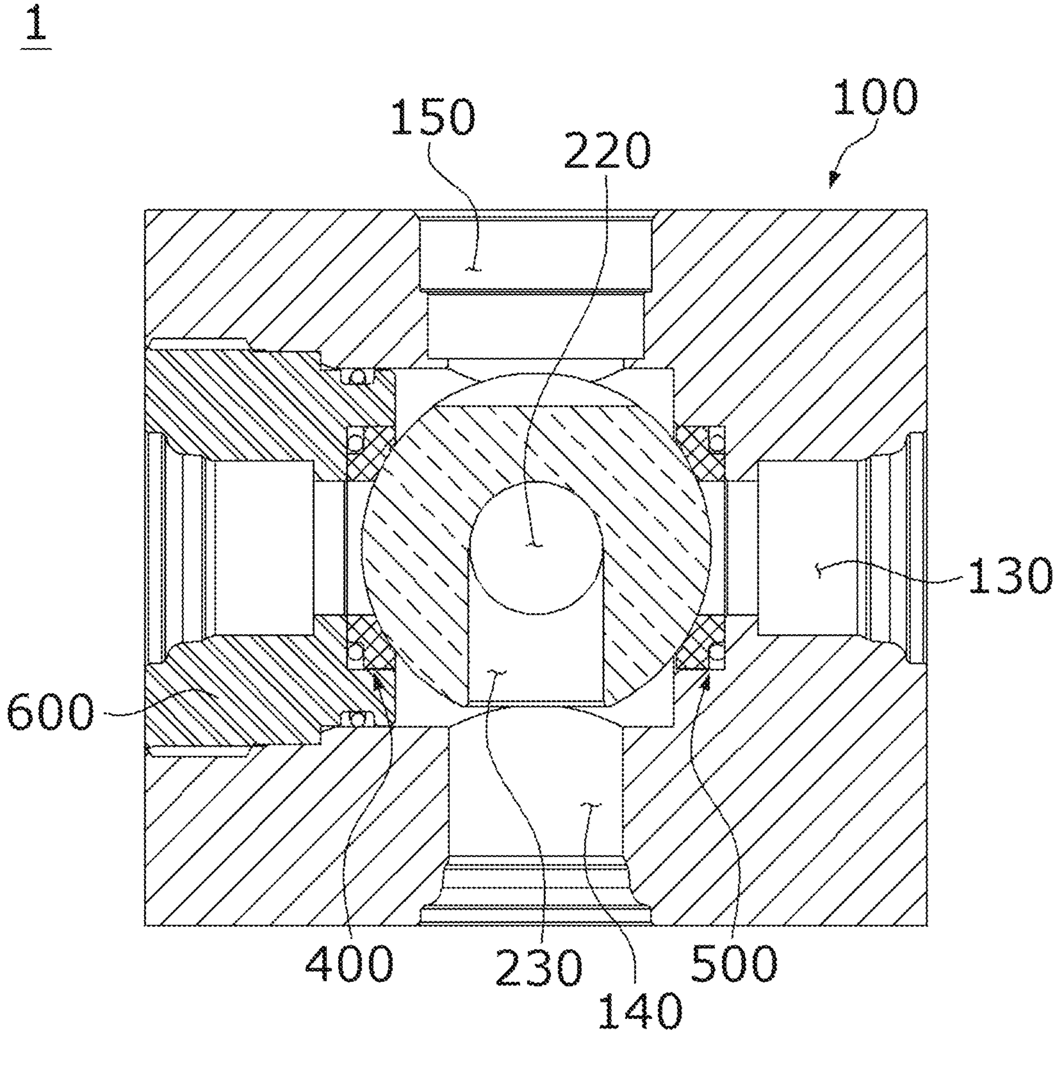
FIG. 4 is a cross-sectional view illustrating a ball valve of a first embodiment taken along line A-A in FIG. 1.
Figure 5:
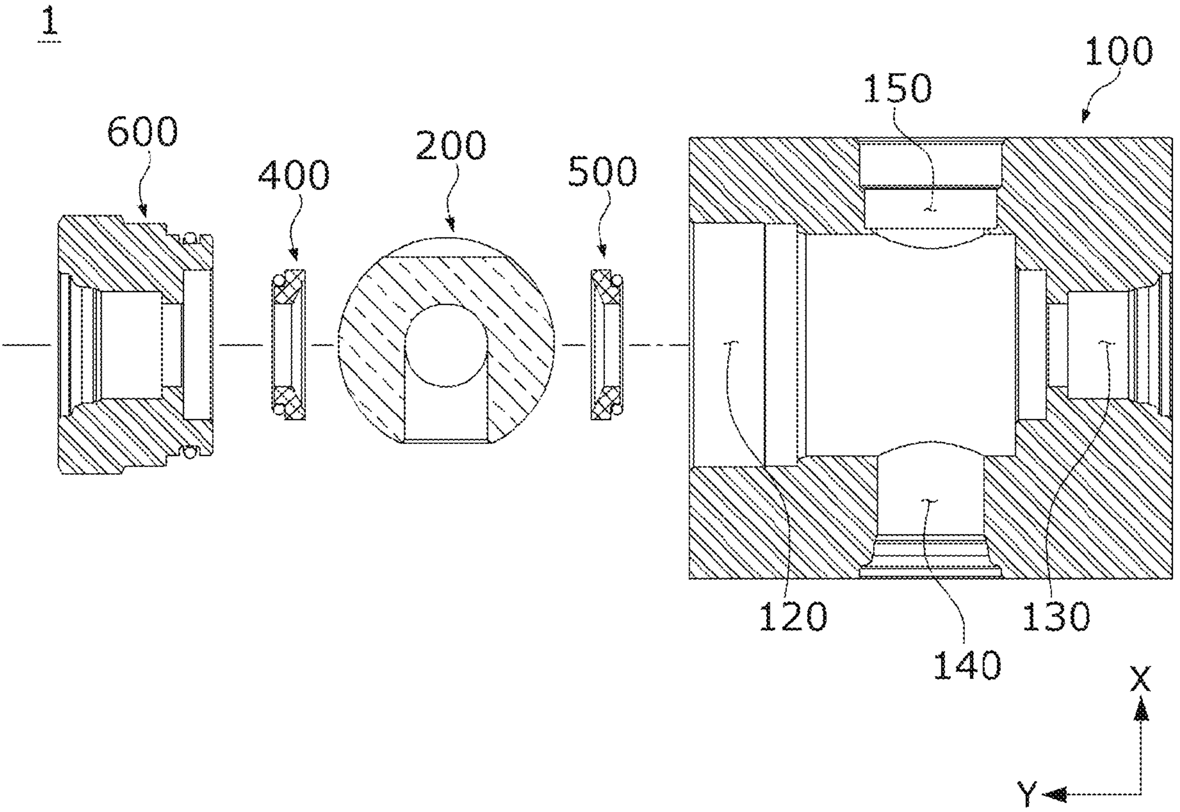
FIG. 5 is an exploded cross-sectional view illustrating an arrangement relationship between a ball, a sealing part, and a support means disposed in a housing of the ball valve according to the first embodiment.
Figure 6:
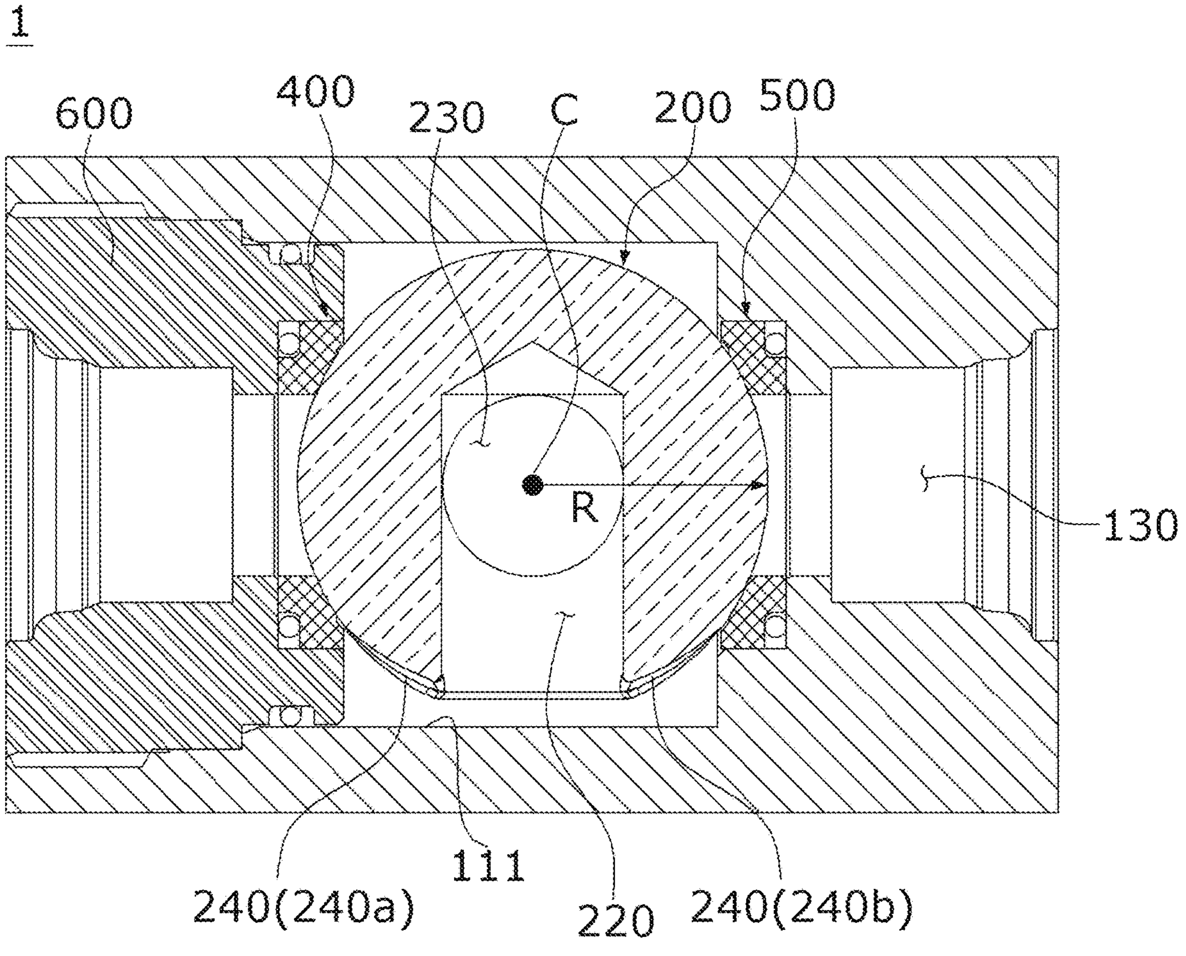
FIG. 6 is a cross-sectional view illustrating the ball valve of the first embodiment taken along line B-B in FIG. 1.

FIG. 1 is a view illustrating a ball valve according to an embodiment, FIG. 2 is an exploded perspective view illustrating the ball valve according to the embodiment, FIG. 3 is a view illustrating an arrangement relationship between a ball, a sealing part, and a support means disposed in a housing of the ball valve according to the embodiment, FIG. 4 is a cross-sectional view illustrating a ball valve of a first embodiment taken along line A-A in FIG. 1, FIG. 5 is an exploded cross-sectional view illustrating an arrangement relationship between a ball, a sealing part, and a support means disposed in a housing of the ball valve according to the first embodiment, and FIG. 6 is a cross-sectional view illustrating the ball valve of the first embodiment taken along line B-B in FIG. 1.

In this case, an X direction illustrated in FIG. 3 may refer to an axial direction, and a Y direction may refer to a radial direction. Further, the axial direction and the radial direction may be perpendicular to each other. Further, reference numeral 'C' illustrated in FIG. 3 may refer to an axial center (rotation center) disposed in the X direction. Further, a direction defined along an imaginary circle having a radius in the radial direction based on an axial center may be referred to as a circumferential direction or a rotation direction.

In a ball valve 1 according to a first embodiment, a groove 240 having a predetermined length may be formed in a ball 200 to block a movement of a refrigerant. In this case, a range in which the groove 240 is formed is limited, such that the ball 200 of the ball valve 1 according to the first embodiment may be rotated by an actuator 300 to a position at which the ball valve 1 blocks the movement of the refrigerant.

With reference to FIGS. 1 to 6, the ball valve 1 according to the first embodiment may include a housing 100, the ball 200 rotatably disposed in the housing 100, and the actuator 300 configured to rotate the ball 200. In this case, the ball valve 1 may be a three-way valve.

In addition, the ball valve 1 according to the first embodiment may include a ring-shaped first sealing part 400 disposed in a first housing hole 120 of the housing 100 so as to correspond to a hole of the ball 200, and a ring-shaped second sealing part 500 disposed in a second housing hole 130 so as to correspond to the ball 200.

In addition, the ball valve 1 according to the first embodiment may include a support means 600 configured to prevent the separation of the first sealing part 400. In this case, because the support means 600 is detachably disposed in the housing 100, the ball 200 may be easily replaced.

Figure 7:
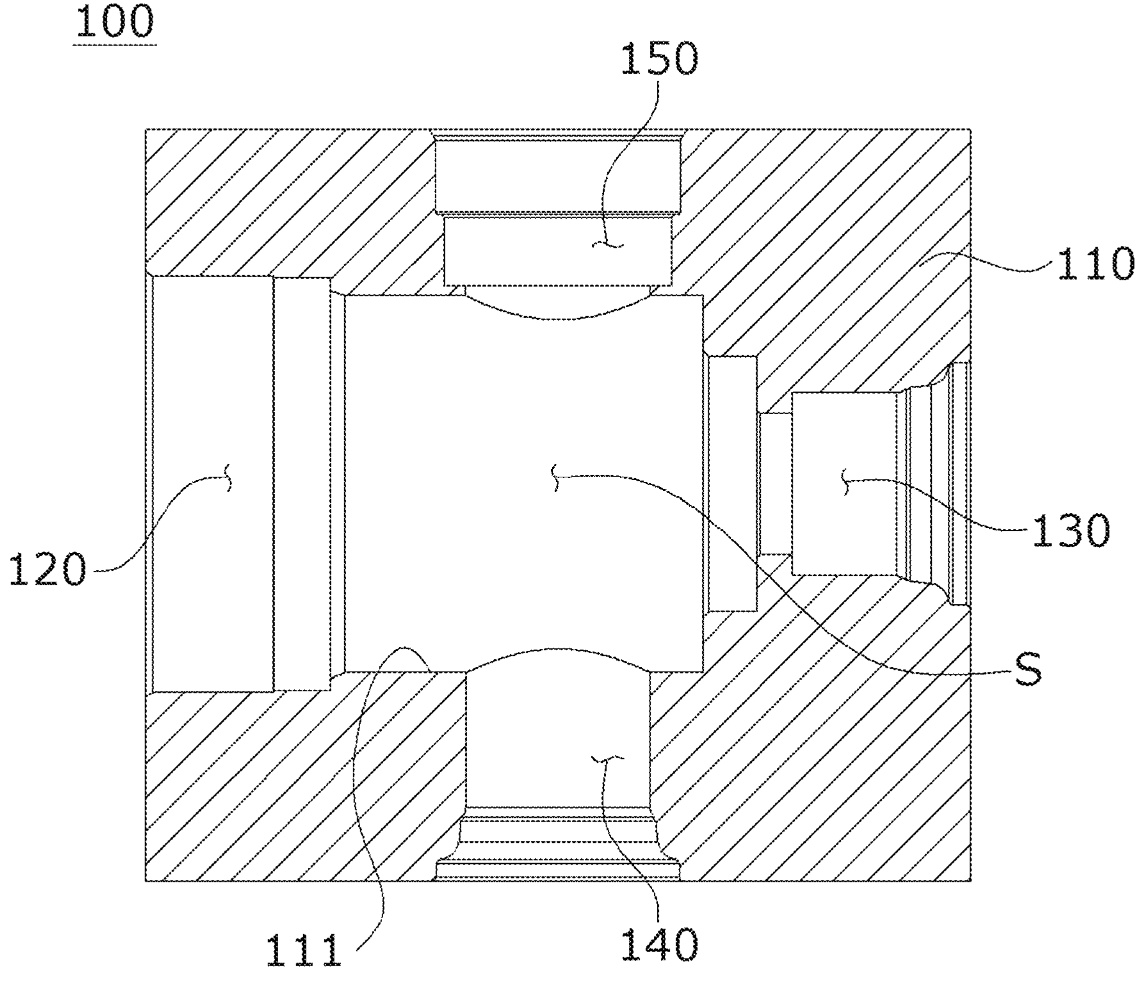
FIG. 7 is a cross-sectional view illustrating the housing of the ball valve according to the embodiment.

FIG. 7 is a cross-sectional view illustrating the housing of the ball valve according to the embodiment. In this case, the cross-sectional view of FIG. 7 may be a vertical cross-sectional view taken along line A-A in FIG. 1.

With reference to FIG. 7, the housing 100 may include a housing body 110, and the first housing hole 120, the second housing hole 130, and a third housing hole 140 formed in the housing body 110 and configured to communicate with one another.

Further, the housing 100 may include a space S formed at an intersection point between the first housing hole 120, the second housing hole 130, and the third housing hole 140 in order to dispose the ball 200.

The housing body 110 may define an external shape of the housing 100. Further, the first housing hole 120, the second housing hole 130, and the third housing hole 140 may be formed in the housing body 110 so that the refrigerant, which is the heat exchange medium, may flow in the housing body 110.

In this case, the first housing hole 120, the second housing hole 130, and the third housing hole 140 may be provided as a flow path through which the refrigerant flows. In this case, a size of the flow path may be changed by the first sealing part 400 and the support means 600, which are disposed in the first housing hole 120, and the second sealing part 500 disposed in the second housing hole 130.

In addition, the first housing hole 120, the second housing hole 130, and the third housing hole 140 may be formed in a 'T' shape in the housing body 110. For example, the first housing hole 120 and the second housing hole 130 may be disposed in a radial direction and face each other. Further, the third housing hole 140 may be disposed to be orthogonal to the first housing hole 120 and the second housing hole 130.

Meanwhile, in order to dispose the ball 200, the first sealing part 400, the second sealing part 500, and the support means 600 in the housing 100, a diameter of any one of the first housing hole 120 and the second housing hole 130 may be equal to or larger than an outer diameter of each of the ball 200, the first sealing part 400, the second sealing part 500, and the support means 600.

In this case, because the diameter of the first housing hole 120 may be larger than the diameter of the second housing hole 130 in order to enable an assembling process, the first sealing part 400 and the second sealing part 500, which are equal in size, may be disposed in the housing body 110 in consideration of accurate detection of a flow rate and an expansion rate of the moving refrigerant.

For example, the diameter of the first housing hole 120 may be equal to or larger than the outer diameter of each of the ball 200, the first sealing part 400, the second sealing part 500, and the support means 600. Therefore, the second sealing part 500, the ball 200, the first sealing part 400, and the support means 600 may be sequentially assembled in the housing body 110 through the first housing hole 120. In this case, the first sealing part 400 may be inserted into the housing 100 in a state in which the first sealing part 400 is coupled to the support means 600.

Meanwhile, the housing 100 may include a fourth housing hole 150 formed in the housing body 110 to define a connection portion 310 of the actuator 300 coupled to the ball 200.

Further, the fourth housing hole 150 may be formed in the housing body 110 and face the third housing hole 140. Specifically, the fourth housing hole 150 may be disposed in the axial direction so as to overlap the third housing hole 140 in the axial direction. Therefore, the first housing hole 120, the second housing hole 130, the third housing hole 140, and the fourth housing hole 150 may be disposed in a '+' shape in the housing body 110.

The space S may be formed in the housing body 110. Further, the space S may be disposed to communicate with an intersection point between the first housing hole 120, the second housing hole 130, the third housing hole 140, and the fourth housing hole 150. In this case, because the space S is formed, the housing body 110 may include an inner wall 111 that defines the space S.

The refrigerant may be allowed, by the structure and the rotation of the ball 200, to flow through any one of a first flow path, which is defined by the first housing hole 120 and the third housing hole 140, and a second flow path defined by the second housing hole 130 and the third housing hole 140, or the flow of the refrigerant may be blocked by the structure and the rotation of the ball 200.

Figure 8:
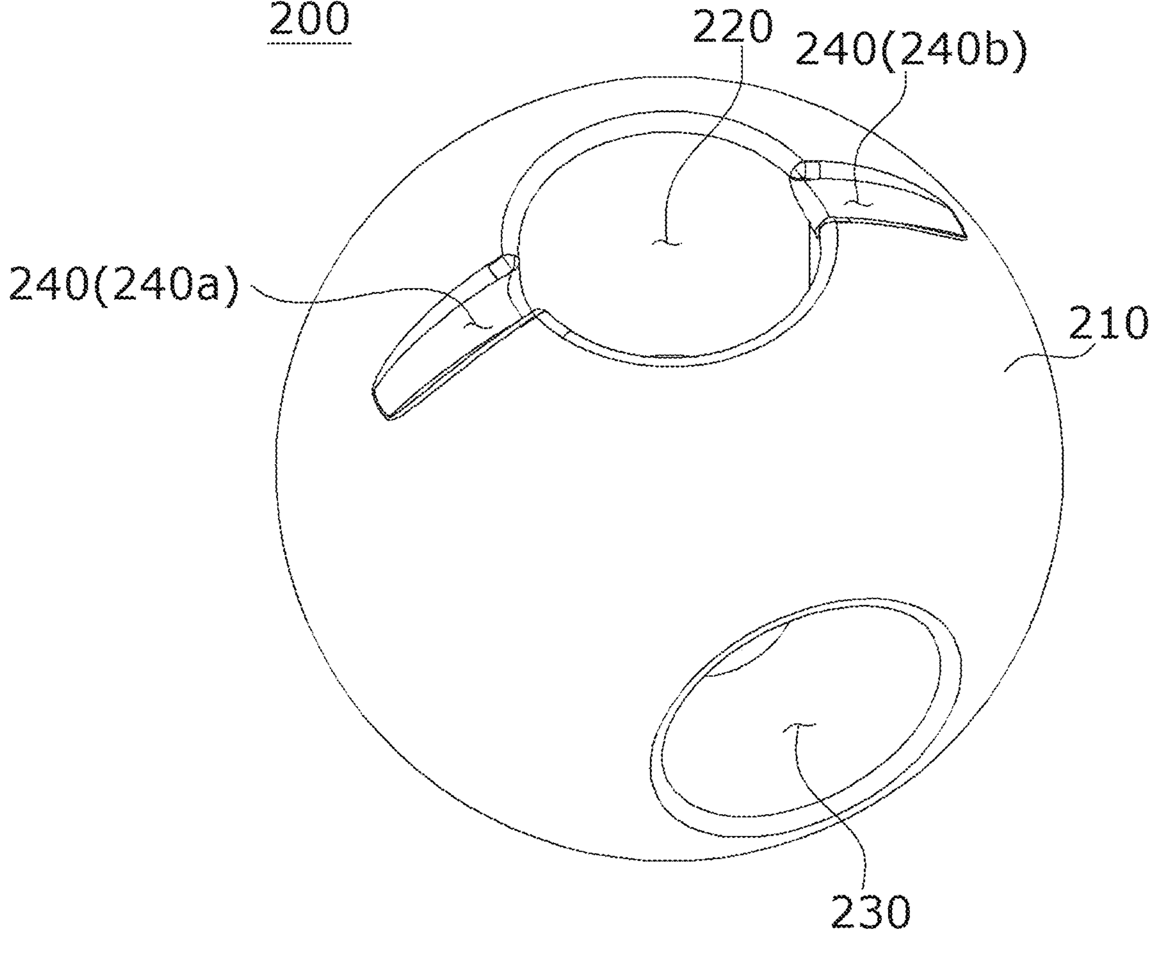
FIG. 8 is a perspective view illustrating the ball of the ball valve according to the first embodiment.
Figure 9:
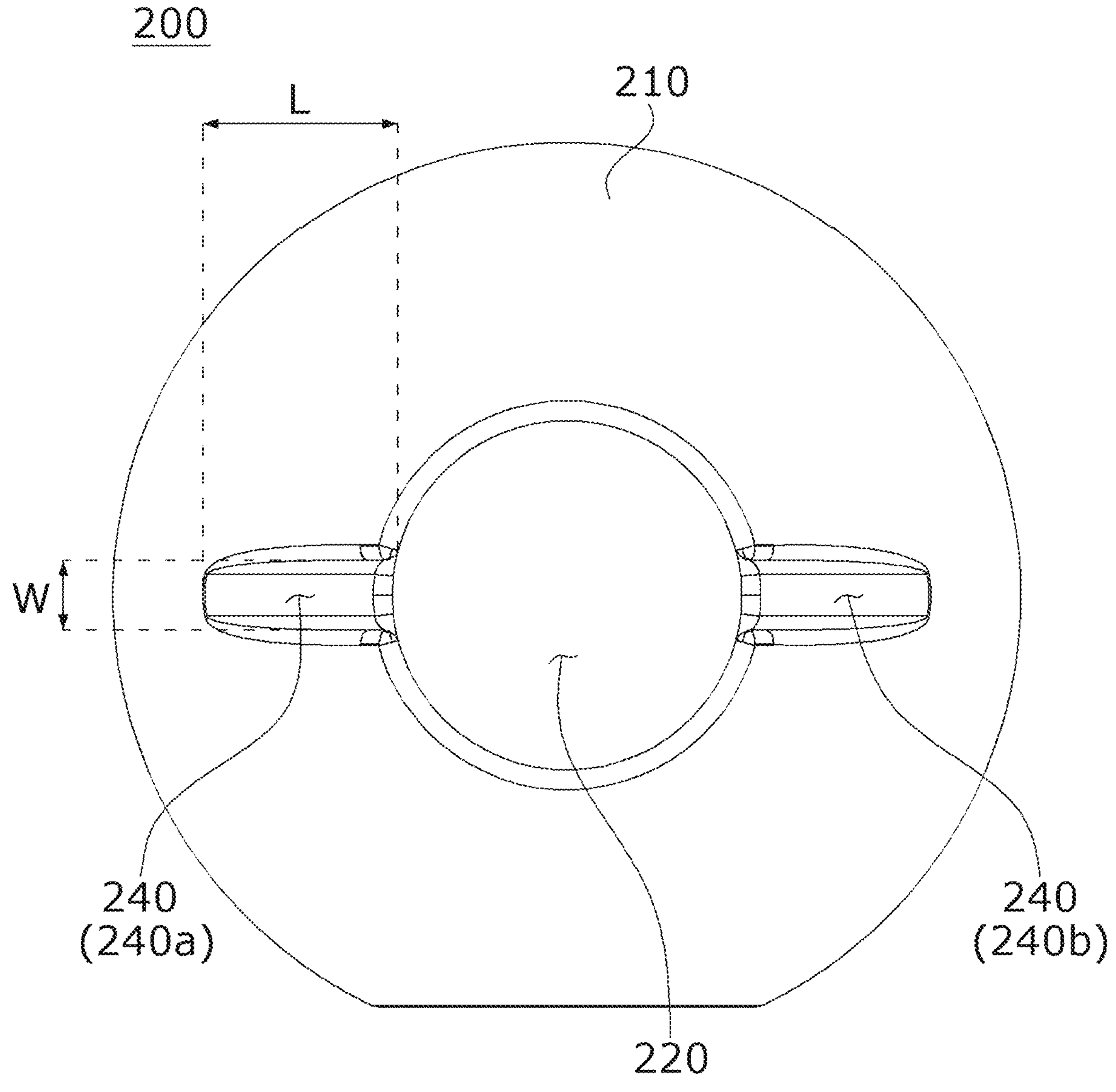
FIG. 9 is a front view illustrating the ball of the ball valve according to the first embodiment.
Figure 10:
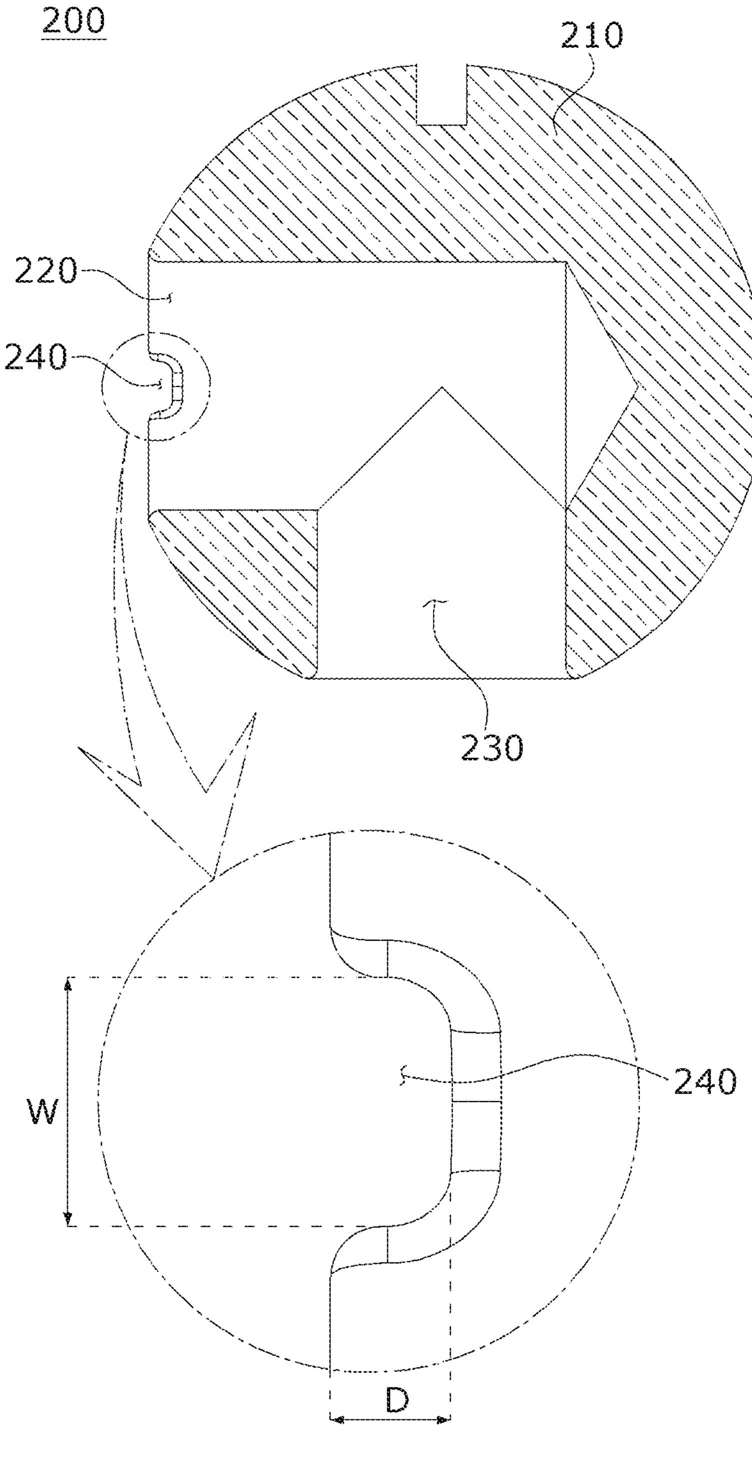
FIG. 10 is a cross-sectional view illustrating the ball of the ball valve according to the first embodiment.

FIG. 8 is a perspective view illustrating the ball of the ball valve according to the first embodiment, FIG. 9 is a front view illustrating the ball of the ball valve according to the first embodiment, and FIG. 10 is a cross-sectional view illustrating the ball of the ball valve according to the first embodiment. In this case, FIGS. 8 to 10 may illustrate the ball according to the first embodiment.

With reference to FIGS. 8 to 10, the ball 200 may include a spherical ball body 210 having a predetermined radius R, first and second holes 220 and 230 disposed in the ball body 210 and configured to communicate with each other, and two grooves 240 formed to have a predetermined length in a circumferential direction of the ball body 210 and connected to the first hole 220. In this case, the grooves 240 may include a first groove 240*a* disposed to correspond to the first housing hole 120, and a second groove 240*b* disposed to correspond to the second housing hole 130.

The ball body 210 may be formed in a spherical shape, and a groove may be formed at one side of the ball body 210 so that the connection portion 310 of the actuator 300 is coupled to the groove.

The first hole 220 and the second hole 230 may be formed in the ball body 210 and used as flow paths through which the refrigerant flows. In this case, the first hole 220 and the second hole 230 may be disposed in the ball body 210 and be orthogonal to each other. For example, the first hole 220 may be disposed in the radial direction perpendicular to the axial center, and the second hole 230 may be disposed in the axial direction.

Further, a first diameter D1 of the first hole 220 may be equal to a second diameter D2 of the second hole 230 in consideration of the amount of the refrigerant moving along the first hole 220 and the second hole 230. Further, the first diameter D1 of the first hole 220 may be equal to an inner diameter of each of the first sealing part 400 and the second sealing part 500.

The first hole 220 may be disposed to face the first housing hole 120, the second housing hole 130, or the inner wall 111 of the housing body 110 by the rotation of the ball body 210.

The second hole 230 may be disposed to face the third housing hole 140 even though the ball body 210 rotates.

Further, the second hole 230 may be disposed to overlap the connection portion 310 in the axial direction.

The groove 240 may be disposed in the circumferential direction on a spherical surface of the ball body 210.

In this case, the two grooves 240 may be disposed symmetrically with respect to a center of the first hole 220. For example, the groove 240 may include the first groove 240*a* and the second groove 240*b*, and the first groove 240*a* and the second groove 240*b* may be symmetrically disposed on the spherical surface of the ball body 210.

Further, the groove 240 may be formed to communicate with the first hole 220. For example, the groove 240 may extend in the circumferential direction from an outer diameter of the first hole 220.

In addition, the groove 240 may be provided as a groove having a predetermined length L, a predetermined width W, and a predetermined depth D, and the refrigerant may move along the groove 240. In this case, the length L of the groove 240 formed in the ball 200 disposed in the ball valve according to the first embodiment may be referred to as a first length.

The length L, the width W, and the depth D of the groove 240 may act as important factors related to the expansion of the refrigerant moved along the groove 240.

For example, because a degree to which the groove 240 and the first housing hole 120 communicate with each other or a degree to which the groove 240 and the second housing hole 130 communicate with each other may vary depending on a degree to which the ball 200 rotates, the flow rate of the refrigerant moving through the groove 240 may vary. Therefore, the length L of the groove 240 may be as long as possible to make it easy to control the expansion of the refrigerant.

However, because there is a limitation in designing the length L because of the size of the ball 200, the first diameter D1 of the first hole 220, and the blockage of the refrigerant according to a rotation range of the ball 200, the length L need to be designed in consideration of the above-mentioned factors.

In addition, because the flow rate of the refrigerant flowing along the groove 240 is related to the expansion rate of the refrigerant, the width W and the depth D of the groove 240 are also provided as main design factors.

Specifically, because the refrigerant moving along the groove 240 may expand after flowing to the first housing hole 120 or the first hole 220, a cross-sectional area of the first groove 240*a* defined by the width W and the depth D needs to be smaller than a cross-sectional area of the first hole 220 and a cross-sectional area of the first housing hole 120. In this case, because the refrigerant may flow to the first housing hole 120 or the first hole 220 by means of the first sealing part 400, the cross-sectional area of the first groove 240*a* needs to be smaller than a cross-sectional area defined by a first inner diameter MD of the first sealing part 400.

That is, because the ball valve 1 according to the first embodiment implements the expansion of the refrigerant by using the groove 240, a cross-sectional area of the groove 240 needs to be smaller than the cross-sectional area of the first hole 220 and the cross-sectional area of the first housing hole 120.

Meanwhile, a design criterion identical to the design criterion of the first groove 240*a* may also be applied to the second groove 240*b* disposed to correspond to the second housing hole 130 or the second sealing part 500.

In addition, the depth D may decrease from the first hole 220 toward an end of the groove 240 in consideration of a change in expansion of the refrigerant in the groove 240. Therefore, the groove 240 may be formed in a shape having a maximum depth and a minimum depth. In this case, the maximum depth of the groove 240 may be about 2 mm. Specifically, a depth of the groove 240 at a side of the first hole 220 may be about 2 mm.

In addition, the width W may also decrease from the first hole 220 toward the end of the groove 240.

The first groove 240*a* may be disposed to correspond to the first housing hole 120 by the actuator 300. Therefore, the refrigerant moving along the first groove 240*a* may expand.

Further, the second groove 240*b* may be disposed to correspond to the second housing hole 130 by the actuator 300. Therefore, the refrigerant moving along the second groove 240*b* may expand.

Figure 11:
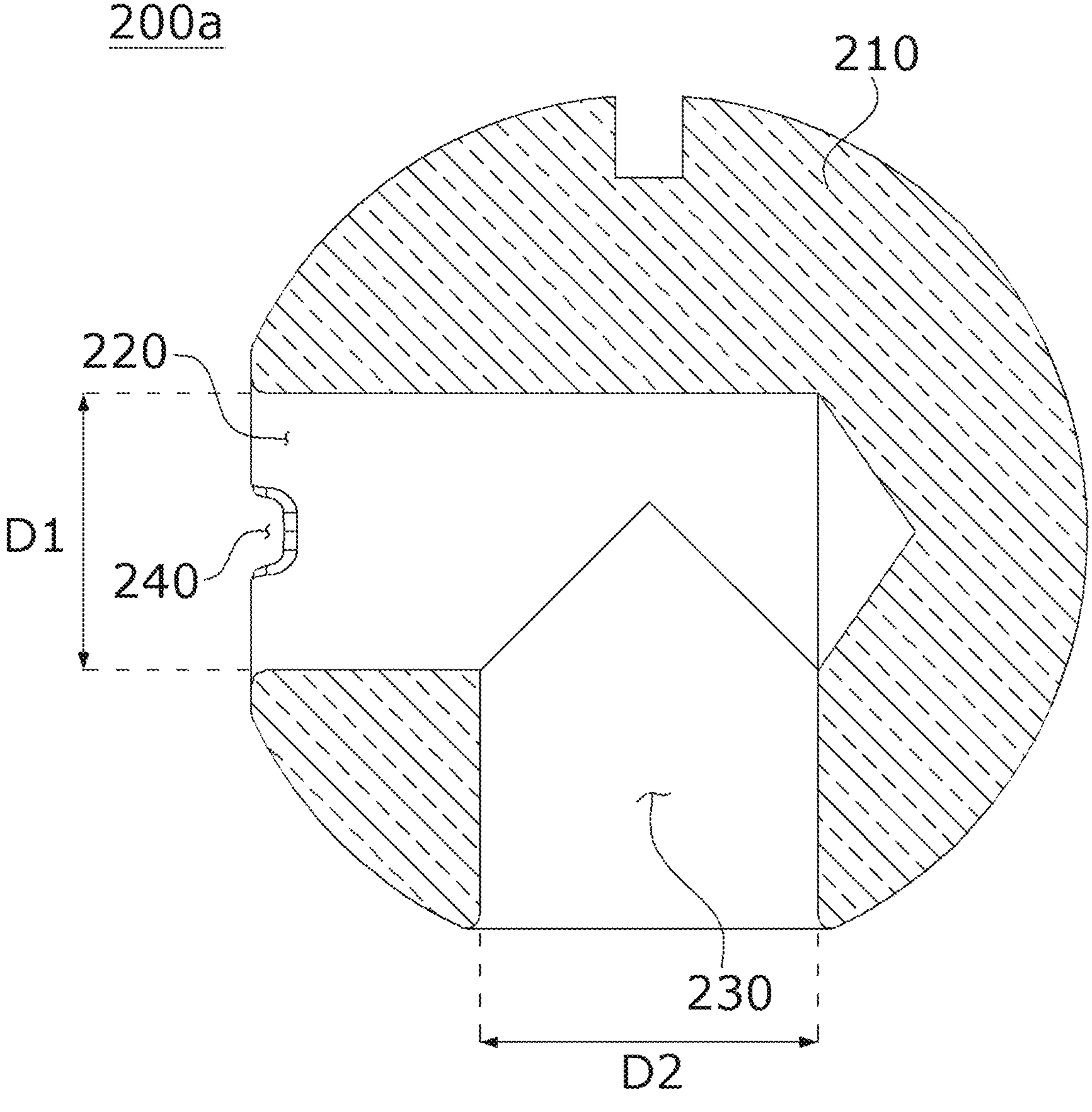
FIG. 11 is a cross-sectional view illustrating a modified example of the ball of the ball valve according to the first embodiment.

FIG. 11 is a cross-sectional view illustrating a modified example of the ball of the ball valve according to the first embodiment and may illustrates a ball according to a second embodiment.

With reference to FIG. 11, the diameter D1 of the first hole 220 of the ball 200*a* may be different in size from the diameter D2 of the second hole 230.

Specifically, the diameter D1 of the first hole of the ball 200*a* may be larger than the diameter D2 of the second hole. Therefore, the ball 200*a* according to the second embodiment may further ensure the length L of the groove 240 than the ball 200 according to the first embodiment. In this case, the diameter D1 of the first hole 220 of the ball 200*a* according to the second embodiment may be smaller than the inner diameter of each of the first sealing part 400 and the second sealing part 500.

Therefore, because the ball 200*a* according to the second embodiment may have a longer length L of the groove 240 than the ball 200 according to the first embodiment, the expansion of the refrigerant may be adjusted more easily.

The actuator 300 may rotate the ball 200 about a rotation center C within a predetermined rotation range.

In this case, the connection portion 310 of the actuator 300 may be coupled to the ball 200, and the connection portion 310 may be a rotary shaft, a rotation of which is controlled by the actuator 300. In this case, the ball 200 may include a groove formed to be coupled to the connection portion 310.

Therefore, the ball 200 may rotate in conjunction with a rotation of the rotary shaft. A rotation range of the rotary shaft may be defined within a range of 180 degrees based on the rotation center C in consideration of a position of the first housing hole 120 and a position of the second housing hole 130.

In this case, the ball 200 may include the groove formed to be coupled to the connection portion 310.

The sealing parts 400 and 500 may be disposed in the housing 100 and correspond to the ball 200.

The sealing parts 400 and 500 may include the first sealing part 400 configured to correspond to the first housing hole 120 and the first hole 220, and the second sealing part 500 configured to correspond to the second housing hole 120 and the first hole 220.

In this case, in order to dispose the ball 200, the first sealing part 400, and the second sealing part 500 in the housing 100, the diameter of the first housing hole 120 may be larger than the diameter of the second housing hole 130.

Therefore, the refrigerant, which passes through the first housing hole 120, the first groove 240*a*, and the first hole 220, and the refrigerant, which passes through the second housing hole 130, the second groove 240*b*, and the first hole 220 may define different movement amounts, which makes it difficult to calculate an accurate expansion rate or the like.

Therefore, the ball valve 1 according to the first embodiment may allow a preset amount of refrigerant to move through the first and second sealing parts 400 and 500 having the same shape.

Figure 12:
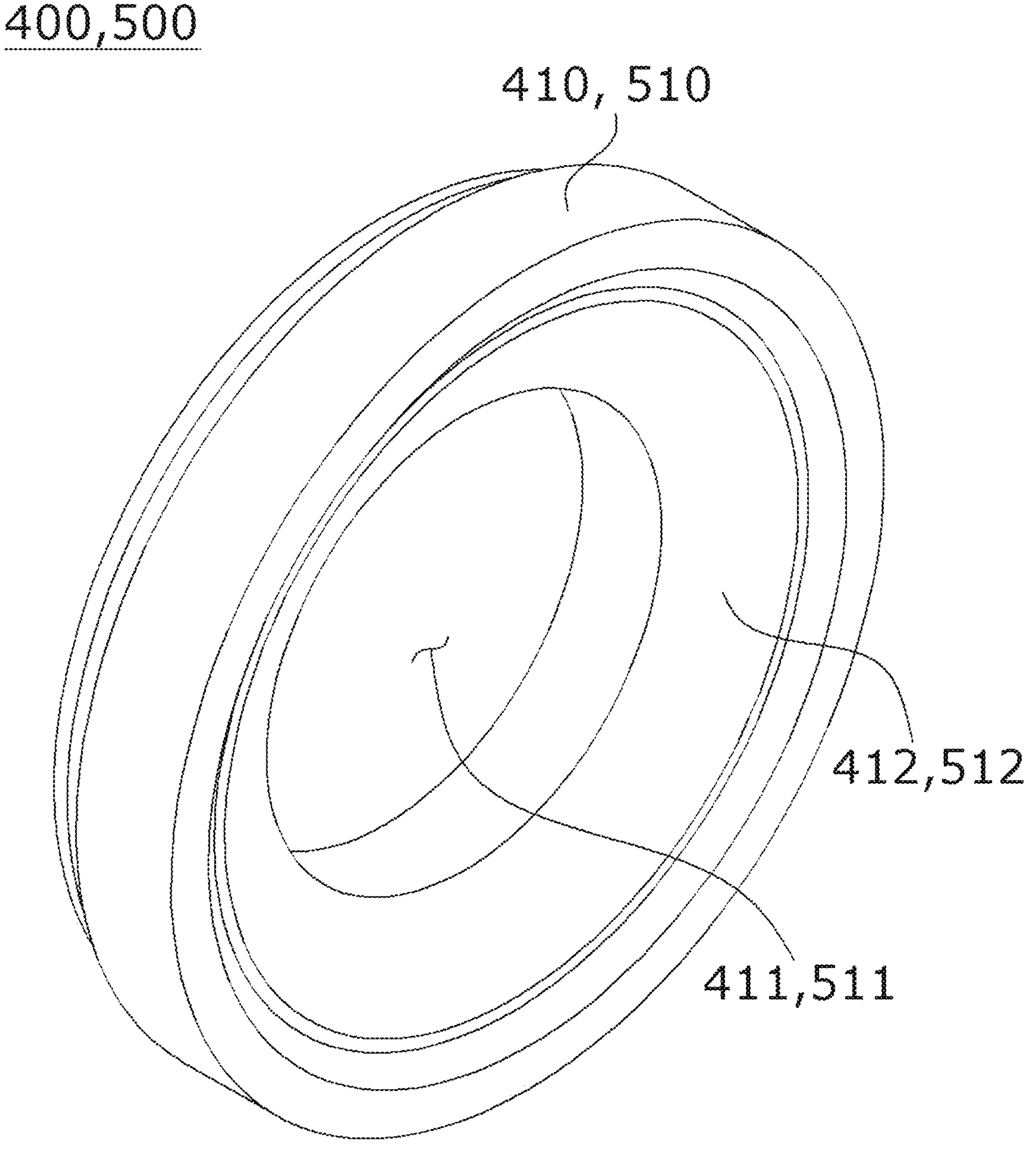
FIG. 12 is a perspective view illustrating the sealing part of the ball valve according to the embodiment.
Figure 13:
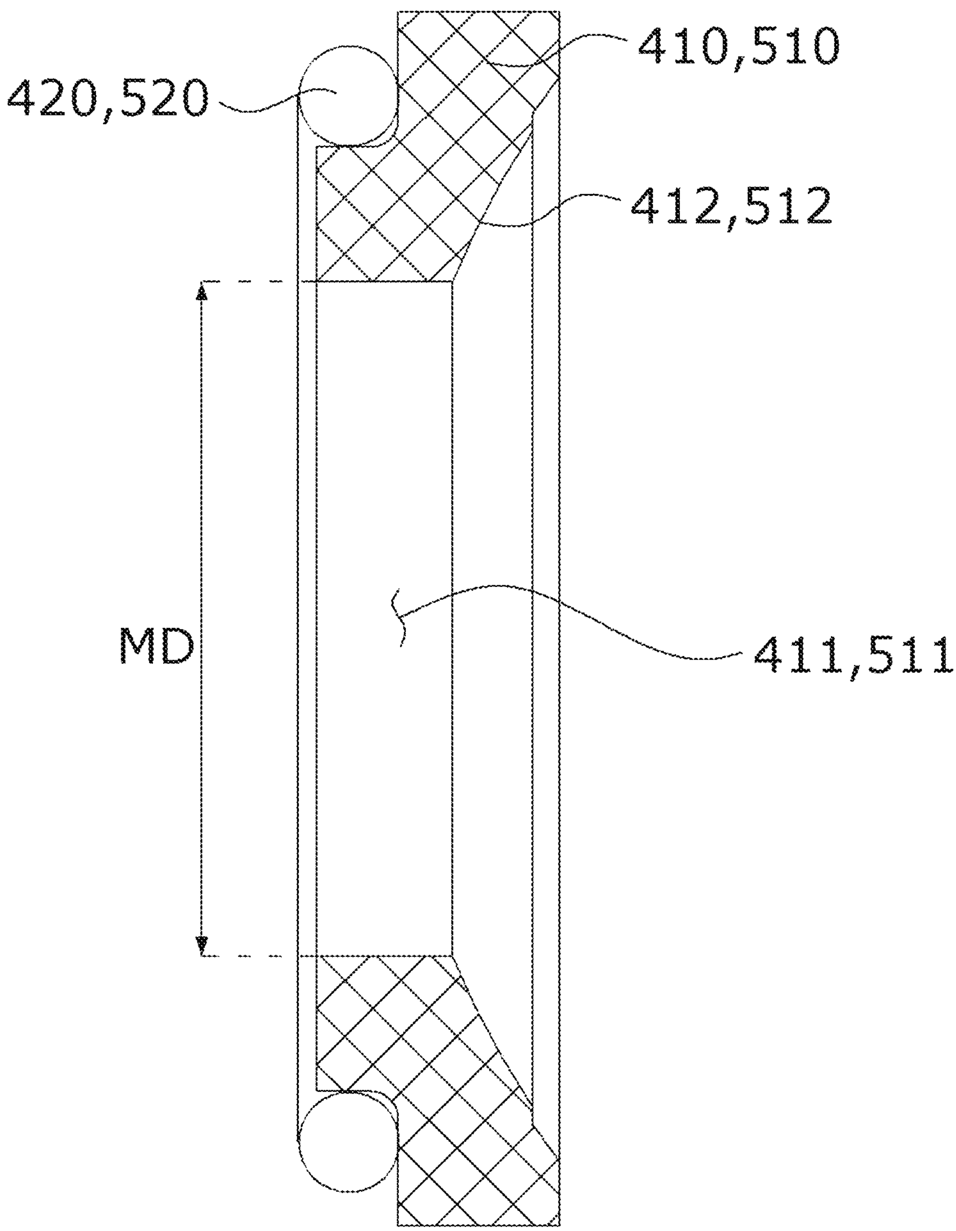
FIG. 13 is a cross-sectional view illustrating the sealing part of the ball valve according to the embodiment.

FIG. 12 is a perspective view illustrating the sealing part of the ball valve according to the embodiment, and FIG. 13 is a cross-sectional view illustrating the sealing part of the ball valve according to the embodiment.

With reference to FIGS. 12 and 13, the sealing parts 400 and 500 may include bodies 410 and 510, and O-rings 420 and 520 disposed outside the bodies 410 and 510. In this case, the bodies 410 and 510 may be referred to as sealing part bodies.

The bodies 410 and 510 may each be formed in a ring shape having an inner diameter and an outer diameter. Therefore, the bodies 410 and 510 may include holes 411 and 511 formed to move the refrigerant. In this case, the holes 411 and 511 may be referred to as sealing part body holes.

Further, the holes 411 and 511 may communicate with the first hole 220 or the groove 240 of the ball 200 as the ball 200 rotates.

In addition, the bodies 410 and 510 may include curved surfaces 412 and 512 corresponding to the ball 200.

The curved surfaces 412 and 512 may be surfaces disposed to face the ball 200 and be in contact with the spherical surface of the ball body 210.

The O-rings 420 and 520 may be disposed on outer circumferential surfaces of the bodies 410 and 510.

Further, the O-ring 420 disposed on the first sealing part 400 may be in contact with the support means 600.

Further, the O-ring 520 disposed on the second sealing part 500 may be in contact with the inner wall of the housing body 110 that defines the second housing hole 130.

The support means 600 may be disposed in the first housing hole 120 and prevent the separation of the first sealing part 400. In this case, the support means 600 may be detachably disposed in the housing 100 and make it easy to replace the ball 200.

Figure 14:
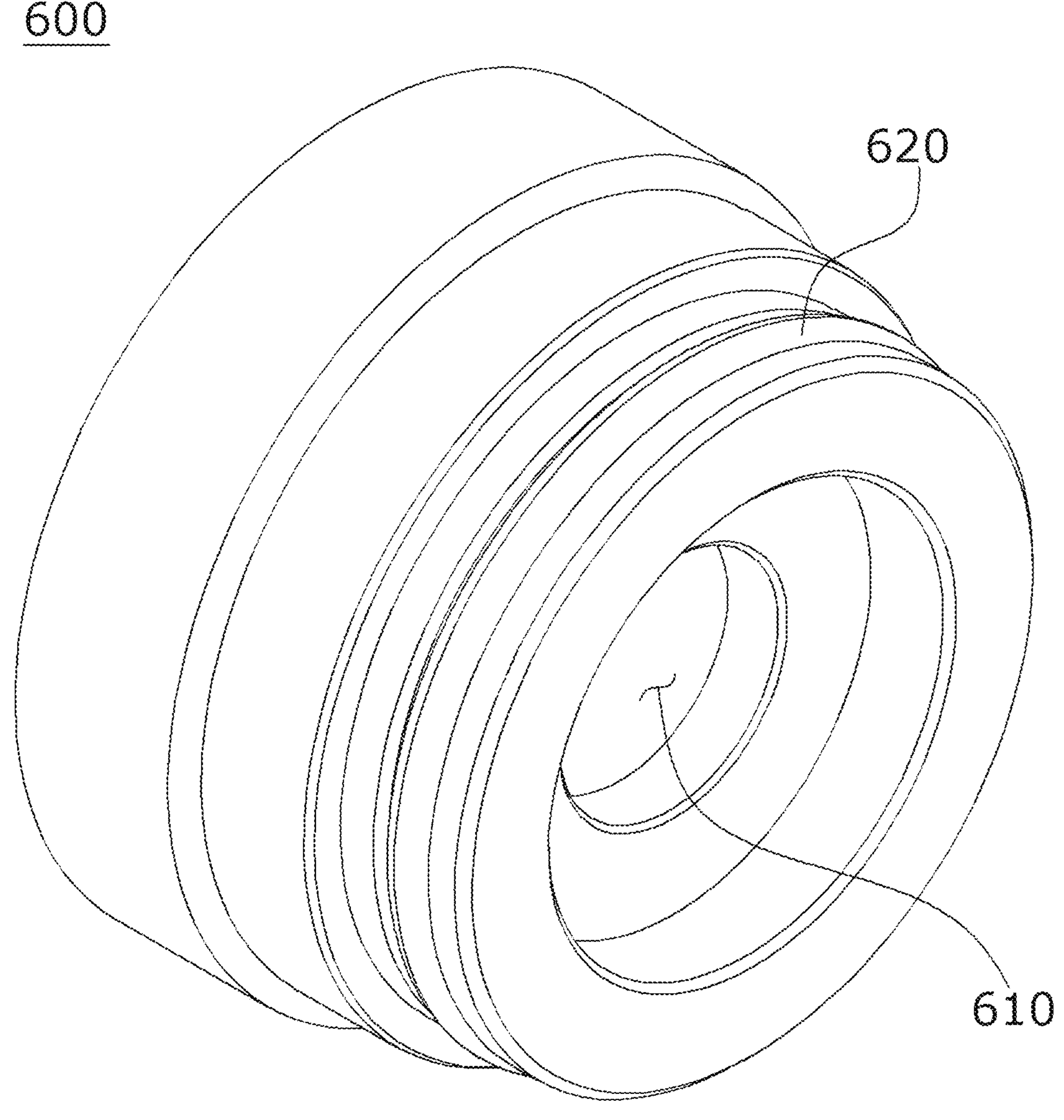
FIG. 14 is a perspective view illustrating the support means of the ball valve according to the embodiment.

FIG. 14 is a perspective view illustrating the support means of the ball valve according to the embodiment.

With reference to FIG. 14, the support means 600 may be formed in a tubular shape having an inner circumferential surface and an outer circumferential surface. Therefore, a hole 610 may be formed in the support means 600, and the hole 610 may communicate with the hole 411 of the first sealing part 400.

In addition, the outer circumferential surface of the support means 600 may be formed in a multi-stage shape, and an O-ring 620 may be disposed on the outer circumferential surface.

In addition, a screw thread may be formed on a part of the outer circumferential surface of the support means 600. Further, the screw thread may be screw-coupled to the inner wall of the housing body 110 that defines the first housing hole 130. Therefore, the support means 600 may be detachably coupled to the housing 100.

Meanwhile, in the ball valve 1 according to the first embodiment, the length L of the groove 240 of the ball 200 or 200*a* may be limited by design in consideration of a relationship with the sealing parts 400 and 500 so that the ball 200 or 200*a*, which is rotated by the actuator 300, may be positioned at a position at which the ball 200 or 200*a* blocks the movement of the refrigerant.

For example, because the ball 200 or 200*a* may rotate within the range of 180 degrees and the inner diameters of the sealing parts 400 and 500 may be provided as preset values, a range in which the groove 240 is formed in the ball 200 or 200*a* so that the ball valve 1 according to the first embodiment blocks the movement of the refrigerant is restricted.

Therefore, the forming range will be defined on the basis of the relationship with the sealing parts 400 and 500, and a control position of the ball valve 1 according to the first embodiment according to the movement of the refrigerant will be described with reference to the forming range.

Figure 15:
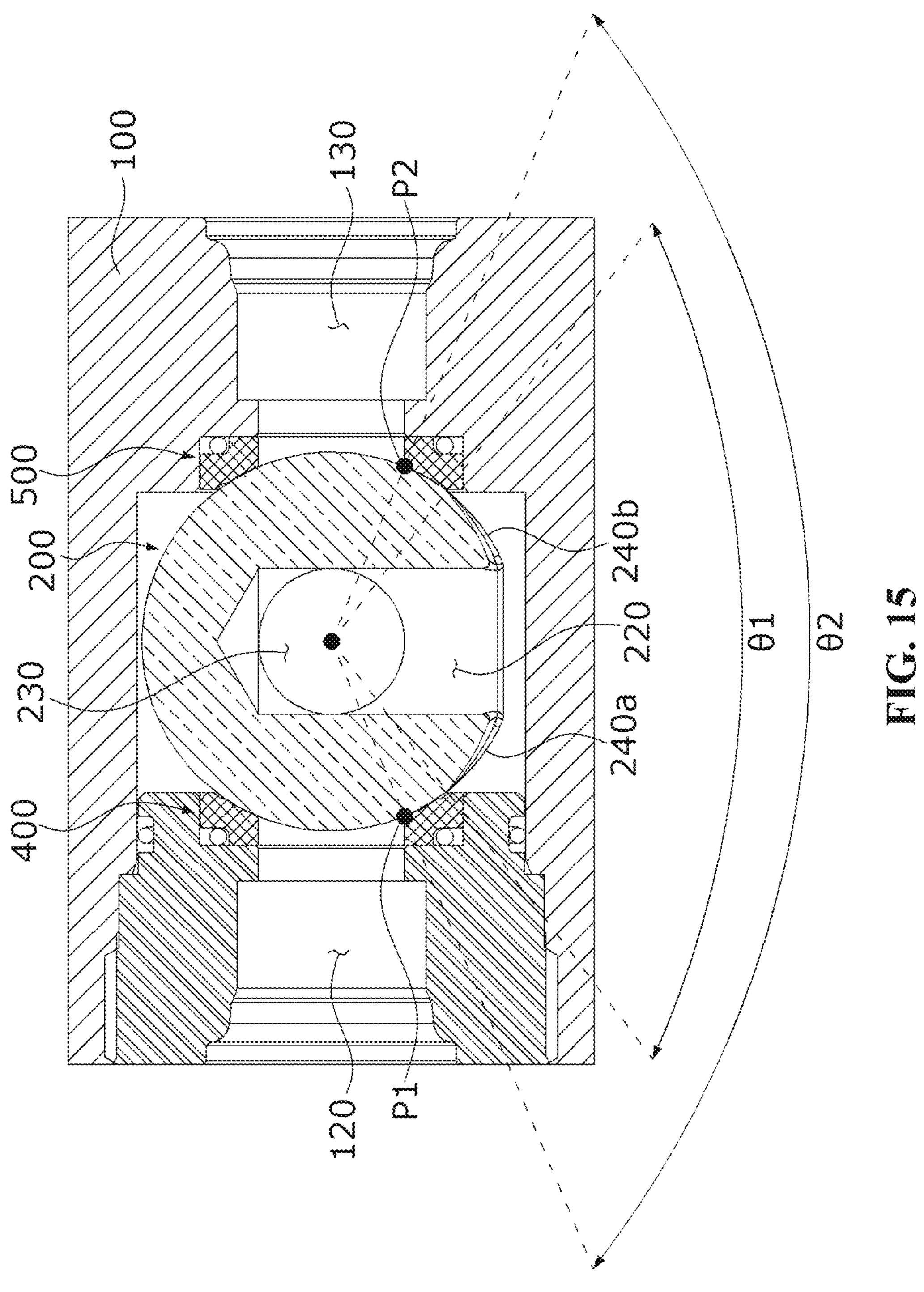
FIG. 15 is a view illustrating a first position of the ball disposed in the ball valve according to the first embodiment.
Figure 16:
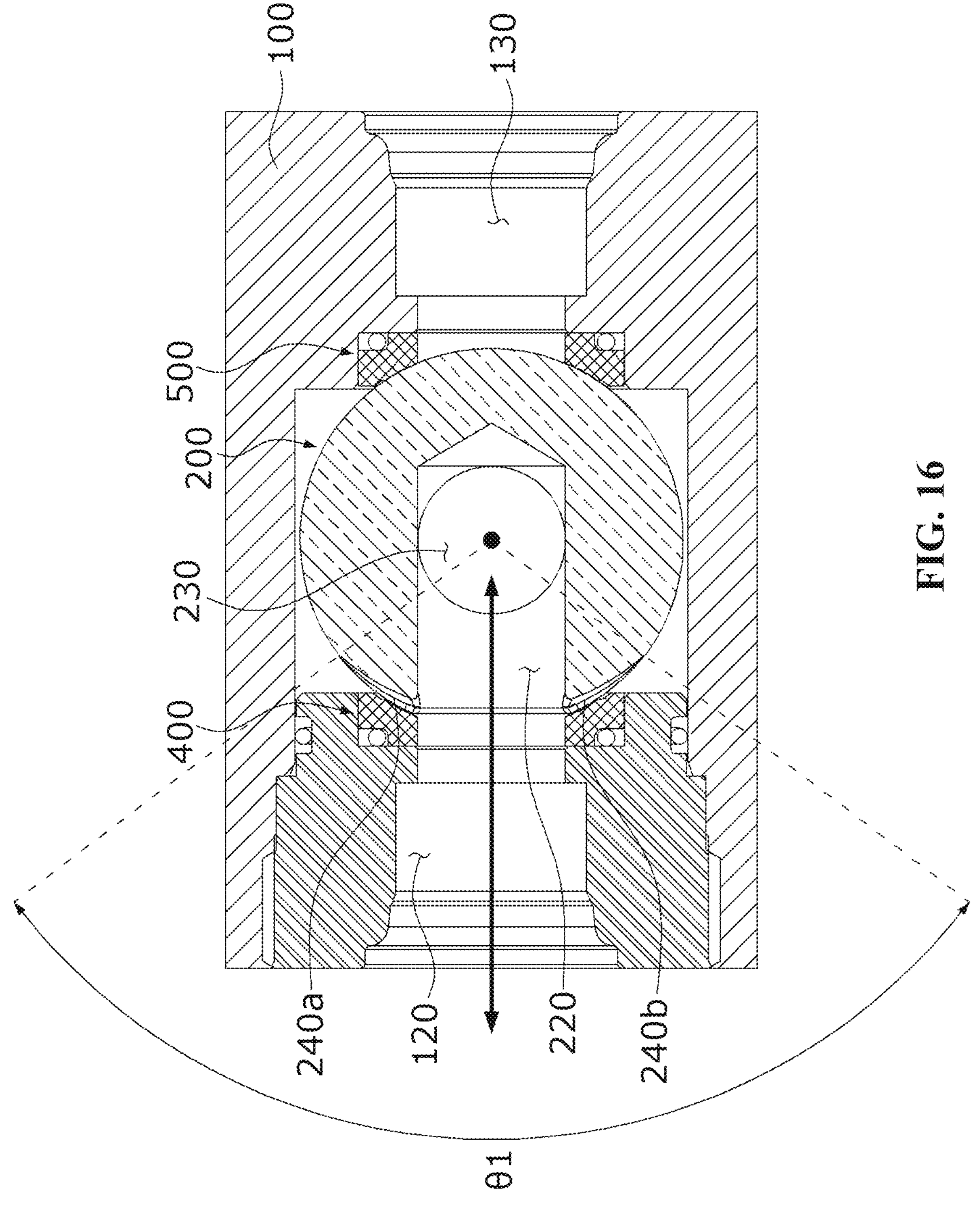
FIG. 16 is a view illustrating a second position of the ball disposed in the ball valve according to the first embodiment.
Figure 17:
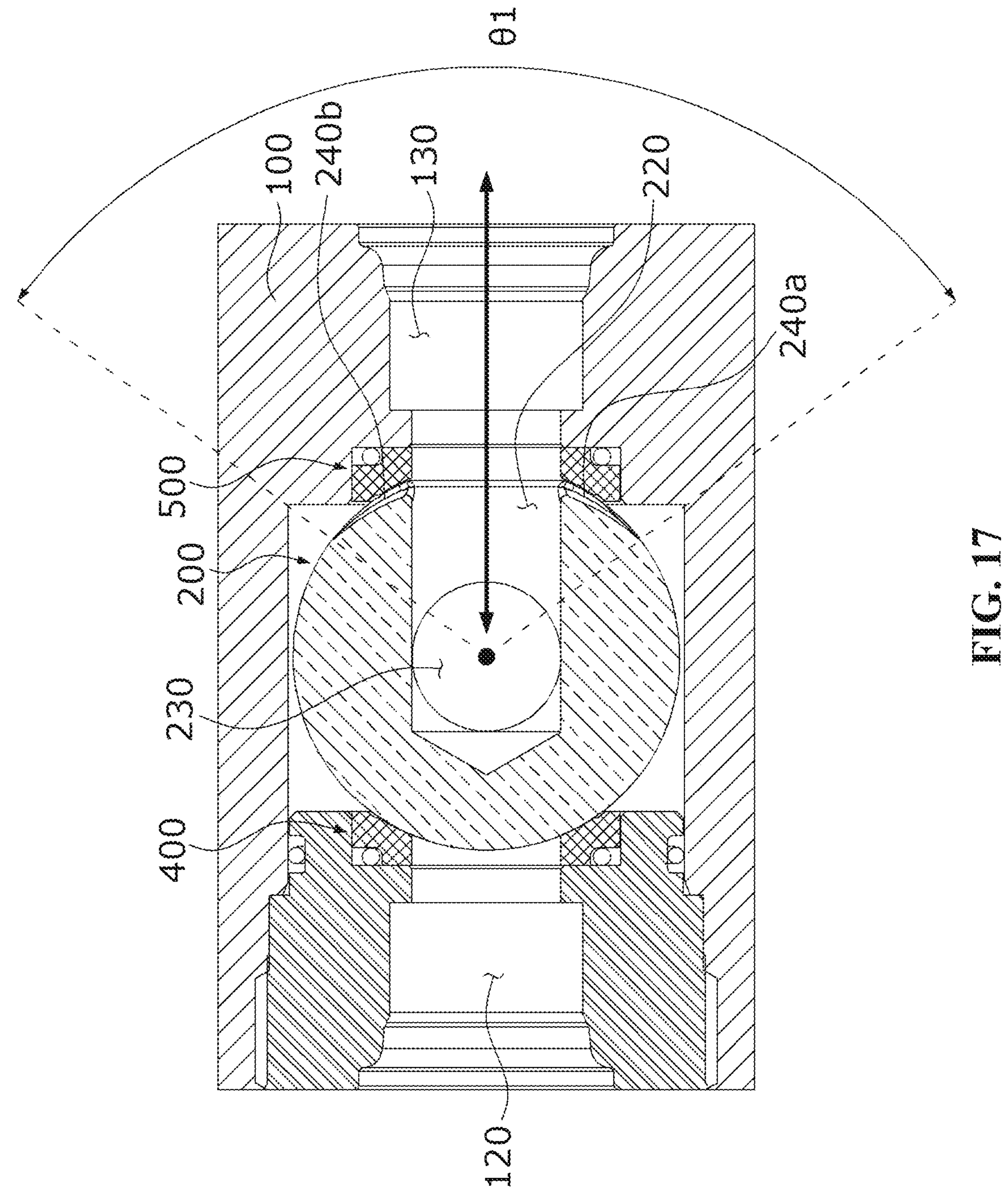
FIG. 17 is a view illustrating a third position of the ball disposed in the ball valve according to the first embodiment.
Figure 18:
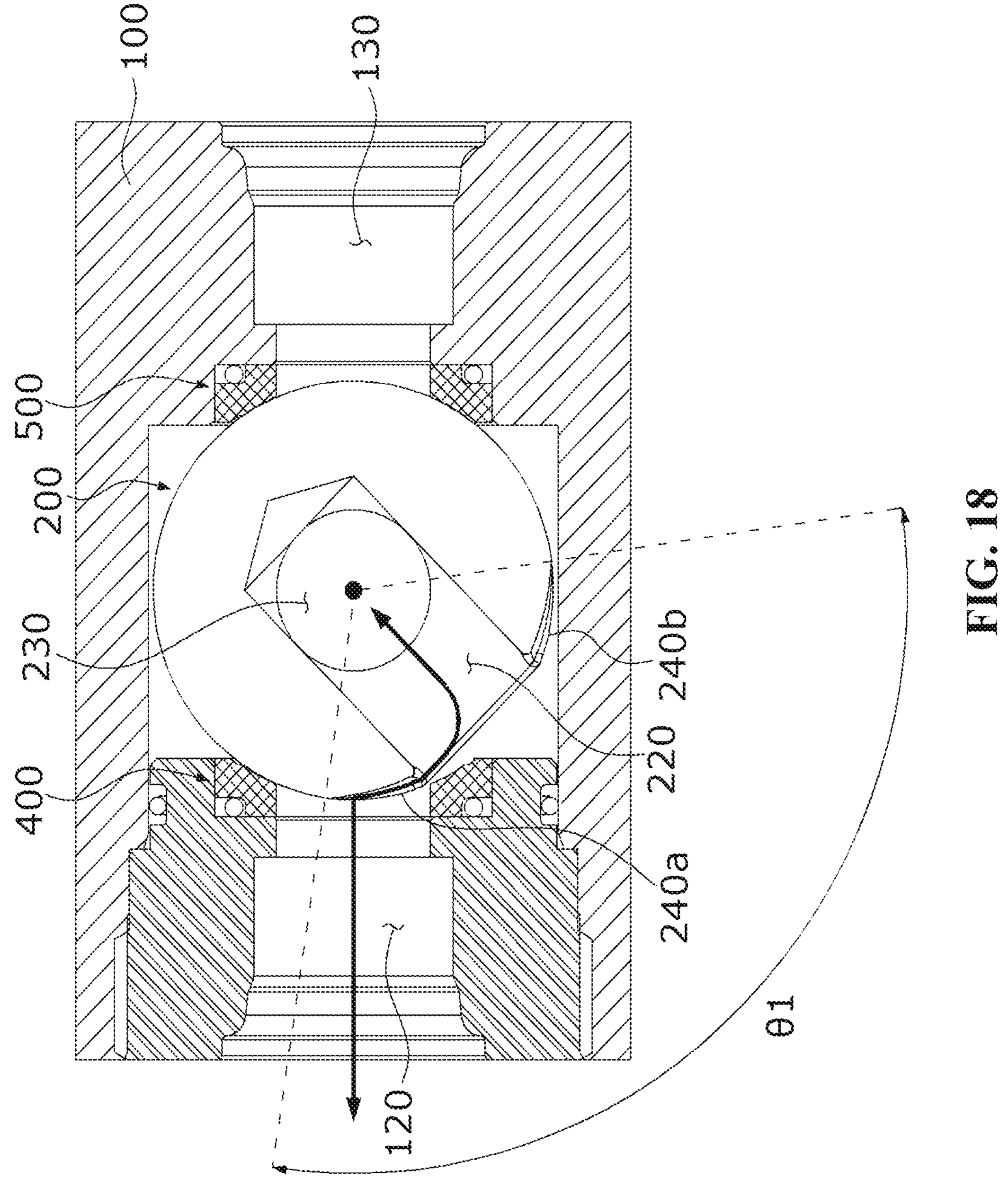
FIG. 18 is a view illustrating a fourth position of the ball disposed in the ball valve according to the first embodiment.
Figure 19:
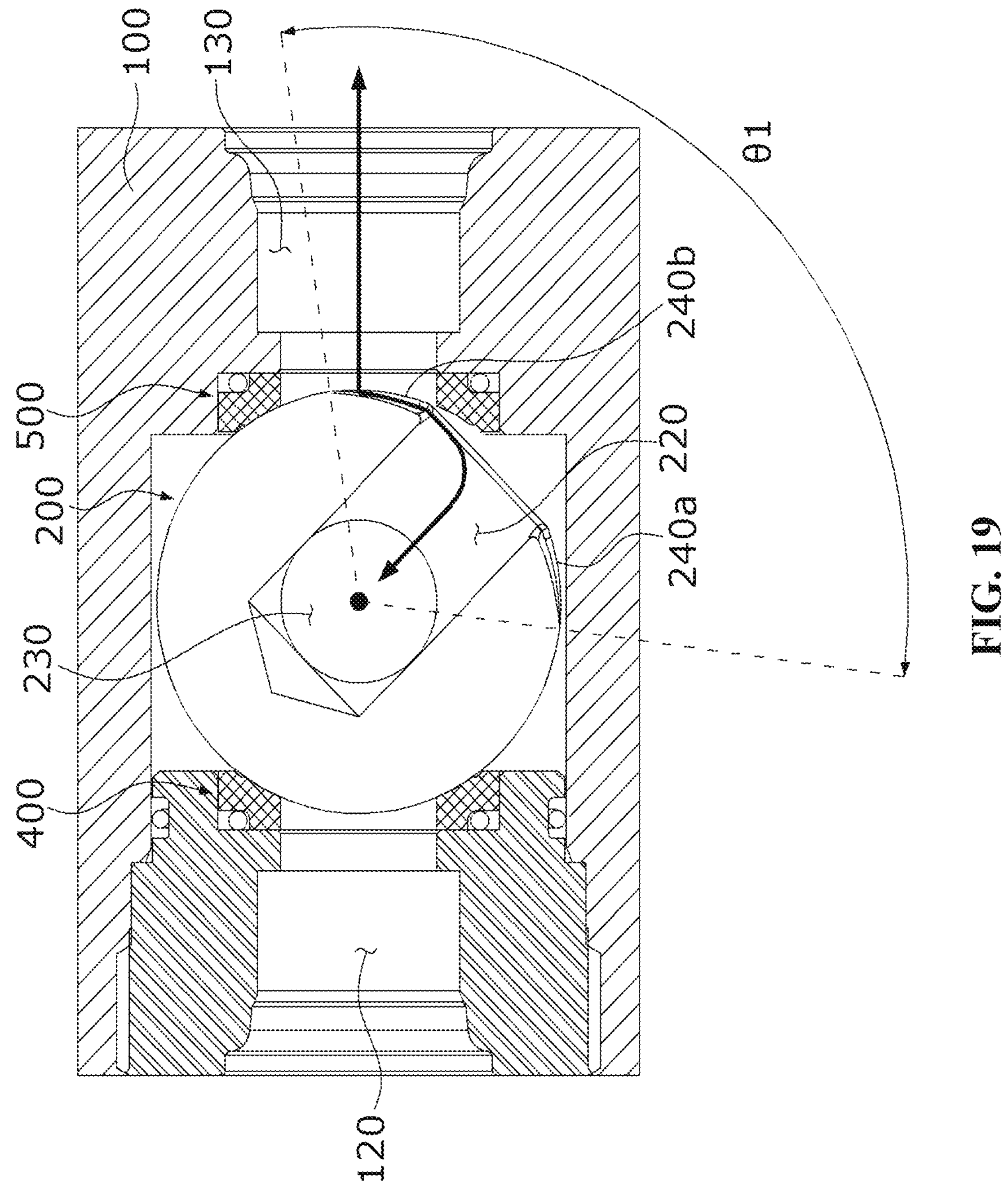
FIG. 19 is a view illustrating a fifth position of the ball disposed in the ball valve according to the first embodiment.

FIG. 15 is a view illustrating a first position of the ball disposed in the ball valve according to the first embodiment, FIG. 16 is a view illustrating a second position of the ball disposed in the ball valve according to the first embodiment, FIG. 17 is a view illustrating a third position of the ball disposed in the ball valve according to the first embodiment, FIG. 18 is a view illustrating a fourth position of the ball disposed in the ball valve according to the first embodiment, and FIG. 19 is a view illustrating a fifth position of the ball disposed in the ball valve according to the first embodiment.

In this case, the arrows illustrated in FIGS. 16 to 19 may indicate the movements of the refrigerant.

Hereinafter, in the description of the rotational positions of the ball 200 or 200*a*, the forming ranges of the grooves of the balls 200 or 200*a* according to the first and second embodiments may be restricted in the same way. Therefore, the description will focus on the ball 200 according to the first embodiment.

With reference to FIG. 15, based on the rotation center C, a first included angle θ1 defined between the two grooves 240 may be smaller than a second included angle θ2 defined between one point P1 disposed on an inner diameter of the first sealing part 400 and one point P2 disposed on an inner diameter of the second sealing part 500. In this case, one point P1 disposed on the inner diameter of the first sealing part 400 may be referred to as a first point, one point P2 disposed on the inner diameter of the second sealing part 500 may be referred to as a second point, and the first point and the second point may be two points closest to each other in the circumferential direction based on the rotation center C.

That is, in the ball valve 1 according to the first embodiment, the forming range of the groove 240 may be defined by the first included angle θ1 and the second included angle θ2.

As illustrated in FIG. 15, in the ball valve 1 according to the first embodiment, the ball 200 may be disposed at the first position by the actuator 300. Specifically, in the ball valve 1 according to the first embodiment, the ball 200 may be positioned at the first position at which both the two grooves 240 are disposed in the second included angle θ2. In this case, the first position may be referred to as a blocking position or a standby position.

Therefore, the ball 200 may block the movement of the refrigerant by being positioned in a closed state in which the first housing hole 120 and the second housing hole 230 are closed. In this case, the first hole 220 of the ball 200 may be disposed to face the inner wall 111 that defines the space S of the housing 100.

As illustrated in FIG. 16, in the ball valve 1 according to the first embodiment, the ball 200 may be disposed at the second position by the actuator 300. Specifically, in the ball valve 1 according to the first embodiment, the ball 200 may be positioned at the second position at which the first housing hole 120 is disposed in the first included angle θ1.

That is, the ball 200 is positioned at the second position at which the first housing hole 120 and the first hole 220 face and communicate with each other, such that the ball 200 may be positioned in an open state in which the first housing hole 120 is opened. In this case, the second position may be referred to as a first open position.

Therefore, the refrigerant may move sequentially through the first housing hole 120, the first hole 220, and the second hole 230 or move sequentially through the second hole 230, the first hole 220, and the first housing hole 120. In this case, the ball valve 1 according to the first embodiment only controls the movement of the refrigerant at the second position without expanding the refrigerant.

As illustrated in FIG. 17, in the ball valve 1 according to the first embodiment, the ball 200 may be disposed at the third position by the actuator 300. Specifically, in the ball valve 1 according to the first embodiment, the ball 200 may be positioned at the third position at which the second housing hole 130 is disposed in the first included angle θ1.

That is, the ball 200 is positioned at the third position at which the second housing hole 130 and the first hole 220 face and communicate with each other, such that the ball 200 may be positioned in an open state in which the second housing hole 130 is opened. In this case, the third position may be referred to as a second open position.

Therefore, the refrigerant may move sequentially through the second housing hole 130, the first hole 220, and the second hole 230 or move sequentially through the second hole 230, the first hole 220, and the second housing hole 130. In this case, the ball valve 1 according to the first embodiment only controls the movement of the refrigerant at the third position without expanding the refrigerant.

As illustrated in FIG. 18, in the ball valve 1 according to the first embodiment, the ball 200 may be disposed at the fourth position by the actuator 300. Specifically, in the ball valve 1 according to the first embodiment, the ball 200 may be positioned at the fourth position at which a part of the first housing hole 120 is disposed in the first included angle θ1. Therefore, a part of an end side of the first groove 240*a* may be disposed to communicate with the first housing hole 120.

That is, the ball 200 may rotate to the fourth position at which the first housing hole 120 and a part of the first groove 240*a* face and communicate with each other. For example, the ball 200 may rotate to a position at which the refrigerant moves and expands along the first groove 240*a*. In this case, the fourth position may be referred to as a first expansion position.

Therefore, the refrigerant may move sequentially through the first housing hole 120, the first groove 240*a*, the first hole 220, and the second hole 230 or move sequentially through the second hole 230, the first hole 220, the first groove 240*a*, and the first housing hole 120. In this case, the ball valve 1 according to the first embodiment expands the refrigerant at the fourth position while moving the refrigerant.

As illustrated in FIG. 19, in the ball valve 1 according to the first embodiment, the ball 200 may be disposed at the fifth position by the actuator 300. Specifically, in the ball valve 1 according to the first embodiment, the ball 200 may be positioned at the fifth position at which a part of the second housing hole 130 is disposed in the first included angle θ1. Therefore, a part of an end side of the second groove 240*b* may be disposed to communicate with the second housing hole 130.

That is, the ball 200 may rotate to the fifth position at which the second housing hole 130 and a part of the second groove 240*b* face and communicate with each other. For example, the ball 200 may rotate to a position at which the refrigerant moves and expands along the second groove 240*b*. In this case, the fifth position may be referred to as a second expansion position.

Therefore, the refrigerant may move sequentially through the second housing hole 130, the second groove 240*b*, the first hole 220, and the second hole 230 or move sequentially through the second hole 230, the first hole 220, the second groove 240*b*, and the second housing hole 130. In this case, the ball valve 1 according to the first embodiment expands the refrigerant at the fifth position while moving the refrigerant.

A vehicle thermal management device S1 according to the first embodiment, to which the ball valve 1 is applied, may use the single gas-liquid separator in common and exclude a check valve, which has been disposed at a gas outlet side of the gas-liquid separator, by using the flow path structure that connects the plurality of expansion means, the gas-liquid separator, and the expansion means. Therefore, the vehicle thermal management device S1 may be implemented to have a compact size while improving quality and performance in cooling and heating the interior of the vehicle. In this case, the vehicle thermal management device S1 may be referred to as a vapor injection heat pump system. Further, the flow path structure may be a passageway through which the heat exchange medium moves.

In particular, the embodiment may provide the vehicle thermal management device S1 having a compact size while improving cooling/heating performance by controlling the vapor injection module, which includes a plurality of expansion means and one gas-liquid separator, and the heat exchange medium moving in the vapor injection module. In this case, the expansion means may be an expansion valve.

In addition, the vehicle thermal management device S1 may improve a degree of design freedom and be easy to maintain and repair by means of the modularized vapor injection module.

Further, the vehicle thermal management device S1 may optimize a flow of the heat exchange medium by providing an optimized arrangement relationship between the components of the vapor injection module. Therefore, the vehicle thermal management device S1 may further improve the cooling/heating performance.

In addition, the vehicle thermal management device S1 may improve thermal management efficiency by implementing a heat pump structure, which uses heat (hereinafter, referred to as 'waste heat') discarded from the battery coolant circulation structure, in an air conditioning device.

In this case, an example is described in which the vehicle thermal management device S1 according to the embodiment uses waste heat from the battery. However, the present disclosure is not necessarily limited thereto. For example, the vehicle may include electrical components such as a motor, an inverter, a lidar, a radar, and a sensor, and the vehicle thermal management device S1 according to the embodiment may use waste heat from the electrical components.

Figure 20:
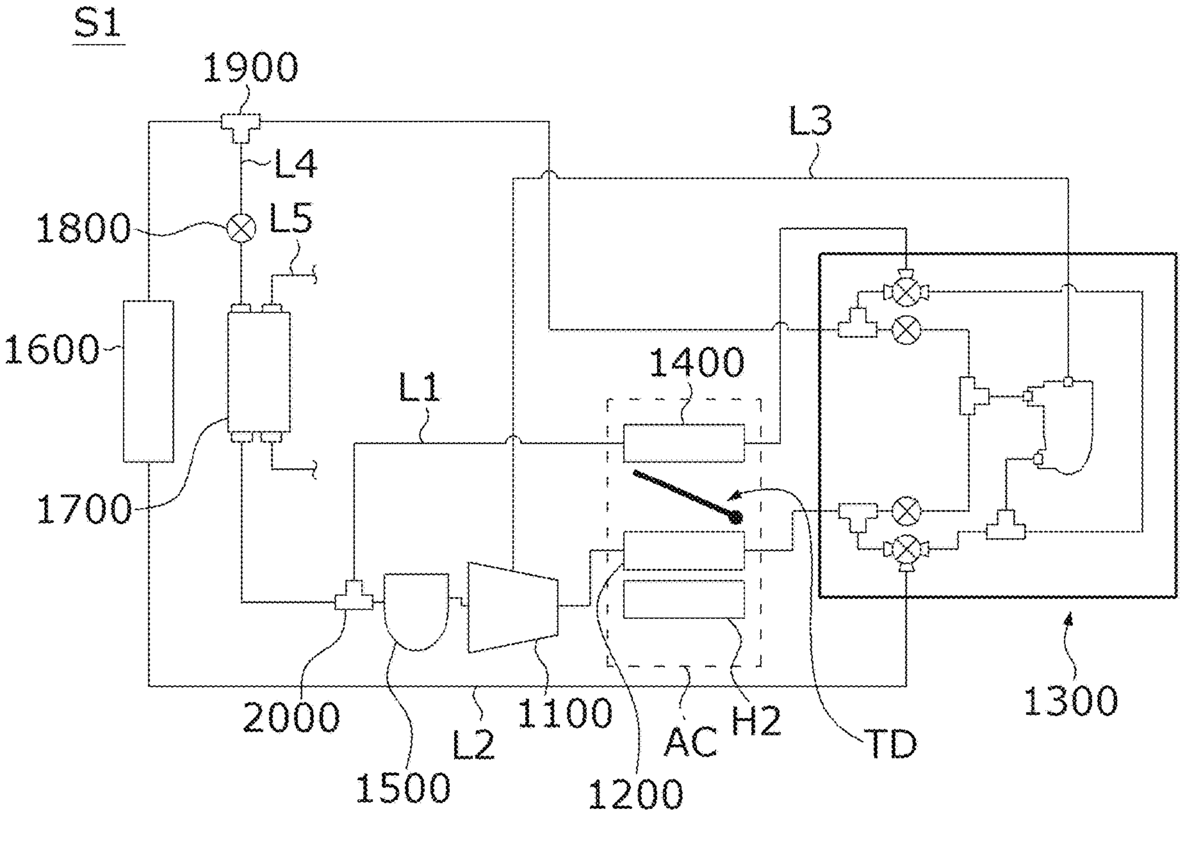
FIG. 20 is a view illustrating a vehicle thermal management device according to the first embodiment to which the ball valve according to the first embodiment is applied.
Figure 21:
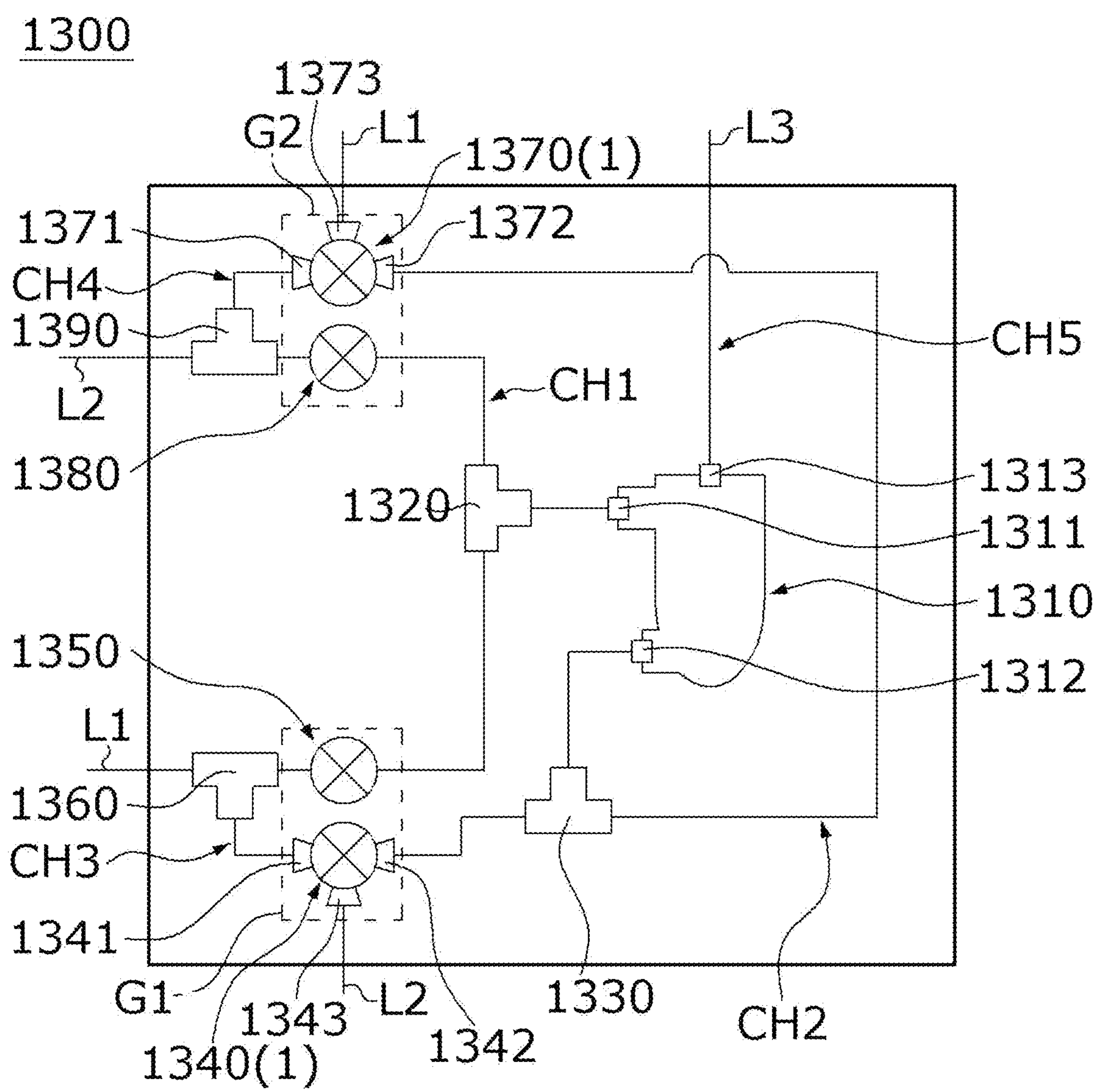
FIG. 21 is a view illustrating an arrangement relationship between constituent elements of a vapor injection module disposed in the vehicle thermal management device according to the first embodiment.
Figure 22:
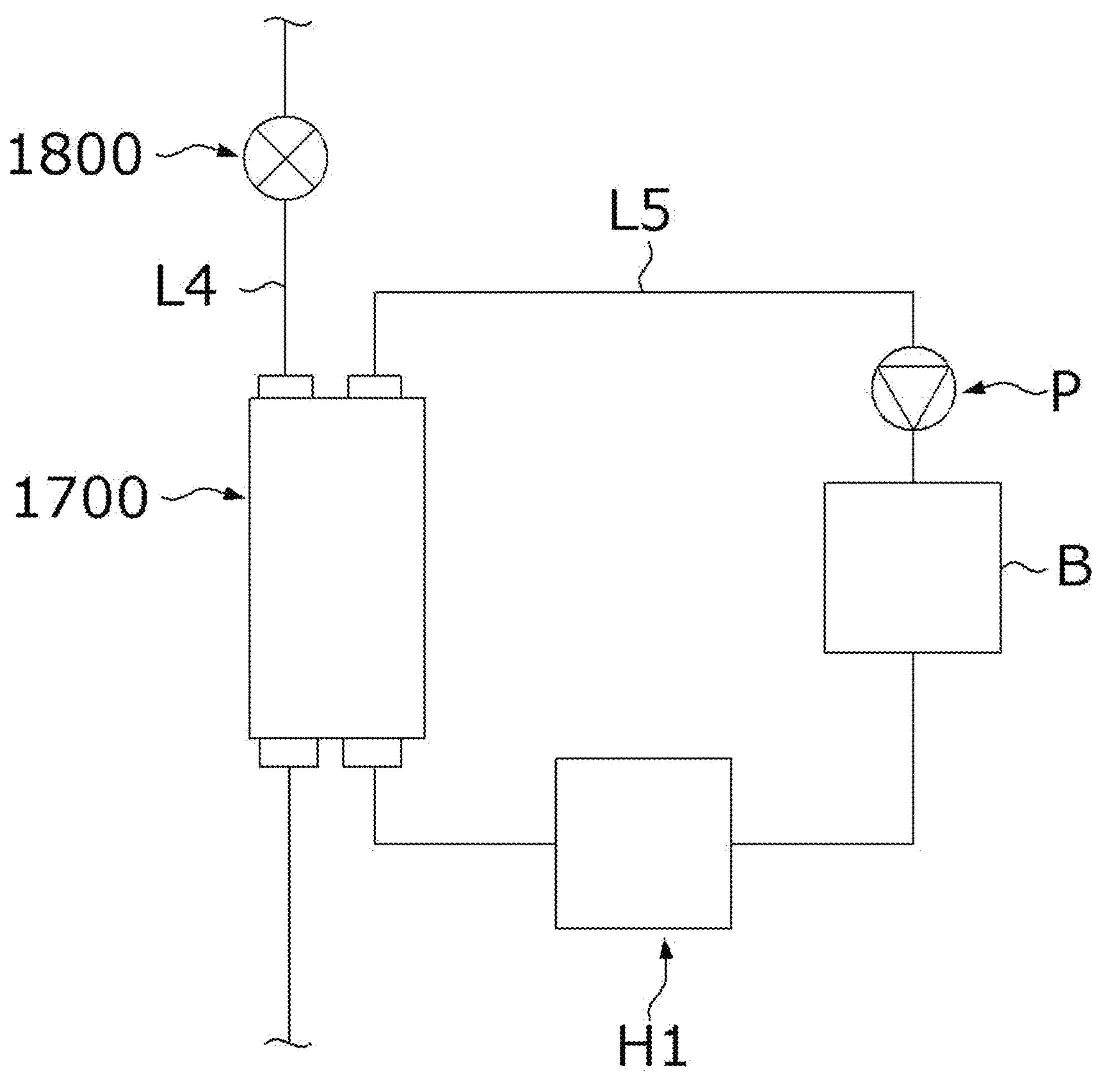
FIG. 22 is a view illustrating a coolant circulation structure connected to a chiller of the vehicle thermal management device according to the first embodiment.

FIG. 20 is a view illustrating a vehicle thermal management device according to the first embodiment to which the ball valve according to the first embodiment is applied, FIG. 21 is a view illustrating an arrangement relationship between constituent elements of a vapor injection module disposed in the vehicle thermal management device according to the first embodiment, and FIG. 22 is a view illustrating a coolant circulation structure connected to a chiller of the vehicle thermal management device according to the first embodiment.

With reference to FIGS. 20 to 22, the vehicle thermal management device S1 according to the first embodiment may include a first line L1 configured to connect a compressor 1100, an internal heat exchanger 1200, a vapor injection module 1300, an evaporator 1400, and an accumulator 1500 so that the heat exchange medium moves, a second line L2 configured to connect the vapor injection module 1300 and an external heat exchanger 1600, a third line L3 configured to connect the vapor injection module 1300 and the compressor 1100, and a fourth line L4 having one side connected to the first line L1 between the evaporator 1400 and the accumulator 1500, and the other side connected to the second line L2 between the external heat exchanger 1600 and the vapor injection module 1300. In this case, the heat exchange medium, which moves along the first line L1, the second line L2, the third line L3, and the fourth line L4, may be a refrigerant and referred to as a first heat exchange medium.

Further, the vapor injection module 1300 may include a first expansion means group G1 connected to the first line L1 at an outlet side of the internal heat exchanger 1200 based on the flow of the heat exchange medium, a second expansion means group G2 connected to the second line L2 at an outlet side of the external heat exchanger 1600 based on the flow of the heat exchange medium, and a first flow path CH1 configured to connect the first expansion means group G1, the second expansion means group G2, and an inlet 1311 of the gas-liquid separator 1310 by means of one gas-liquid separator 1310 and a first merging part 1320, and a second flow path CH2 configured to connect the gas-liquid separator 1310, the first expansion means group G1, and the second expansion means group G2 through a first branching part 1330 disposed at a side of a liquid outlet 1312 of the gas-liquid separator 1310. In this case, the first flow path CH1 may be referred to as a first inner flow path, and the second flow path CH2 may be referred to as a second inner flow path. In this case, the first expansion means group G1 may be referred to as a first expansion means group for heating because the first expansion means group G1 may be used in a heating mode, and the second expansion means group G2 may be referred to as a second expansion means group for cooling because the second expansion means group G2 may be used in a cooling mode.

Further, the first expansion means group G1 may include a third flow path CH3 configured to connect the first line L1 at the outlet side of the internal heat exchanger, the first expansion means 1340, and the second expansion means 1350 through a three-way valve type first expansion means 1340 including two inlets and one outlet, a two-way valve type second expansion means 1350, and a second branching part 1360. In this case, the third flow path CH3 may be referred to as a third inner flow path. Further, the first expansion means 1340 may be an electromagnetic three-way expansion valve, and the ball valve 1 according to the first embodiment may be used as the first expansion means 1340. Further, the second expansion means 1350 may be an electromagnetic two-way expansion valve.

Further, the second expansion means group G2 may include a fourth flow path CH4 configured to connect the second line L2 at the outlet side of the external heat exchanger 1600, the third expansion means 1370, and the fourth expansion means 1380 through a three-way valve type third expansion means 1370 including two inlets and one outlet, a two-way valve type fourth expansion means 1380, and a third branching part 1390. In this case, the fourth flow path CH4 may be referred to as a fourth inner flow path. Further, the third expansion means 1370 may be an electromagnetic three-way expansion valve, and the ball valve 1 according to the first embodiment may be used as the third expansion means 1370. Further, the fourth expansion means 1380 may be an electromagnetic two-way expansion valve.

Therefore, in the vehicle thermal management device S1, based on a gas-liquid separator 1310, two two-way expansion valves are disposed in parallel at a front end of the inlet 1311, and two three-way expansion valves are disposed in parallel at a rear end of the liquid outlet 1312, such that the single gas-liquid separator 1310 may be used in common.

Further, the vehicle thermal management device S1 may include a chiller 1700 and a fifth expansion means 1800 disposed in the fourth line L4.

Further, the vehicle thermal management device S1 may include a fifth line L5 connected to the chiller 1700 so that waste heat from a battery B is used, and the battery B disposed in the fifth line L5.

In this case, the vehicle thermal management device S1 may be implemented as a vehicle thermal management device with a compact size while adjusting cooling and heating in the occupant compartment by controlling the movement of the heat exchange medium through the modularized vapor injection module 1300 and the first line L1, the second line L2, the third line L3, and the fourth line L4 connected to the vapor injection module 1300.

Specifically, the vehicle thermal management device S1 may adjust cooling and heating in the occupant compartment by adjusting the heat exchange medium moving in the vapor injection module 1300 in accordance with an air conditioning mode. Further, the vehicle thermal management device with a compact size may be implemented by optimizing and modularizing the arrangement structure of the vapor injection module 1300.

The first line L1 may be a pipe disposed to circulate the first heat exchange medium based on the vapor injection module 1300.

Further, based on the flow of the first heat exchange medium, the compressor 1100, the internal heat exchanger 1200, the vapor injection module 1300, the evaporator 1400, and the accumulator 1500 may be disposed in the first line L1.

The compressor 1100 may compress the first heat exchange medium, which moves along the first line L1, and discharge the first heat exchange medium in a high-temperature, high-pressure gas state toward the internal heat exchanger 1200. Therefore, the first heat exchange medium may circulate in the vehicle heat exchange device. In this case, the compressor 1100 may be referred to as a compressor.

The internal heat exchanger 1200 may be disposed in an air conditioning casing AC of the air conditioning device and enable air, which is a heat exchange medium different from the first heat exchange medium, and the first heat exchange medium, which is compressed by the compressor 1100 and introduced into the internal heat exchanger 1200, to exchange heat with each other. Therefore, the internal heat exchanger 1200 may heat the interior of the vehicle. In this case, the internal heat exchanger 1200 may be referred to as a first heat exchanger or a first condenser and serve as a condenser in accordance with the air conditioning mode. Further, the air, which exchanges heat with the first heat exchange medium in the internal heat exchanger 1200, may be air introduced into the vehicle.

In the description of the internal heat exchanger 1200, the heat exchange between the air and the first heat exchange medium is described as an example. However, the present disclosure is not necessarily limited thereto. For example, a separate coolant line may be disposed, and a coolant, which moves along the coolant line, may exchange heat with the first heat exchange medium, such that the interior of the occupant compartment may be heated. Specifically, the interior of the occupant compartment may be heated by the heat exchange between the coolant and the refrigerant, i.e., the first heat exchange medium by using a water condenser type heat exchanger.

The vapor injection module 1300 may control a movement direction of the first heat exchange medium in accordance with whether to expand the first heat exchange medium, the distinction between the gaseous first heat exchange medium and the liquid first heat exchange medium, and the air conditioning mode.

In particular, the vapor injection module 1300 may include the first and second expansion means groups G1 and G2 each including the three-way valve type expansion means and the two-way valve type expansion means, the single gas-liquid separator 1310, and the plurality of inner flow paths. Therefore, the vapor injection module 1300 controls the expansion and movement of the first heat exchange medium introduced into the vapor injection module 1300 and supplies one of the gaseous and liquid first heat exchange media, which are separated by the gas-liquid separator 1310, to at least any one of the first line L1, the second line L2, and the third line L3. In this case, the first expansion means group G1 may include a first expansion means 1340 and a second expansion means 1350, and the second expansion means group G2 may include a third expansion means 1370 and a fourth expansion means 1380.

The gas-liquid separator 1310 may separate the introduced first heat exchange medium into the gaseous and liquid first heat exchange media and discharge the gaseous and liquid first heat exchange media by phase.

With reference to FIG. 21, the gas-liquid separator 1310 may include the inlet 1311 into which the first heat exchange medium is introduced, the liquid outlet 1312 from which the liquid first heat exchange medium is discharged, and a gas outlet 1313 from which the gaseous first heat exchange medium is discharged.

The inlet 1311 of the gas-liquid separator 1310 may be connected to the first expansion means group G1 and the second expansion means group G2 through the first flow path CH1.

Specifically, the inlet 1311 of the gas-liquid separator 1310 may be connected to the second expansion means 1350 and the fourth expansion means 1380 through the first merging part 1320 of the first flow path CH1. Further, one of the first heat exchange medium having passed through the internal heat exchanger 1200 and the first heat exchange medium having passed through the external heat exchanger 1600 may be introduced into the gas-liquid separator 1310 by controlling the second expansion means 1350 and the fourth expansion means 1380 in accordance with the air conditioning mode. Further, the first heat exchange medium introduced into the gas-liquid separator 1310 may be separated into the gaseous and liquid first heat exchange media by the gas-liquid separator 1310.

In this case, the two-way valve type second expansion means 1350 and the fourth expansion means 1380 are disposed at an upstream side of the gas-liquid separator 1310 based on the flow of the first heat exchange medium, and the first heat exchange medium having passed through any one of the second expansion means 1350 and the fourth expansion means 1380 is selectively supplied to the gas-liquid separator 1310, such that the vehicle heat exchange device S1 may configure the third line L3 only by using the pipe and excluding a check valve that has been disposed in the third line L3 connected to the gas outlet 1313. Therefore, the vehicle heat exchange device S1 may improve thermal efficiency by preventing a pressure loss or the like caused by the check valve. In addition, the vehicle heat exchange device S1 may use a space that has been occupied by the check valve, thereby improving a degree of design freedom.

The liquid outlet 1312 of the gas-liquid separator 1310 may be connected to the first expansion means 1340 of the first expansion means group G1 and the third expansion means 1370 of the second expansion means group G2 through the second flow path CH2. In this case, the liquid outlet 1312 may be disposed in a lower portion of the gas-liquid separator 1310 and improve efficiency in discharging the liquid refrigerant.

Specifically, the liquid outlet 1312 of the gas-liquid separator 1310 may be connected to the first expansion means 1340 and the third expansion means 1370 through the first branching part 1330 of the second flow path CH2. In this case, one side of the first expansion means 1340 may be connected to the second line L2, and one side of the third expansion means 1370 may be connected to the first line L1.

Further, the liquid first heat exchange medium may be moved to the evaporator 1400, the external heat exchanger 1600, or both the evaporator 1400 and the external heat exchanger 1600 by being controlled by the first expansion means 1340 and the third expansion means 1370 in accordance with the air conditioning mode.

A gas outlet 312 of the gas-liquid separator 1310 may be connected to the third flow path CH3. In this case, the vapor injection module 1300 may include a fifth flow path CH5 and connect the gas outlet 1313 and the third flow path CH3. In this case, the fifth flow path CH5 may be referred to as a fifth inner flow path.

Therefore, the gaseous first heat exchange medium discharged through the gas outlet 312 may be supplied to the compressor 1100.

The first merging part 1320 may be disposed in the first flow path CH1 disposed to be connected to the inlet 1311 of the gas-liquid separator 1310.

In this case, the first merging part 1320 may be a merging point at which the first heat exchange medium having passed through the internal heat exchanger 1200 and the first heat exchange medium having passed through the external heat exchanger 1600 are merged.

The first branching part 1330 may be disposed in the second flow path CH2 disposed to be connected to the liquid outlet 1312 of the gas-liquid separator 1310.

In this case, the first branching part 1330 may be a branching point at which the liquid first heat exchange medium branches and moves.

The first expansion means 1340 may constitute the first expansion means group G1 together with the second expansion means 1350 and be provided as a three-way valve type valve. Therefore, the first expansion means 1340 may control the movement direction of the first heat exchange medium and whether to expand the first heat exchange medium.

In addition, the first expansion means 1340 may include two inlets and one outlet.

A first inlet 1341, which is one of the two inlets of the first expansion means 1340, may be connected to the first line L1 disposed at the outlet side of the internal heat exchanger 1200 through the second branching part 1360 disposed in the third flow path CH3. In this case, the first inlet 1341 may correspond to the first housing hole 120 of the ball valve 1.

Further, a second inlet 1342, which is the other of the two inlets of the first expansion means 1340, may be connected to a part of the second flow path CH1 branching off from the second branching part 1360. In this case, the second inlet 1342 may correspond to the second housing hole 130 of the ball valve 1.

Further, a first outlet 1343, which is the outlet of the first expansion means 1340, may be connected to the second line L2 at the inlet side of the external heat exchanger 1600. In this case, the first outlet 1343 may correspond to the third housing hole 140 of the ball valve 1.

Therefore, the first heat exchange medium introduced through the first inlet 1341 may be discharged to the first outlet 1343 by the first expansion means 1340 and supplied to the external heat exchanger 1600 in accordance with the air conditioning mode. In addition, the first heat exchange medium introduced through the second inlet 1342 may be discharged to the first outlet 1343 by the first expansion means 1340 and supplied to the external heat exchanger 1600 in accordance with the air conditioning mode.

The second expansion means 1350 may constitute the first expansion means group G1 together with the first expansion means 1340 and be provided as a two-way valve type valve. Therefore, the second expansion means 1350 may control whether to move and expand the first heat exchange medium.

The inlet of the second expansion means 1350 may be connected to the first line L1 disposed at the outlet side of the internal heat exchanger 1200 through the second branching part 1360 disposed in the third flow path CH3.

Further, the outlet of the second expansion means 340 may be connected to the inlet 1311 of the gas-liquid separator 1310 through the first merging part 1320 disposed in the first flow path CH1.

The second expansion means 1350 may control the movement and expansion of the first heat exchange medium supplied to the gas-liquid separator 1310 in accordance with the air conditioning mode.

The second branching part 1360 may be disposed in the third flow path CH3 disposed to be connected to the first line L1 at the outlet side of the internal heat exchanger 1200.

In this case, the second branching part 1360 may be a branching point at which the first heat exchange medium discharged from the internal heat exchanger 1200 branches and moves.

The third expansion means 1370 may constitute the second expansion means group G2 together with the fourth expansion means 1380 and be provided as a three-way valve type valve. Therefore, the third expansion means 1370 may control the movement direction of the first heat exchange medium and whether to expand the first heat exchange medium.

In addition, the third expansion means 1370 may include two inlets and one outlet.

A third inlet 1371, which is one of the two inlets of the third expansion means 1370, may be connected to the second line L2 disposed at the outlet side of the external heat exchanger 1600 through the third branching part 1390 disposed in the third flow path CH3. In this case, the third inlet 1371 may correspond to the first housing hole 120 of the ball valve 1.

Further, a fourth inlet 1372, which is the other of the two inlets of the third expansion means 1370, may be connected to a part of the second flow path CH1 branching off from the second branching part 1360. In this case, the fourth inlet 1372 may correspond to the second housing hole 130 of the ball valve 1.

Further, a second outlet 1373, which is the outlet of the third expansion means 1370, may be connected to the first line L1 at the inlet side of the evaporator 1400. In this case, the second outlet 1373 may correspond to the third housing hole 140 of the ball valve 1.

Therefore, the first heat exchange medium introduced through the third inlet 1371 may be discharged to the second outlet 1373 by the third expansion means 1370 and supplied to the evaporator 1400 in accordance with the air conditioning mode. In addition, the first heat exchange medium introduced through the fourth inlet 1372 may be discharged to the second outlet 1373 by the third expansion means 1370 and supplied to the evaporator 1400 in accordance with the air conditioning mode.

The fourth expansion means 1380 may constitute the second expansion means group G2 together with the third expansion means 1370 and be provided as a two-way valve type valve. Therefore, the fourth expansion means 1380 may control whether to move and expand the first heat exchange medium.

The inlet of the fourth expansion means 1380 may be connected to the second line L2 disposed at the outlet side of the external heat exchanger 1600 through the third branching part 1390 disposed in the fourth flow path CH4.

Further, the outlet of the fourth expansion means 1380 may be connected to the inlet 1311 of the gas-liquid separator 1310 through the first merging part 1320 disposed in the first flow path CH1.

The second expansion means 1350 may control the movement and expansion of the first heat exchange medium supplied to the gas-liquid separator 1310 in accordance with the air conditioning mode.

The third branching part 1390 may be disposed in the fourth flow path CH4 disposed to be connected to the second line L2 at the outlet side of the external heat exchanger 1600.

In this case, the third branching part 1390 may be a branching point at which the first heat exchange medium discharged from the external heat exchanger 1600 branches and moves.

The first flow path CH1, the second flow path CH2, the third flow path CH3, the fourth flow path CH4, and the fifth flow path CH5 may be passageways disposed in the vapor injection module 1300 and configured to allow the first heat exchange medium to move therethrough.

The first flow path CH1 may connect the inlet 1311 of the gas-liquid separator 1310, the outlet of the second expansion means 1350, and the outlet of the fourth expansion means 1380 by using the first merging part 1320. In this case, one of the first heat exchange medium having passed through the second expansion means 1350 and the first heat exchange medium having passed through the fourth expansion means 1380 may be supplied to the gas-liquid separator 1310 by controlling the second expansion means 1350 and the fourth expansion means 1380.

The second flow path CH2 may connect the liquid outlet 1312 of the gas-liquid separator 1310, a second inlet 1342 of the first expansion means 1340, and a fourth inlet 1372 of the third expansion means 1370 by using the first branching part 1330. In this case, the liquid first heat exchange medium discharged from the gas-liquid separator 1310 may be supplied to the external heat exchanger 1600 through the first expansion means 1340, supplied to the evaporator 1400 through the third expansion means 1370, or supplied to both the evaporator 1400 and the external heat exchanger 1600 by being controlled by the first expansion means 1340 and the third expansion means 1370.

The third flow path CH3 may connect the outlet of the internal heat exchanger 1200, the first inlet 1341 of the first expansion means 1340, and the inlet of the second expansion means 1350 by using the second branching part 1360. In this case, the first heat exchange medium discharged from the internal heat exchanger 1200 may be supplied to the external heat exchanger 1600 through the first expansion means 1340 or supplied to the gas-liquid separator 1310 through the second expansion means 1350 by being controlled by the first expansion means 1340 and the second expansion means 1350.

The fourth flow path CH4 may connect the outlet of the external heat exchanger 1600, the third inlet 1371 of the third expansion means 1370, and the inlet of the fourth expansion means 1380 by using the third branching part 1390. In this case, the first heat exchange medium discharged from the external heat exchanger 1600 may be supplied to the gas-liquid separator 1310 through the fourth expansion means 1380 by being controlled by the third expansion means 1370 and the fourth expansion means 1380.

The fifth flow path CH5 may connect the gas outlet 1313 of the gas-liquid separator 1310 and the third line L3 connected to the inlet side of the compressor 1100. Therefore, the gaseous first heat exchange medium discharged from the gas outlet 1313 of the gas-liquid separator 1310 may be supplied to the compressor 1100.

The vapor injection module 1300 optimize the flow of the heat exchange medium by providing an arrangement relationship between the optimized components of the first expansion means group G1 including the first expansion means 1340 and the second expansion means 1350, the second expansion means group G2 including the third expansion means 1370 and the fourth expansion means 1380, the gas-liquid separator 1310, and the first branching part 1330. Further, the vapor injection module 1300 may improve the degree of design freedom of the vehicle thermal management device by implementing the compact size by means of the arrangement relationship. Further, it is possible to easily perform the assembling and repairing processes by modularizing the components of the first expansion means group G1, the second expansion means group G2, the gas-liquid separator 1310, and the first branching part 1330.

Figure 23:
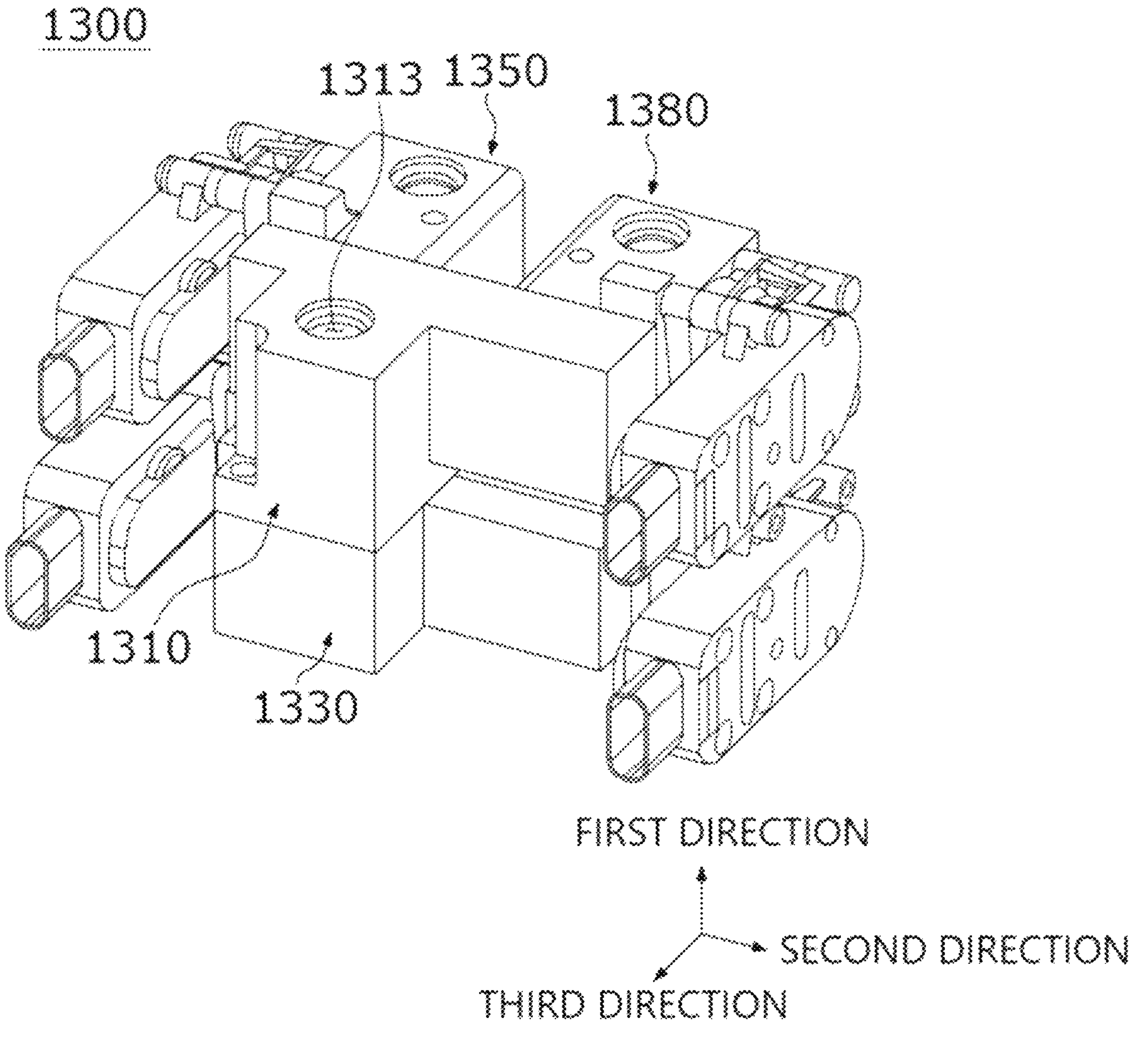
FIG. 23 is a perspective view illustrating the vapor injection module disposed in the vehicle thermal management device according to the first embodiment.
Figure 24:
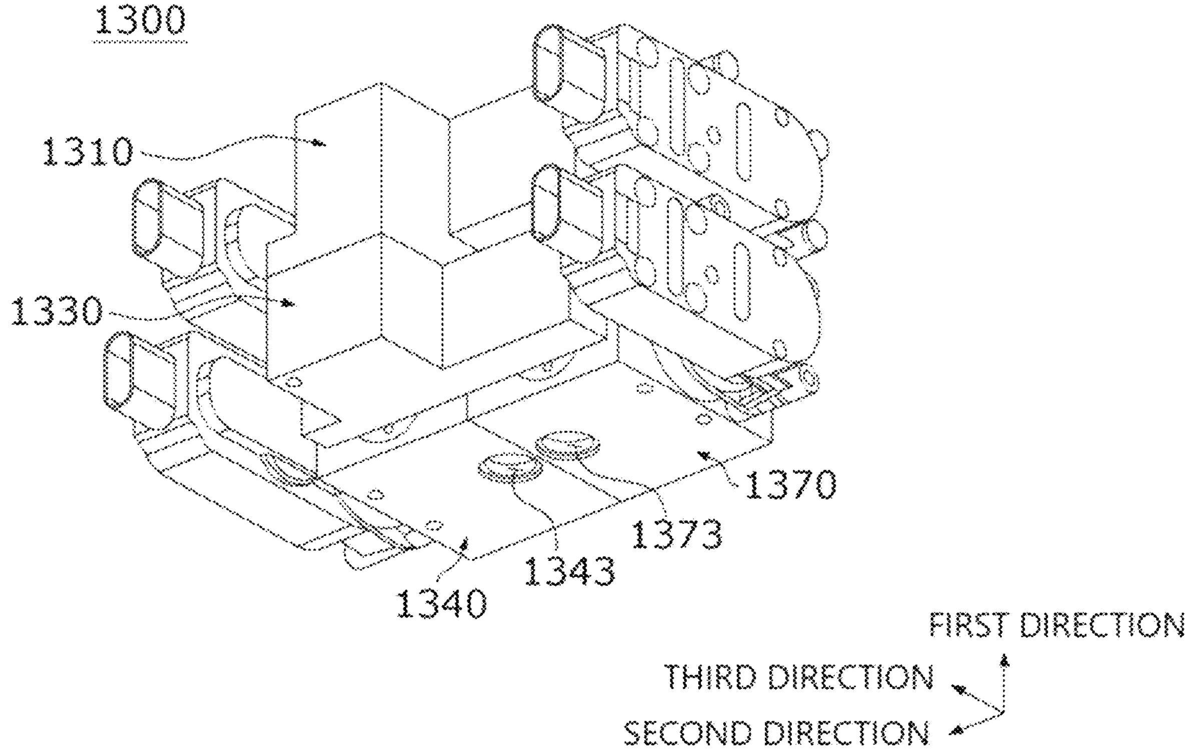
FIG. 24 is a bottom perspective view illustrating the vapor injection module disposed in the vehicle thermal management device according to the first embodiment.
Figure 25:
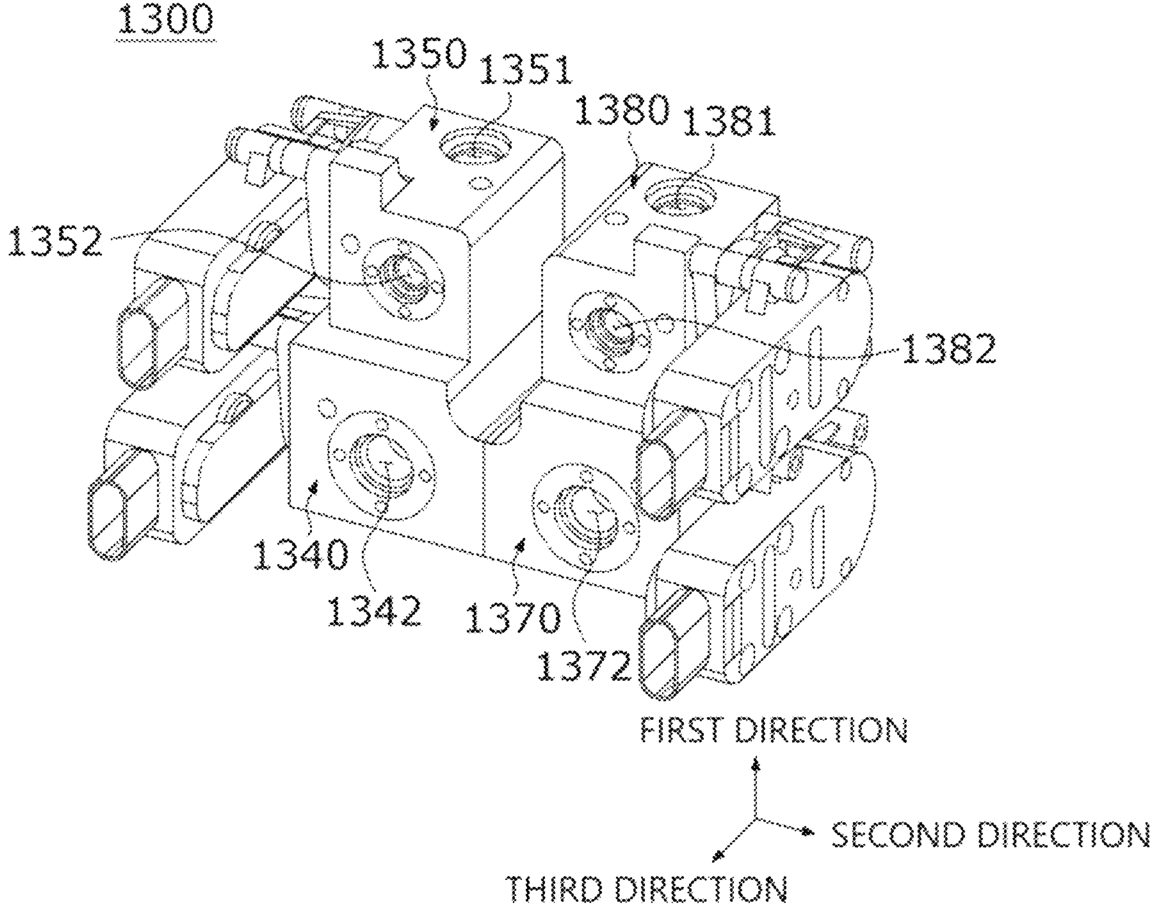
FIG. 25 is a perspective view illustrating a first expansion means group and a second expansion means group of the vapor injection module disposed in the vehicle thermal management device according to the first embodiment.

FIG. 23 is a perspective view illustrating the vapor injection module disposed in the vehicle thermal management device according to the first embodiment, FIG. 24 is a bottom perspective view illustrating the vapor injection module disposed in the vehicle thermal management device according to the first embodiment, and FIG. 25 is a perspective view illustrating the first expansion means group and the second expansion means group of the vapor injection module disposed in the vehicle thermal management device according to the first embodiment. A first direction, a second direction, and a third direction illustrated in FIGS. 23 to 25 may mean different directions and be perpendicular to one another. Further, the first direction may be an upward/downward direction or a vertical direction. In this case, in consideration of a position of the gas outlet 1313 of the gas-liquid separator 1310, an upward direction based on the drawing may be an upward direction, and a downward direction based on the drawing may be a downward direction. Further, in a plan view, the second and third directions may be horizontal directions and be perpendicular to each other. Further, the second direction may be an axial direction.

With reference to FIGS. 23 to 25, the vapor injection module 1300 may include the optimized components of the first expansion means group G1 including the first expansion means 1340 and the second expansion means 1350, the second expansion means group G2 including the third expansion means 1370 and the fourth expansion means 1380, the gas-liquid separator 1310, and the first branching part 1330. In this case, the first merging part 1320 may be disposed in a unit, which constitutes the gas-liquid separator 1310, i.e., a gas-liquid separator housing. Further, the second branching part 1360 may be disposed in a unit, which constitutes the second expansion means 1350, i.e., a second expansion means housing. Further, the third branching part 1390 may be disposed in a unit, which constitutes the fourth expansion means 1380, i.e., a fourth expansion means housing.

In addition, the vapor injection module 1300 may include an actuator disposed to correspond to the first expansion means 1340, the second expansion means 1350, the third expansion means 1370, and the fourth expansion means 1380. Therefore, the first expansion means 1340, the second expansion means 1350, the third expansion means 1370, and the fourth expansion means 1380 may be independently operated by the actuator.

In this case, an example is described in which the first expansion means 1340, the second expansion means 1350, the third expansion means 1370, the fourth expansion means 1380, the gas-liquid separator 1310, and the first branching part 1330 may each be provided as a hexahedral unit. However, the present disclosure is not necessarily limited thereto. The first expansion means 1340, the second expansion means 1350, the third expansion means 1370, the fourth expansion means 1380, the gas-liquid separator 1310, and the first branching part 1330 may be formed in various shapes as long as the arrangement relationship therebetween is satisfied.

Meanwhile, the vapor injection module 1300 is disposed below the gas-liquid separator 1310 while constituting the first branching part 1330, which is connected to the liquid outlet 1312 of the gas-liquid separator 1310, as a separate unit, thereby optimizing the flow of the liquid first heat exchange medium by using the weight thereof. In this case, a gas outlet 133 of the gas-liquid separator 1310 may be disposed to be directed upward because the gas outlet 133 is an outlet from which the gaseous first heat exchange medium is discharged.

With reference to FIG. 6, the first expansion means 1340 and the second expansion means 1350 may be disposed to overlap each other in the upward/downward direction, i.e., the first direction. In this case, the inlet 1311 of the gas-liquid separator 1310 may be disposed to be higher than the liquid outlet 1312 in consideration of the weight of the first heat exchange medium in accordance with the phase in the gas-liquid separator 1310. Therefore, the second expansion means 1350 connected to the inlet 1311 of the gas-liquid separator 1310 may be disposed above the first expansion means 1340.

In addition, the third expansion means 1370 and the fourth expansion means 1380 may be disposed to overlap each other in the upward/downward direction, i.e., the first direction. In this case, the inlet 1311 of the gas-liquid separator 1310 may be disposed to be higher than the liquid outlet 1312 in consideration of the weight of the first heat exchange medium in accordance with the phase in the gas-liquid separator 1310. Therefore, the fourth expansion means 1380 connected to the inlet 1311 of the gas-liquid separator 1310 may be disposed above the third expansion means 1370.

In this case, the first expansion means 1340 and the third expansion means 1370 may be disposed to overlap each other in the second direction, and the second expansion means 1350 and the fourth expansion means 1380 may be disposed to overlap each other in the second direction, which may provide the optimized arrangement relationship.

In addition, in a plan view, the second expansion means 1350 and the fourth expansion means 1380 may be disposed to overlap the gas-liquid separator 1310 in the third direction. In this case, an inlet 351 of the second expansion means 1350 may be disposed to be directed upward, and an outlet 352 of the second expansion means 1350 may be disposed to be directed toward the gas-liquid separator 1310. Further, an inlet 1381 of the fourth expansion means 1380 may be disposed to be directed upward, and an outlet 1382 of the fourth expansion means 1380 may be disposed to be directed toward the gas-liquid separator 1310. In this case, an inlet 1351 of the second expansion means 1350 may be connected to the outlet side of the internal heat exchanger 1200. Further, the inlet 1381 of the fourth expansion means 1380 may be connected to the outlet side of the external heat exchanger 1600.

In addition, in a plan view, the first expansion means 1340 and the third expansion means 1370 may be disposed to overlap the first branching part 1330 in the third direction. In this case, the second inlet 1342 of the first expansion means 1340 may be disposed to be directed toward the first branching part 1330. Further, the fourth inlet 1372 of the third expansion means 1370 may be disposed to be directed toward the first branching part 1330.

As described above, the vapor injection module 1300 may define the optimally disposed module by providing the arrangement relationship between the first expansion means 1340, the second expansion means 1350, the third expansion means 1370, and the fourth expansion means 1380 based on the arrangement relationship between the gas-liquid separator 1310 and the first branching part 1330.

The evaporator 1400 is installed in the air conditioning casing AC of the air conditioning device, disposed in the first line L1, and supplied with the low-temperature, low-pressure first heat exchange medium discharged from the third expansion means 1370. In this case, the air, which flows in the air conditioning casing AC by means of a blower, changes to cold air by exchanging heat with the first heat exchange medium in the evaporator 1400 while passing through the evaporator 1400, and then the cold air is discharged into the interior of the vehicle and cools the interior of the occupant compartment. That is, the evaporator 1400 may cool the interior of the occupant compartment by inducing heat exchange between the first heat exchange medium and the air discharged into the occupant compartment. In this case, the evaporator may be referred to as a third heat exchanger.

In this case, the internal heat exchanger 1200 and the evaporator 1400 may be disposed together in the air conditioning casing AC and control the cooling and heating of the interior. Further, a temperature adjustment door TD disposed in the air conditioning casing AC may adjust a temperature of the interior of the vehicle by adjusting the amount of air that has performed the heat exchange by means of the internal heat exchanger 1200 and the evaporator 1400.

The accumulator 1500 may be installed on the first line L1 at the inlet side of the compressor 1100. Further, the first heat exchange medium introduced into the accumulator 1500 may be separated into the liquid first heat exchange medium and the gaseous first heat exchange medium, and the liquid first heat exchange medium or the gaseous first heat exchange medium may be selectively discharged.

In this case, a second merging part 2000, in which the first heat exchange media having moved along the first line L1 and the fourth line L4 are merged, may be disposed at the inlet side of the accumulator 1500. Therefore, the first heat exchange medium having passed through the evaporator 1400 by the third expansion means 1370 may be supplied to the accumulator 1500, the first heat exchange medium having passed through the chiller 1700 by the fifth expansion means 1800 may be supplied to the accumulator 1500, or the first heat exchange medium having passed through the evaporator 1400 and the first heat exchange medium having passed through the chiller 1700 may be merged and supplied to the accumulator 1500.

The external heat exchanger 1600 may be disposed at a front side of the vehicle and condense the first heat exchange medium by dissipating heat by allowing air (air present outside the interior of the vehicle), which is introduced into vehicle, and the first heat exchange medium to exchange heat with each other. In this case, the external heat exchanger 1600 may be referred to as a second heat exchanger or a second condenser.

In this case, the external heat exchanger 1600 may be disposed on the second line L2. Further, the first heat exchange medium having passed through the first expansion means 1340 may be supplied.

The chiller 1700 and the fifth expansion means 1800 may be disposed on the fourth line L4 to use waste heat. In this case, the fifth expansion means 1800 may be provided as a two-way valve type. For example, the fifth expansion means 1800 may be a two-way expansion valve.

The fourth line L4 may connect the first line L1 between the evaporator 1400 and the accumulator 1500 and the second line L2 between the external heat exchanger 1600 and the vapor injection module 1300 by using a fourth branching part 900 and the second merging part 2000. Therefore, a part of the first heat exchange medium having passed through the external heat exchanger 1600 may move to the fourth line L4. Further, the first heat exchange medium having passed through the chiller 1700 and the fifth expansion means 1800 may move to the accumulator 1500.

The chiller 1700 may be a heat exchanger configured to enable the first heat exchange medium having passed through the fifth expansion means 1800 and a second heat exchange medium moving along a fifth line L5 to exchange heat with each other. In this case, the chiller 1700 may be referred to as a fourth heat exchanger. Further, the second heat exchange medium may be a coolant.

Because the first heat exchange medium may exchange heat with the second heat exchange medium in the chiller 1700, the vehicle thermal management device may use waste heat from the battery B as a heat source.

The fifth expansion means 1800 may be disposed at the inlet side of the chiller 1700. Further, the fifth expansion means 1800 may control whether to expand and move the first heat exchange medium moving along the fourth line L4. In this case, the fifth expansion means 1800 may be an electromagnetic two-way expansion valve.

The vehicle heat exchange device may include a battery cooling device disposed to use waste heat from the battery B.

With reference to FIGS. 20 and 22, the battery cooling device may include the fifth line L5 in which the second heat exchange medium circulates, and the battery B and a pump P disposed on the fifth line L5. In addition, the battery cooling device may further include a first heater H1.

The fifth line L5 may be disposed in the vehicle so that the second heat exchange medium may circulate. Therefore, the second heat exchange medium circulating through the fifth line L5 may remove heat generated from the battery B. In this case, the fifth line L5 may be provided as a pipe or the like.

Further, the fifth line L5 may be disposed to pass through the chiller 1700. Therefore, in the chiller 1700, the second heat exchange medium transmitted along the fifth line L5 may exchange heat with the first heat exchange medium flowing along the fourth line L4. That is, the heat generated from the battery B may be transferred from the chiller 1700 to the accumulator 1500.

The pump P transmits the second heat exchange medium along the fifth line L5. Therefore, the high-temperature second heat exchange medium, which has absorbed heat generated from the battery B, may be circulated by the pump P and exchange heat with the first heat exchange medium while passing through the chiller 1700.

The first heater H1 may heat the second heat exchange medium transmitted along the fifth line L5. As illustrated in FIG. 3, the first heater H1 may be disposed at the outlet side of the battery B based on the flow of the second heat exchange medium. However, the present disclosure is not necessarily limited thereto. In this case, the first heater H1 may be referred to as a first heater.

Meanwhile, the vehicle thermal management device may further include a second heater H2 disposed in the air conditioning casing AC. In this case, a positive temperature coefficient heater (PTC heater) may be used as the second heater H2. Therefore, the PTC heater may improve quality in cooling and heating the interior of the vehicle by assisting in cooling and heating the interior of the vehicle.

The vehicle thermal management device according to the embodiment may include a plurality of air conditioning modes.

Figure 26:
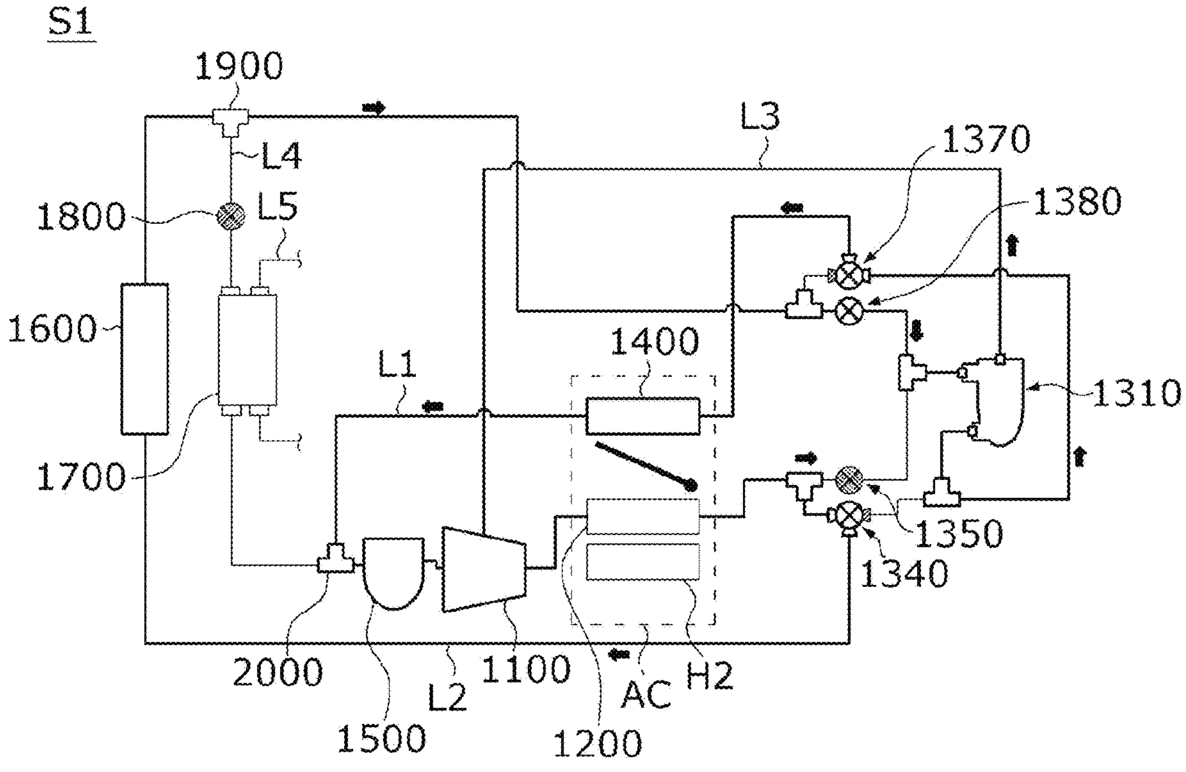
FIG. 26 is a view illustrating a cooling/dehumidification mode of the vehicle thermal management device according to the first embodiment.

FIG. 26 is a view illustrating a cooling/dehumidification mode of the vehicle thermal management device according to the embodiment. In this case, the arrow illustrated in FIG. 26 may indicate the flow of the heat exchange medium.

In the cooling/dehumidification mode of the vehicle thermal management device S1, the vehicle thermal management device S1 may cool and dehumidify the interior of the vehicle.

With reference to FIGS. 20, 21, and 26, in the cooling/dehumidification mode, the first heat exchange medium having passed through the internal heat exchanger 1200 may be introduced into the gas-liquid separator 1310 through the first expansion means 1340, the external heat exchanger 1600, and the fourth expansion means 1380, the gaseous first heat exchange medium separated by the gas-liquid separator 1310 may move to the compressor 1100 through the third line L3, and the liquid first heat exchange medium separated by the gas-liquid separator 1310 may move to the evaporator 1400 through the third expansion means 1370.

Specifically, the first heat exchange medium having passed through the compressor 1100 and the internal heat exchanger 1200 may be moved to the external heat exchanger 1600 by the first expansion means 1340 and the second expansion means 1350.

In this case, the second inlet 1342 of the first expansion means 1340 and the second expansion means 1350 are in a closed state. For example, the ball 200 of the ball valve 1 according to the first embodiment, which is provided as the first expansion means 1340, may be positioned at the second position. Therefore, the first heat exchange medium having passed through the internal heat exchanger 1200 may bypass the gas-liquid separator 1310 and move to the external heat exchanger 1600. In the cooling/dehumidification mode, the first expansion means 1340 may operate in a bypass mode because the first expansion means 1340 may perform control to allow the first heat exchange medium to bypass the gas-liquid separator 1310 without expanding the first heat exchange medium.

Further, the first heat exchange medium having passed through the external heat exchanger 1600 may be moved to the gas-liquid separator 1310 by the third expansion means 1370, the fourth expansion means 1380, and the fifth expansion means 1800.

In this case, the third inlet 1371 of the third expansion means 1370 and the fifth expansion means 1800 are in a closed state.

Further, the first heat exchange medium is separated into the gaseous and liquid first heat exchange media in the gas-liquid separator 1310.

Further, the liquid first heat exchange medium is expanded by the third expansion means 1370 and then sequentially moved to the evaporator 1400, the accumulator 1500, and the compressor 1100. For example, the ball 200 of the ball valve 1 according to the first embodiment, which is provided as the third expansion means 1370, may be positioned at the fifth position. Therefore, the liquid first heat exchange medium may be expanded by the third expansion means 1370 and then moved to the evaporator 1400, i.e., the third heat exchanger. In the cooling mode, the third expansion means 1370 may operate in a vapor injection mode because the third expansion means 1370 expands the first heat exchange medium and provide the first heat exchange medium to the evaporator 1400.

Further, the gaseous first heat exchange medium may move to the compressor 1100 through the third line L3.

That is, in the cooling/dehumidification mode of the vehicle thermal management device S1, the refrigerant having passed through the internal heat exchanger 1200, i.e., the first heat exchanger may be introduced into the gas-liquid separator 1310 through the first expansion means 1340, the external heat exchanger 1600, i.e., the second heat exchanger, and the fourth expansion means 350, the gaseous refrigerant separated by the gas-liquid separator 1310 may be moved to the compressor 1100, and the liquid refrigerant separated by the gas-liquid separator 1310 may be expanded by the third expansion means 1370 and then moved to the evaporator 1400, i.e., the third heat exchanger.

In this case, the refrigerant having passed through the internal heat exchanger 1200, i.e., the first heat exchanger may be expanded only by the fourth expansion means 1380 without being expanded by the first expansion means 1340 while moving to the first expansion means 1340, the external heat exchanger 1600, i.e., the second heat exchanger, the fourth expansion means 1380, and the gas-liquid separator 1310.

Therefore, in the cooling/dehumidification mode of the vehicle thermal management device S1, the single gas-liquid separator 1310 of the vehicle thermal management device S1 may improve the cooling efficiency by about 10% while improving the cooling performance by about 15% in comparison with a heat pump system in the related art in which the vapor injection system is used.

Figure 27:
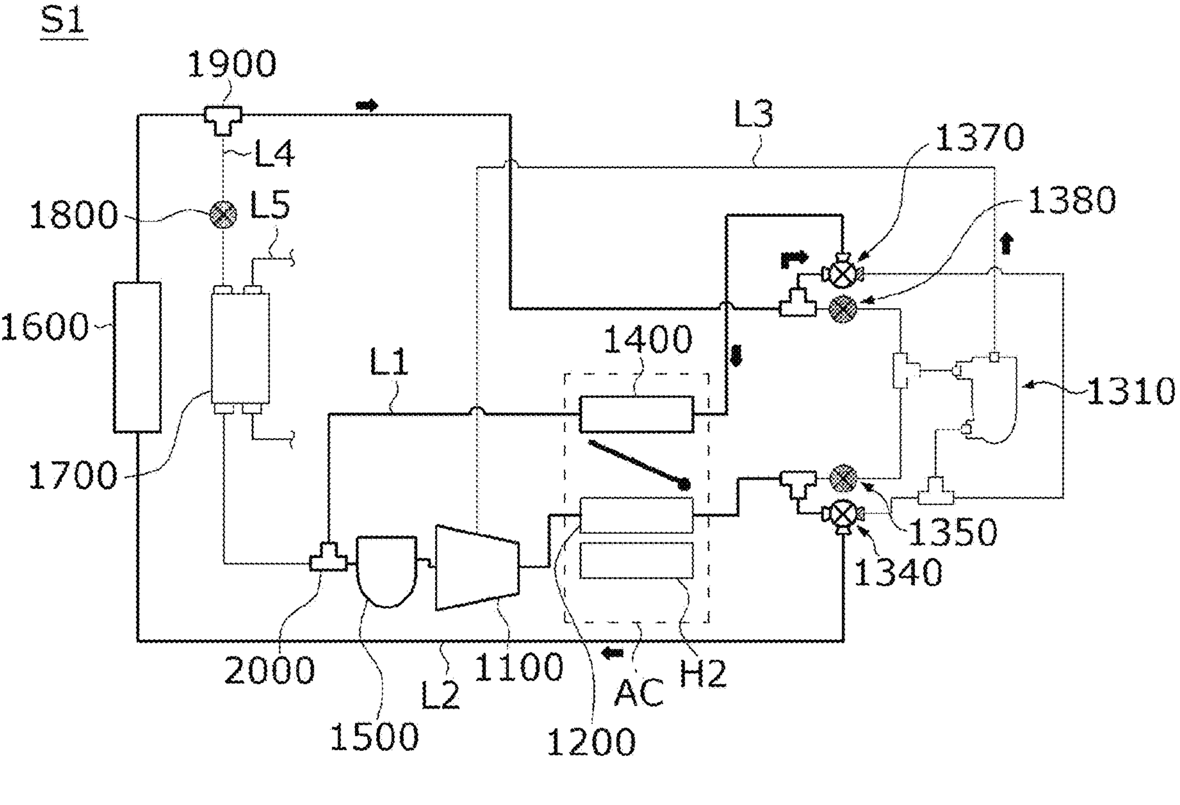
FIG. 27 is a view illustrating a cooling mode of the vehicle thermal management device according to the first embodiment.

FIG. 27 is a view illustrating a cooling mode of the vehicle thermal management device according to the embodiment. In this case, the arrow illustrated in FIG. 27 may indicate the flow of the heat exchange medium.

In the cooling mode of the vehicle thermal management device S1, the vehicle thermal management device S1 may cool the interior of the vehicle.

With reference to FIGS. 20, 21, and 27, in the cooling mode, the first heat exchange medium having passed through the internal heat exchanger 1200 is introduced into the evaporator 1400 through the first expansion means 1340, the external heat exchanger 1600, and the third expansion means 1370 and then circulates while moving back to the internal heat exchanger 1200 through the accumulator 1500 and the compressor 1100. Therefore, the first heat exchange medium having passed through the internal heat exchanger 1200 may bypass the gas-liquid separator 1310 and be introduced into the evaporator 1400.

Specifically, the first heat exchange medium having passed through the compressor 1100 and the internal heat exchanger 1200 may be moved to the external heat exchanger 1600 by the first expansion means 1340 and the second expansion means 1350.

In this case, the second inlet 1342 of the first expansion means 1340 and the second expansion means 1350 are in a closed state. For example, the ball 200 of the ball valve 1 according to the first embodiment, which is provided as the first expansion means 1340, may be positioned at the second position. Therefore, the first heat exchange medium having passed through the internal heat exchanger 1200 may bypass the gas-liquid separator 1310 and move to the external heat exchanger 1600. In the cooling mode, the first expansion means 1340 may operate in a bypass mode because the first expansion means 1340 may perform control to allow the first heat exchange medium to bypass the gas-liquid separator 1310 without expanding the first heat exchange medium.

Further, the first heat exchange medium having passed through the external heat exchanger 1600 may be moved to the evaporator 1400 by the third expansion means 1370, the fourth expansion means 1380, and the fifth expansion means 1800.

In this case, the fourth inlet 1372 of the third expansion means 1370, the fourth expansion means 1380, and the fifth expansion means 1800 are in a closed state. For example, the ball 200 of the ball valve 1 according to the first embodiment, which is provided as the third expansion means 1370, may be positioned at the second position. Therefore, the first heat exchange medium having passed through the external heat exchanger 1600 may bypass the gas-liquid separator 1310 and move to the evaporator 1400. In the cooling mode, the third expansion means 1370 may operate in a non-vapor injection mode because the third expansion means 1370 may perform control to allow the first heat exchange medium to bypass the gas-liquid separator 1310 without expanding the first heat exchange medium and using the gaseous first heat exchange medium.

That is, in the cooling mode of the vehicle thermal management device S1, the refrigerant having passed through the internal heat exchanger 1200 may bypass the gas-liquid separator 1310 while moving to the evaporator 1400 through the first expansion means 1340, the external heat exchanger 1600, and the third expansion means 1370. Therefore, the vehicle thermal management device S1 may cool the interior of the occupant compartment.

Figure 28:
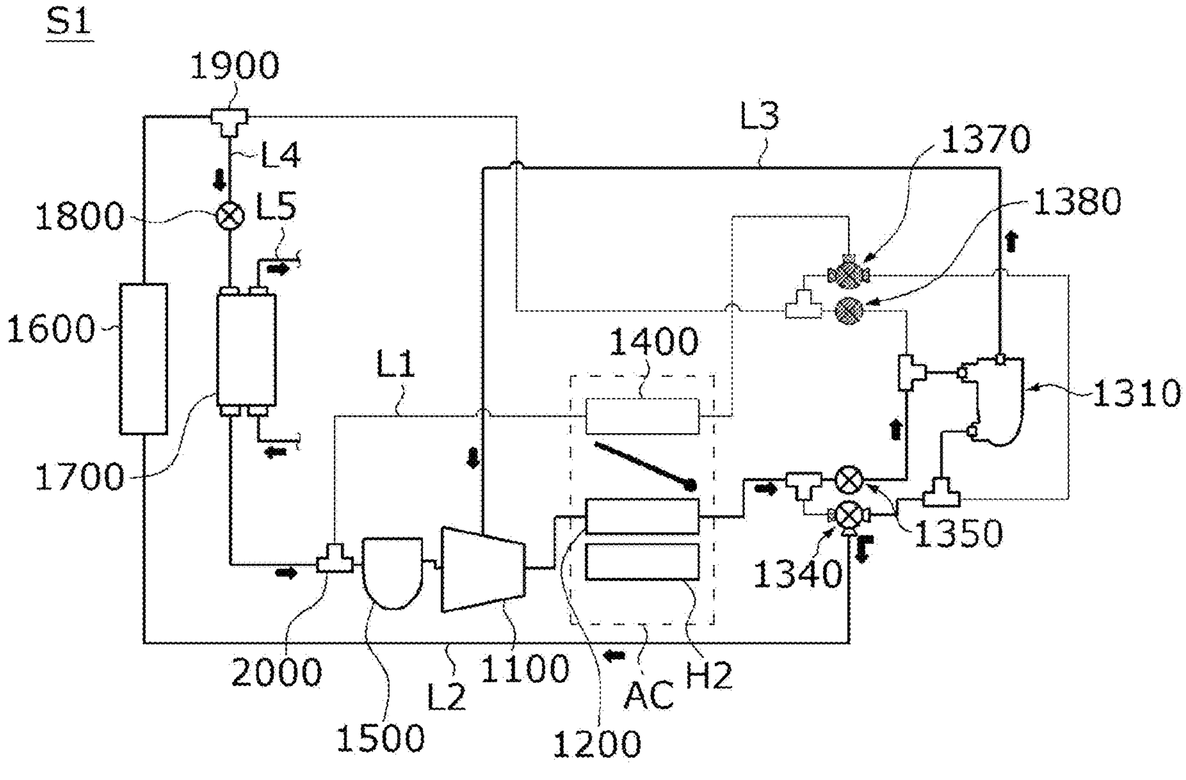
FIG. 28 is a view illustrating a heating/dehumidification mode of the vehicle thermal management device according to the first embodiment.

FIG. 28 is a view illustrating a heating/dehumidification mode of the vehicle thermal management device according to the embodiment. In this case, the arrow illustrated in FIG. 28 may indicate the flow of the heat exchange medium.

In the heating/dehumidification mode of the vehicle thermal management device S1, the vehicle thermal management device may heat and dehumidify the interior of the vehicle.

With reference to FIGS. 20, 21, 22, and 28, in the heating/dehumidification mode, the first heat exchange medium having passed through the internal heat exchanger 1200 may be introduced into the gas-liquid separator 1310 through the second expansion means 1350, the gaseous first heat exchange medium separated by the gas-liquid separator 1310 may move to the compressor 1100 through the third line L3, and the liquid first heat exchange medium separated by the gas-liquid separator 1310 may sequentially move to the external heat exchanger 1600, the fifth expansion means 1800, the chiller 1700, the accumulator 1500, and the compressor 1100 through the first expansion means 1340.

Specifically, the first heat exchange medium having passed through the compressor 1100 and the internal heat exchanger 1200 may be moved to the gas-liquid separator 1310 by the first expansion means 1340, the second expansion means 1350, and the fourth expansion means 1380.

In this case, the first inlet 1341 of the first expansion means 1340 and the fourth expansion means 1380 are in a closed state. For example, the ball 200 of the ball valve 1 according to the first embodiment, which is provided as the first expansion means 1340, may be positioned at the fifth position. Therefore, the first heat exchange medium having passed through the internal heat exchanger 1200 may move to the gas-liquid separator 1310.

Further, the first heat exchange medium is separated into the gaseous and liquid first heat exchange media in the gas-liquid separator 1310.

Further, the liquid first heat exchange medium is moved to the external heat exchanger 1600 by the first expansion means 1340 and the third expansion means 1370. In this case, the ball 200 of the ball valve 1 according to the first embodiment, which is provided as the third expansion means 1370, is positioned at the first position, and the ball 200 of the ball valve 1 according to the first embodiment, which is provided as the first expansion means 1340, is positioned at the fifth position. Therefore, the liquid first heat exchange medium separated by the gas-liquid separator 1310 may be expanded by the first expansion means 1340 and then moved to the external heat exchanger 1600, i.e., the second heat exchanger. In the heating/dehumidification mode, the first expansion means 1340 may operate in a vapor injection mode because the first expansion means 1340 expands the first heat exchange medium and provides the first heat exchange medium to the external heat exchanger 1600, and the third expansion means 1370 may operate in a closed mode in which the movement of the first heat exchange medium is blocked.

Further, the first heat exchange medium having passed through the external heat exchanger 1600 is expanded by the fifth expansion means 1800 and then sequentially moved to the chiller 1700, the accumulator 1500, and the compressor 1100. When the first heat exchange medium passes through the chiller 1700, the first heat exchange medium exchanges heat with the second heat exchange medium, which moves along the fifth line L5, in the chiller 1700, such that waste heat from the battery B may be used.

Further, the gaseous first heat exchange medium moves to the compressor 1100 through the third line L3 and then merges with the first heat exchange medium having moved into the compressor 1100 through the accumulator 1500.

That is, in the heating/dehumidification mode of the vehicle thermal management device S1, the refrigerant having passed through the internal heat exchanger 1200, i.e., the first heat exchanger is expanded by the second expansion means 1350 and then introduced into the gas-liquid separator 1310. Further, the gaseous refrigerant separated by the gas-liquid separator 1310 moves to the compressor 1100. Further, the liquid refrigerant separated by the gas-liquid separator 1310 may be expanded by the first expansion means 1340, pass through the external heat exchanger 1600, i.e., the second heat exchanger, and then move to the compressor 1100 through the chiller 1700.

Therefore, in the heating/dehumidification mode of the vehicle thermal management device S1, the single gas-liquid separator 1310 of the vehicle thermal management device S1 may reduce electric power, which is required for the heating/dehumidification mode, by about 10% while improving the heating performance by about 20% in comparison with the heat pump system in the related art in which the vapor injection system is used.

Figure 29:
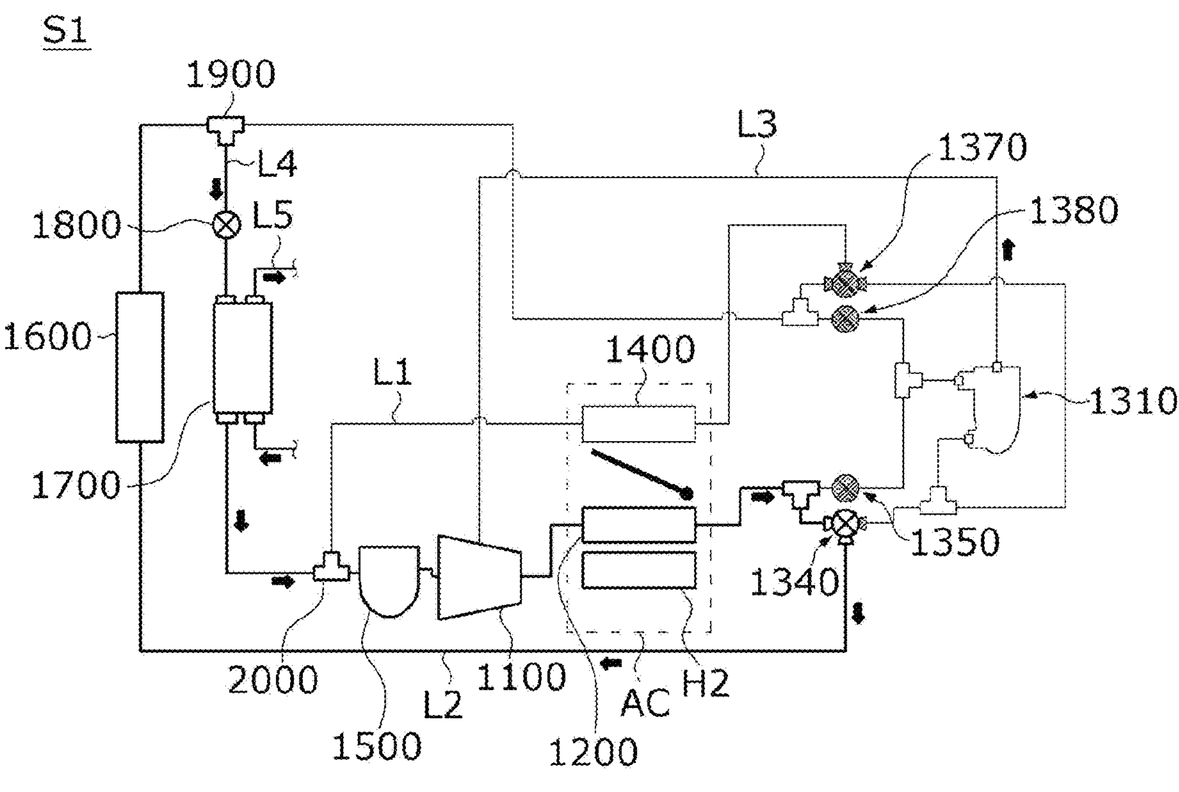
FIG. 29 is a view illustrating a heating mode of the vehicle thermal management device according to the first embodiment.

FIG. 29 is a view illustrating a heating mode of the vehicle thermal management device according to the embodiment. In this case, the arrow illustrated in FIG. 29 may indicate the flow of the heat exchange medium.

In the heating mode of the vehicle thermal management device S1, the vehicle thermal management device S1 may heat the interior of the vehicle.

With reference to FIGS. 20, 21, 22, and 29, in the heating mode, the first heat exchange medium having passed through the internal heat exchanger 1200 circulates while moving back to the internal heat exchanger 1200 through the first expansion means 1340, the external heat exchanger 1600, the chiller 1700, the accumulator 1500, and the compressor 1100.

Specifically, the first heat exchange medium having passed through the compressor 1100 and the internal heat exchanger 1200 may be moved to the external heat exchanger 1600 by the first expansion means 1340 and the second expansion means 1350.

In this case, the second inlet 1342 of the first expansion means 1340 and the second expansion means 1350 are in a closed state. For example, the ball 200 of the ball valve 1 according to the first embodiment, which is provided as the first expansion means 1340, may be positioned at the second position. Therefore, the first heat exchange medium having passed through the internal heat exchanger 1200 may bypass the gas-liquid separator 1310 and move to the external heat exchanger 1600. In the heating mode, the first expansion means 1340 may operate in a non-vapor injection mode because the first expansion means 1340 may perform control to allow the first heat exchange medium to bypass the gas-liquid separator 1310 without expanding the first heat exchange medium.

Further, the first heat exchange medium having passed through the external heat exchanger 1600 moves to the chiller 1700.

In this case, the ball 200 of the ball valve 1 according to the first embodiment, which is provided as the third expansion means 1370, is positioned at the first position, and the fourth expansion means 1380 is in a closed state. In the heating mode, the third expansion means 1370 may operate in a closed mode in which the movement of the first heat exchange medium is blocked.

Therefore, the first heat exchange medium having passed through the external heat exchanger 1600 is expanded by the fifth expansion means 1800 and then sequentially moved to the chiller 1700, the accumulator 1500, and the compressor 1100. When the first heat exchange medium passes through the chiller 1700, the first heat exchange medium exchanges heat with the second heat exchange medium, which moves along the fifth line L5, in the chiller 1700, such that waste heat from the battery B may be used.

That is, in the heating mode of the vehicle thermal management device S1, the refrigerant having passed through the internal heat exchanger 1200, i.e., the first heat exchanger is moved to the external heat exchanger 1600 by the first expansion means 1340 and the second expansion means 1350 and circulated by the third expansion means 1370, the fourth expansion means 1380, and the fifth expansion means 1800 while using waste heat from the chiller 1700, which may improve the heating performance and quality of the vehicle thermal management device S1.

Meanwhile, in the heating/dehumidification mode and the heating mode of the vehicle thermal management device S1, the second heater H2 may operate.

Figure 30:
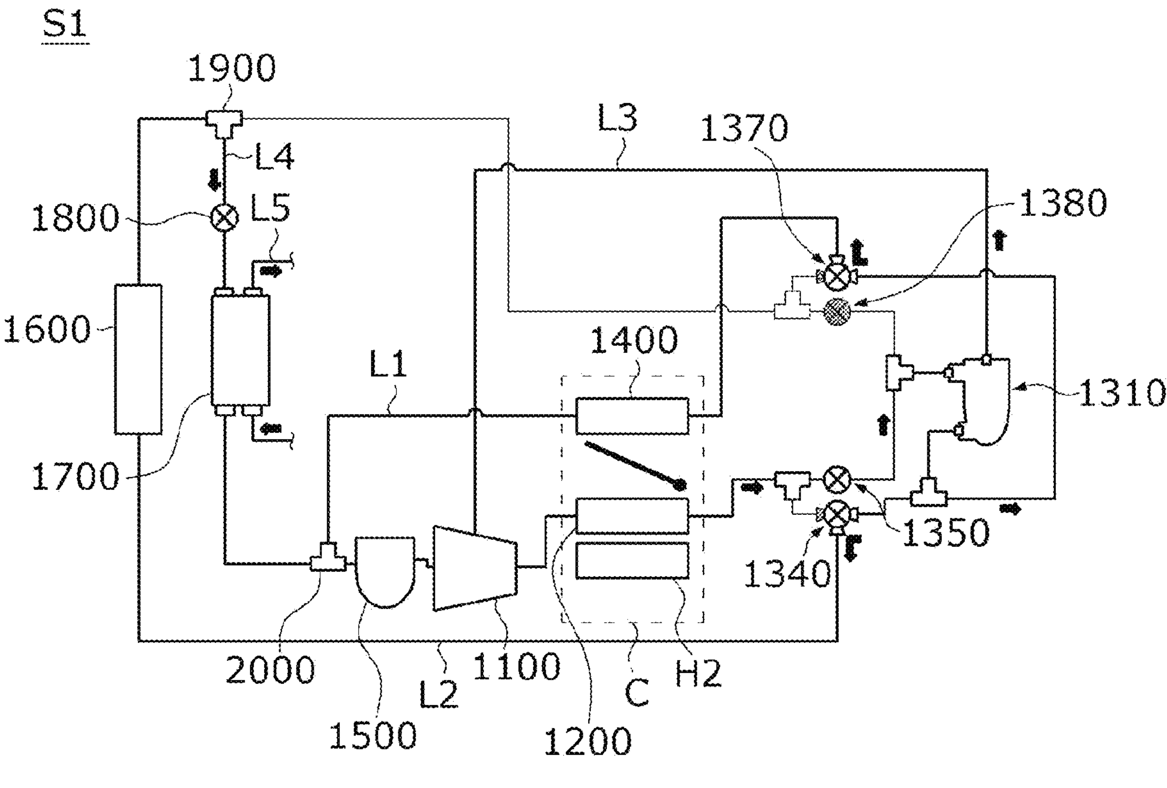
FIG. 30 is a view illustrating a dehumidification mode of the vehicle thermal management device according to the first embodiment.

FIG. 30 is a view illustrating a dehumidification mode of the vehicle thermal management device according to the embodiment. In this case, the arrow illustrated in FIG. 30 may indicate the flow of the heat exchange medium.

In the dehumidification mode of the vehicle thermal management device S1, the vehicle thermal management device S1 may dehumidify the interior of the vehicle.

With reference to FIGS. 20, 21, 22, and 30, in the dehumidification mode, the first heat exchange medium having passed through the internal heat exchanger 1200 is introduced into the gas-liquid separator 1310 through the second expansion means 1350. Further, the gaseous first heat exchange medium separated by the gas-liquid separator 1310 may move to the compressor 1100 through the third line L3, a part of the liquid first heat exchange medium separated by the gas-liquid separator 1310 may move to the external heat exchanger 1600, the fifth expansion means 1800, the chiller 1700, the accumulator 1500, and the compressor 1100 through the first expansion means 1340, and another part of the liquid first heat exchange medium separated by the gas-liquid separator 1310 may move to the evaporator 1400 through the third expansion means 1370.

Specifically, the first heat exchange medium having passed through the compressor 1100 and the internal heat exchanger 1200 may be moved to the gas-liquid separator 1310 by the first expansion means 1340, the second expansion means 1350, and the fourth expansion means 1380. In this case, the first inlet 1341 of the first expansion means 1340 and the fourth expansion means 1380 are in a closed state. For example, the ball 200 of the ball valve 1 according to the first embodiment, which is provided as the first expansion means 1340, may be positioned at the fifth position.

Further, the first heat exchange medium is separated into the gaseous and liquid first heat exchange media in the gas-liquid separator 1310.

Further, a part of the liquid first heat exchange medium is moved to the external heat exchanger 1600 and another part of the liquid first heat exchange medium is moved to the evaporator 1400 by the first expansion means 1340 and the third expansion means 1370. In this case, the third inlet 1371 of the third expansion means 1370 is in a closed state. For example, the ball 200 of the ball valve 1 according to the first embodiment, which is provided as the first expansion means 1340, is positioned at the fifth position, and the ball 200 of the ball valve 1 according to the first embodiment, which is provided as the third expansion means 1370, is also positioned at the fifth position, such that the first expansion means 1340 and the third expansion means 1370 may operate in a vapor injection mode in which the first expansion means 1340 and the third expansion means 1370 expand and move the first heat exchange medium.

Therefore, a part of the first heat exchange medium branching off from the first branching part 1330 and the first heat exchange medium having passed through the external heat exchanger 1600 are expanded by the fifth expansion means 1800 and then sequentially moved to the chiller 1700, the accumulator 1500, and the compressor 1100. When the first heat exchange medium passes through the chiller 1700, the first heat exchange medium exchanges heat with the second heat exchange medium, which moves along the fifth line L5, in the chiller 1700, such that waste heat from the battery B may be used.

In addition, another part of the first heat exchange medium branching off from the first branching part 1330 is expanded by the third expansion means 1370 and then sequentially moved to the evaporator 1400, the accumulator 1500, and the compressor 1100.

Further, the gaseous first heat exchange medium moves to the compressor 1100 through the third line L3 and then merges with the first heat exchange medium having moved into the compressor 1100 through the accumulator 1500.

Therefore, in the dehumidification mode of the vehicle thermal management device S1, the single gas-liquid separator 1310 of the vehicle thermal management device S1 may improve the dehumidification efficiency in comparison with a heat pump system in the related art in which the vapor injection system is used.

Meanwhile, in the dehumidification mode of the vehicle thermal management device S1, the second heater H2 may operate.

Second Embodiment

Figure 31:
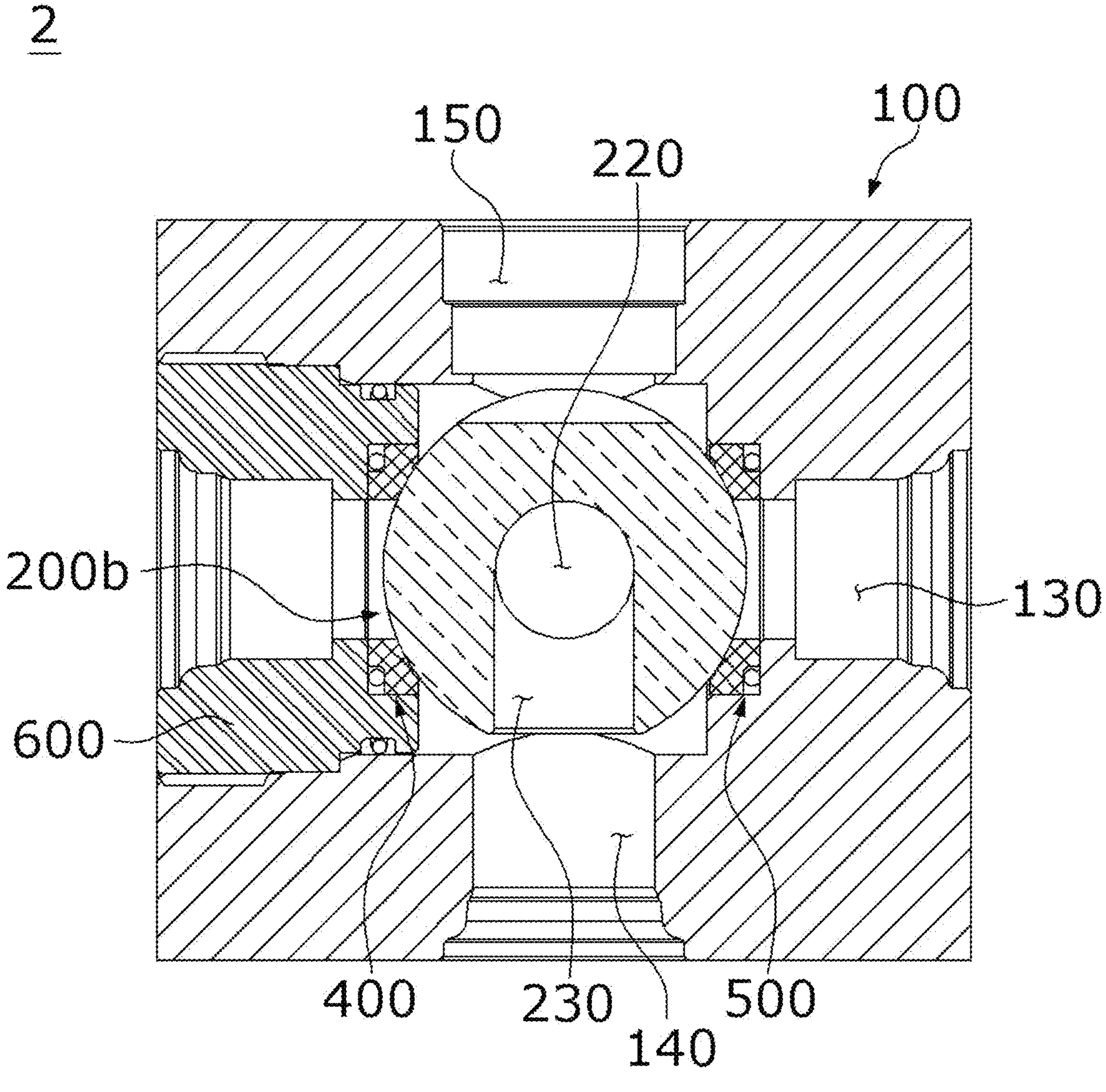
FIG. 31 is a cross-sectional view illustrating a ball valve of a second embodiment taken along line A-A in FIG. 1.
Figure 32:
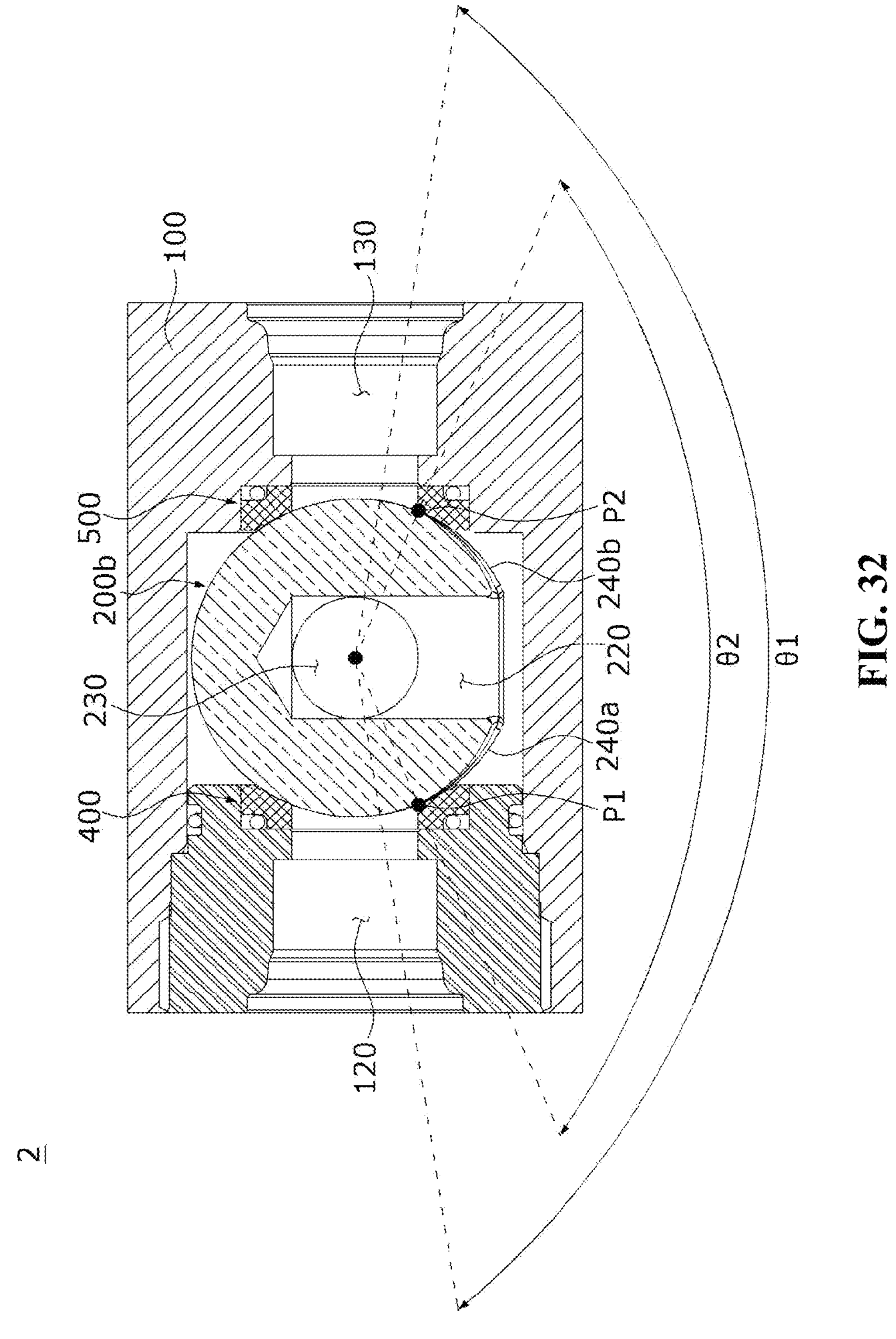
FIG. 32 is a cross-sectional view illustrating the ball valve of the second embodiment taken along line B-B in FIG. 1.
Figure 33:
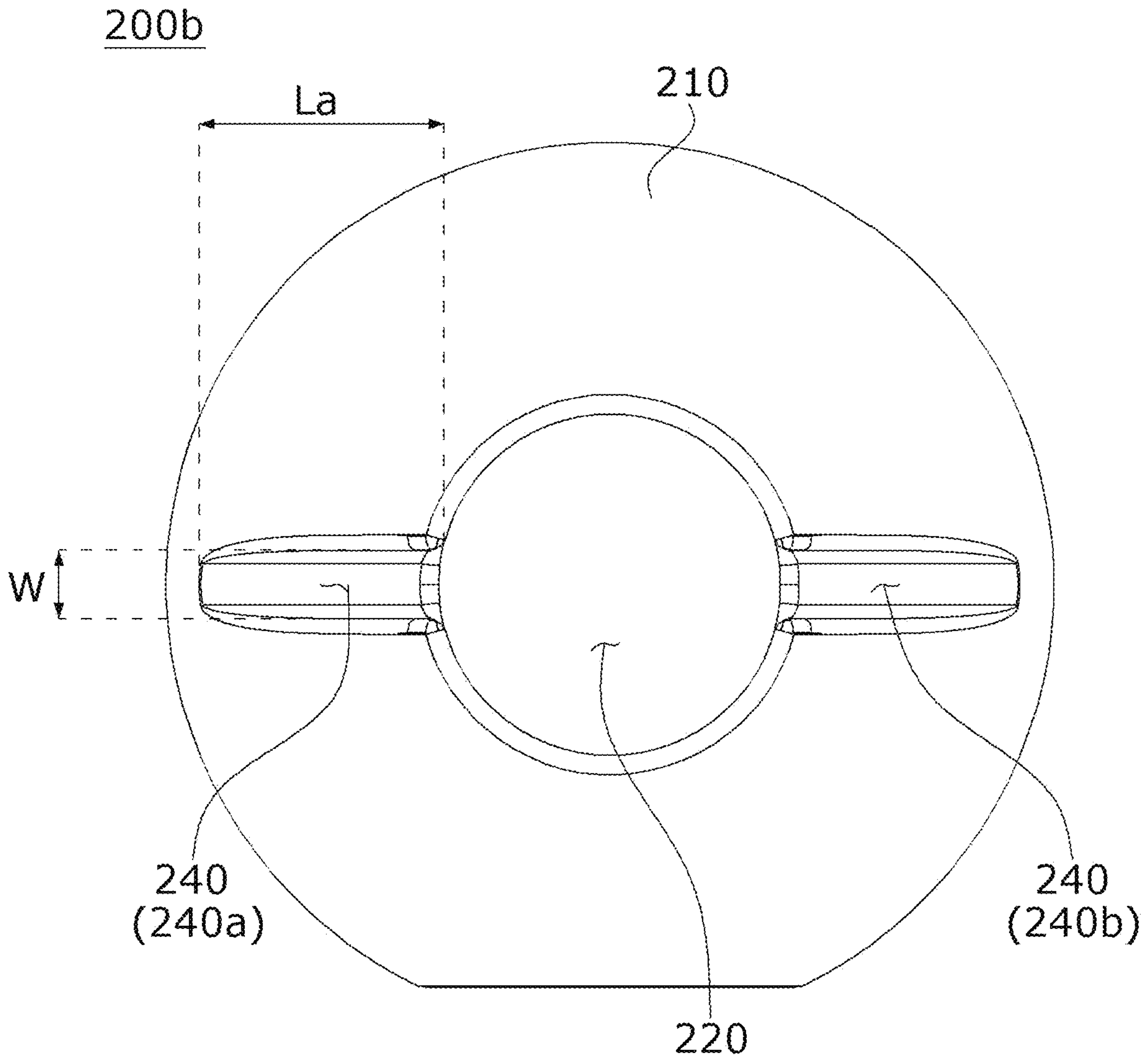
FIG. 33 is a front view illustrating a ball of the ball valve according to the second embodiment.
Figure 34:
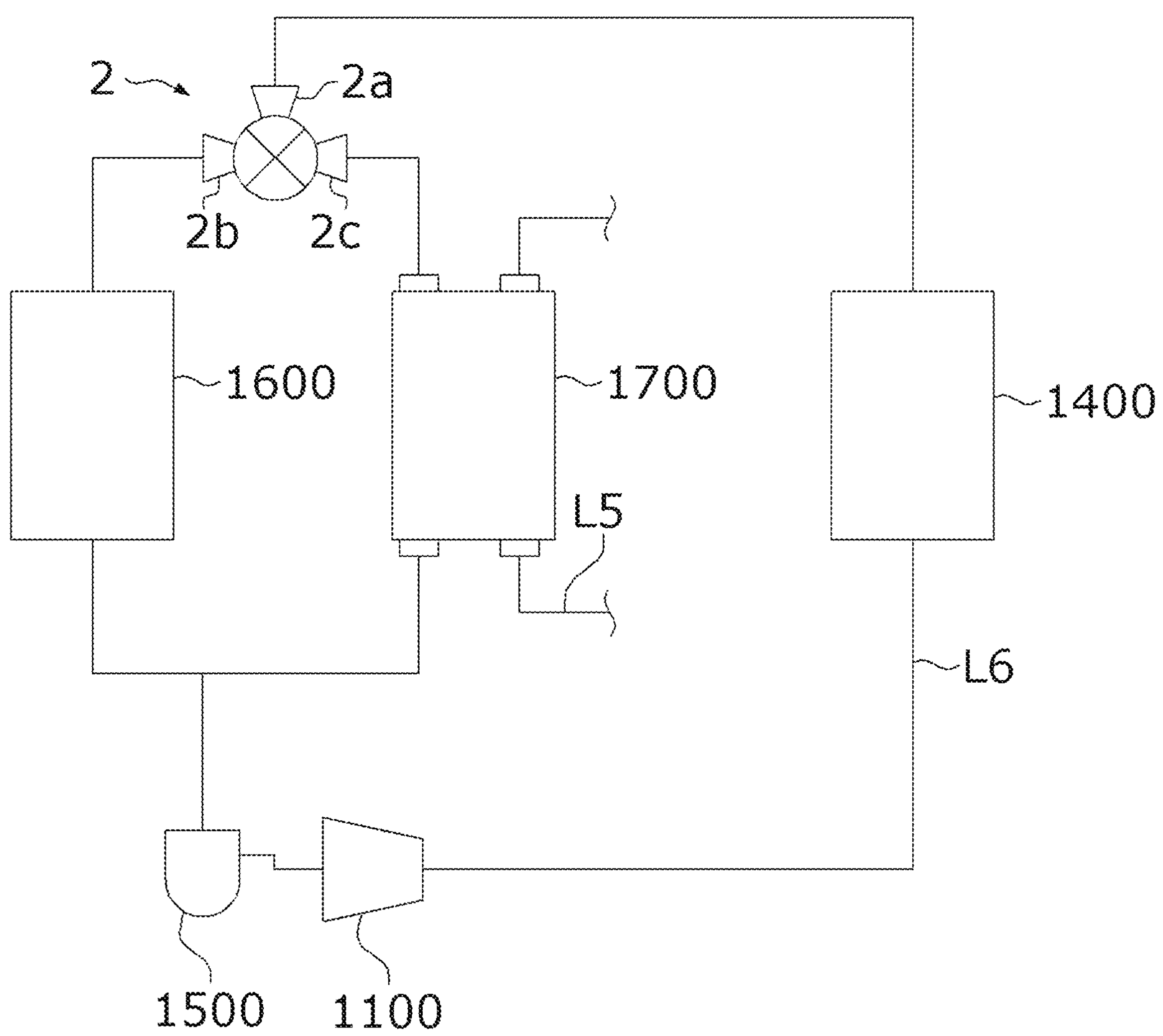
FIG. 34 is a view illustrating a vehicle thermal management device according to the second embodiment to which the ball valve according to the second embodiment is applied.

FIG. 31 is a cross-sectional view illustrating a ball valve of a second embodiment taken along line A-A in FIG. 1, FIG. 32 is a cross-sectional view illustrating the ball valve of the second embodiment taken along line B-B in FIG. 1, FIG. 33 is a front view illustrating a ball of the ball valve according to the second embodiment, and FIG. 34 is a view illustrating a vehicle thermal management device according to the second embodiment to which the ball valve according to the second embodiment is applied.

The ball valve 1 according to the first embodiment and a ball valve 2 according to the second embodiment are different in terms of a length of the groove formed in the ball having the predetermined radius R, and a forming range of the groove may be varied by this difference in accordance with the relationship between the sealing parts 400 and 500. Therefore, there is also a difference in a vehicle thermal management device S2 to which the ball valve 2 of the second embodiment is applied.

In the description of the ball valve 2 according to the second embodiment and the vehicle thermal management device S2 according to the second embodiment, the constituent elements identical to the constituent elements of the ball valve 1 according to the first embodiment and the vehicle thermal management device S1 according to the first embodiment will be assigned with the same reference numerals, and the specific description thereof will be omitted.

With reference to FIGS. 1 to 3 and 31 to 33, the ball valve 2 according to the second embodiment may include the housing 100, a ball 200*b* rotatably disposed in the housing 100, and the actuator 300 configured to rotate the ball 200*b*.

In addition, the ball valve 2 according to the second embodiment may include the ring-shaped first sealing part 400 disposed in the first housing hole 120 of the housing 100 so as to correspond to a hole of the ball 200*b*, and the ring-shaped second sealing part 500 disposed in the second housing hole 130 so as to correspond to the ball 200*b*.

In addition, the ball valve 2 according to the second embodiment may include the support means 600 configured to prevent the separation of the first sealing part 400. In this case, the support means 600 may be detachably disposed in the housing 100.

Therefore, the constituent elements of the ball valve 1 according to the first embodiment may be used as the constituent elements, except for the ball 200*b* applied to the ball valve 2 according to the second embodiment.

That is, the components, except for the balls, of the ball valve 1 according to the first embodiment and the ball valve 2 according to the second embodiment may be used in common, which may reduce production costs.

The ball 200*b* may include the spherical ball body 210 having the predetermined radius R, the first and second holes 220 and 230 disposed in the ball body 210 and configured to communicate with each other, and the two grooves 240 formed to have the predetermined length in the circumferential direction of the ball body 210 and connected to the first hole 220. In this case, a size of the first hole 220 of the ball 200*b* may be equal to or smaller than a size of the second hole 230.

In this case, the grooves 240 may include the first groove 240*a* disposed to correspond to the first housing hole 120, and the second groove 240*b* disposed to correspond to the second housing hole 130.

Further, the first groove 240*a* and the second groove 240*b* may each be provided as a groove having a predetermined length La, the width W, and the depth D. In this case, the length La of each of the first and second grooves 240*a* and 240*b* formed in the ball valve 2 according to the second embodiment may be longer than the length L of each of the first and second grooves 240*a* and 240*b* formed in the ball valve 1 according to the first embodiment.

A forming range of the first groove 240*a* and the second groove 240*b* of the ball valve 2 according to the second embodiment may be defined on the basis of the relationship between the sealing parts 400 and 500.

With reference to FIG. 32, based on the rotation center C, the first included angle θ1 defined between the two grooves 240 may be larger than the second included angle θ2 defined between one point P1 disposed on the inner diameter of the first sealing part 400 and one point P2 disposed on the inner diameter of the second sealing part 500.

That is, in the ball valve 2 according to the second embodiment, the forming range of the groove 240 may be defined by the first included angle θ1 and the second included angle θ2.

Therefore, when the ball 200*b* is positioned at a predetermined rotational position, the first groove 240*a* may be disposed to communicate with the first housing hole 120, and the second groove 240*b* may be disposed to communicate with the second housing hole 130. Therefore, the ball valve 2 enables the bidirectional expansion of the refrigerant at the predetermined rotational position.

With reference to FIG. 34, the vehicle thermal management device S2 according to the second embodiment may include the compressor 1100, the internal heat exchanger 1200, the ball valve 2 according to the second embodiment, the accumulator 1500, the external heat exchanger 1600, and the chiller 1700. Further, the vehicle thermal management device S2 may include a sixth line L6 configured to connect the compressor 1100, the internal heat exchanger 1200, the ball valve 2 according to the second embodiment, the external heat exchanger 1600, and the chiller 1700. In this case, the external heat exchanger 1600 and the chiller 1700 may be connected in parallel between the valve 2 and the accumulator 1500. In this case, the sixth line L6 may be a pipe disposed to circulate the refrigerant provided as the first heat exchange medium.

In addition, the vehicle thermal management device S2 may include the fifth line L5 connected to the chiller 1700 so that waste heat from the battery B is used, and the battery B disposed in the fifth line L5.

Therefore, the vehicle thermal management device S2 may improve the thermal management performance and quality by using at least one of the heat absorption performed by the external heat exchanger 1600 and the waste heat used by the chiller 1700. In this case, the valve 2 may further improve the thermal management efficiency and quality by expanding the refrigerant moving to at least any one of the external heat exchanger 1600 and the chiller 1700.

In this case, the valve 2 applied to the vehicle thermal management device S2 may be a three-way valve having one inlet port 2*a* and two outlet ports 2*b* and 2*c*.

Specifically, the valve 2 may include an inlet port 2*a*, a first outlet port 2*b*, and a second outlet port 2*c*.

The inlet port 2*a* may be configured to correspond to the third housing hole 140 of the valve 2.

In addition, the first outlet port 2*b* may be configured to correspond to the first housing hole 120 of the valve 2.

In addition, the second outlet port 2*c* may be configured to correspond to the second housing hole 130 of the valve 2.

Figure 35:
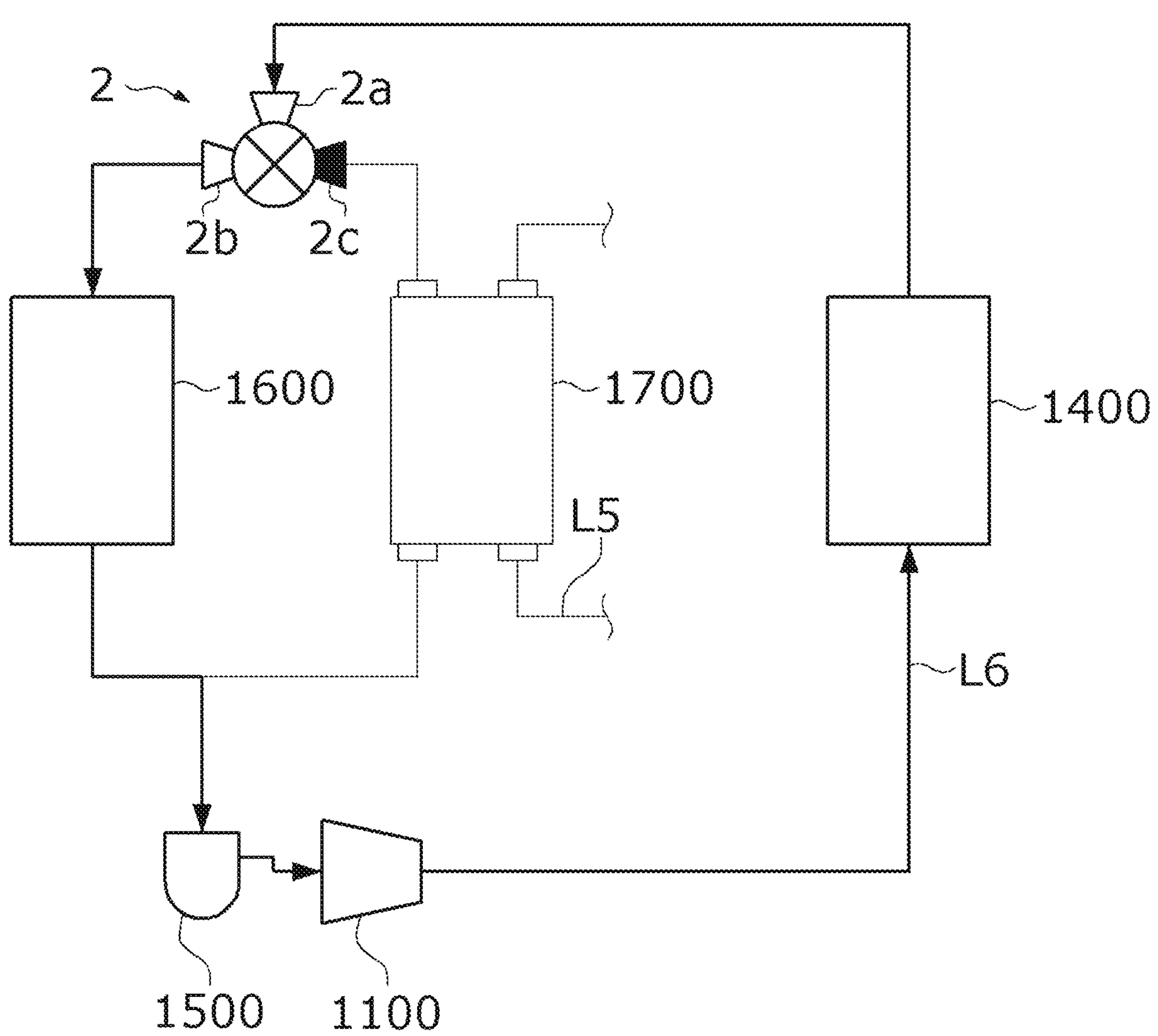
FIG. 35 is a view illustrating an outdoor unit heat absorption mode of the vehicle thermal management device according to the second embodiment.
Figure 36:
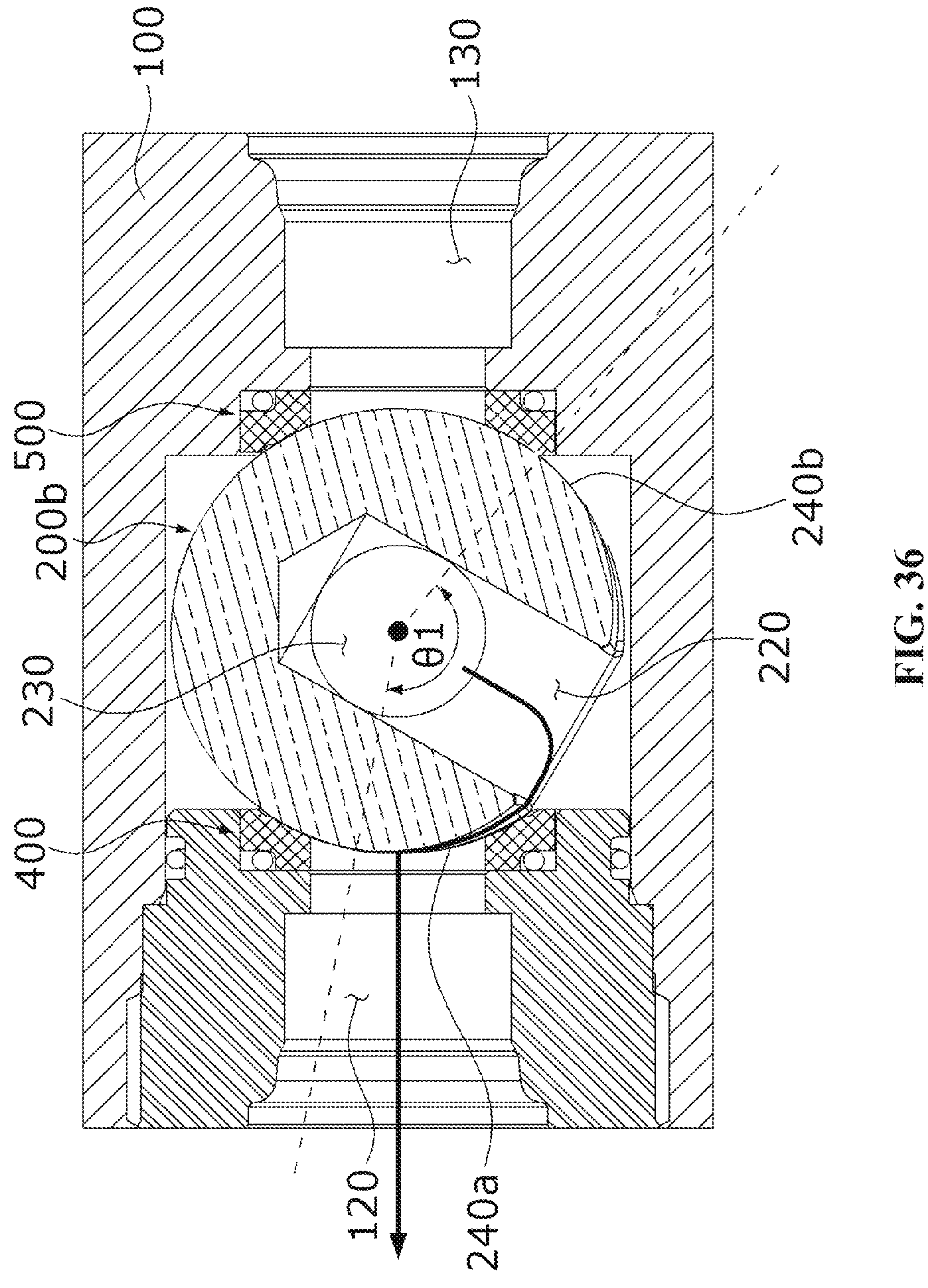
FIG. 36 is a view illustrating a first heat absorption position of the ball disposed in the ball valve according to the second embodiment.

FIG. 35 is a view illustrating an outdoor unit heat absorption mode of the vehicle thermal management device according to the second embodiment, and FIG. 36 is a view illustrating a first heat absorption position of the ball disposed in the ball valve according to the second embodiment. In this case, the arrow illustrated in FIG. 35 may indicate the flow of the heat exchange medium.

With reference to FIGS. 35 and 36, in the outdoor unit heat absorption mode, the first heat exchange medium having passed through the internal heat exchanger 1400 may be moved to the external heat exchanger 1600 by the valve 2.

In this case, the second outlet port 2*c* is brought into a closed state by the rotation of the ball 200*b*. As illustrated in FIG. 36, the ball 200*b* may be positioned at the first heat absorption position. Therefore, the first heat exchange medium having passed through the internal heat exchanger 1200 may be expanded by the valve 2 and then moved to the external heat exchanger 1600.

In this case, the first heat absorption position may be defined as a rotational position of the ball 200*b* at which a part of the first housing hole 120 is disposed in the first included angle θ1. Therefore, a part of an end side of the first groove 240*a* may be disposed to communicate with the first housing hole 120. Specifically, a part of the end side of the first groove 240*a* may be disposed to communicate with the first sealing part 400.

That is, the ball 200*b* may rotate to the first heat absorption position at which the first housing hole 120 and the first groove 240*a* partially face and communicate with each other, and the refrigerant is moved and expanded along the first groove 240*a*.

Therefore, the vehicle thermal management device S2 supplies the first heat exchange medium, which is expanded by the valve 2, to the external heat exchanger 1600. Further, the external heat exchanger 1600 dissipates heat by allowing air (air present outside the interior of the vehicle) to exchange heat with the first heat exchange medium, such that the first heat exchange medium may be condensed and then supplied to the accumulator 1500.

Figure 37:
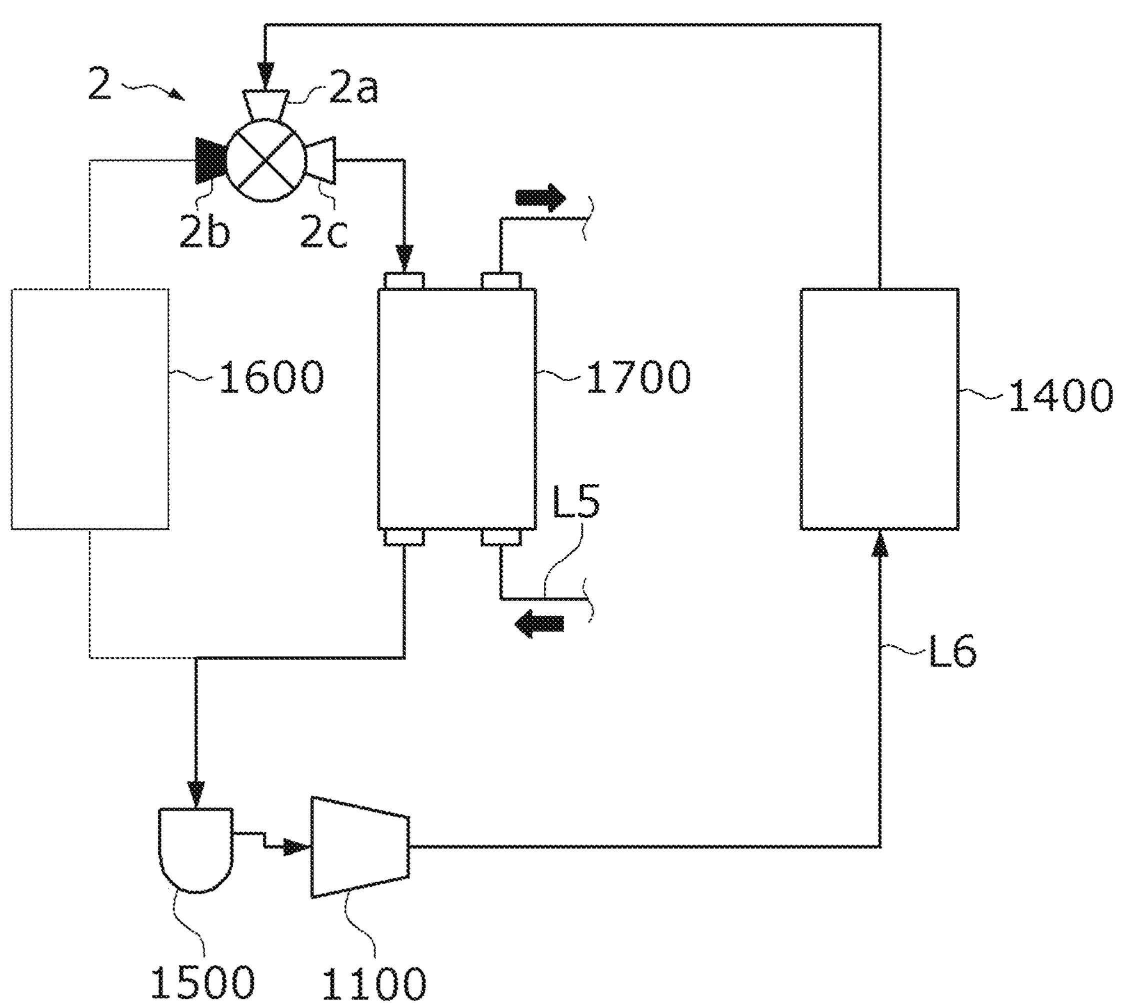
FIG. 37 is a view illustrating a waste heat absorption mode of the vehicle thermal management device according to the second embodiment.
Figure 38:
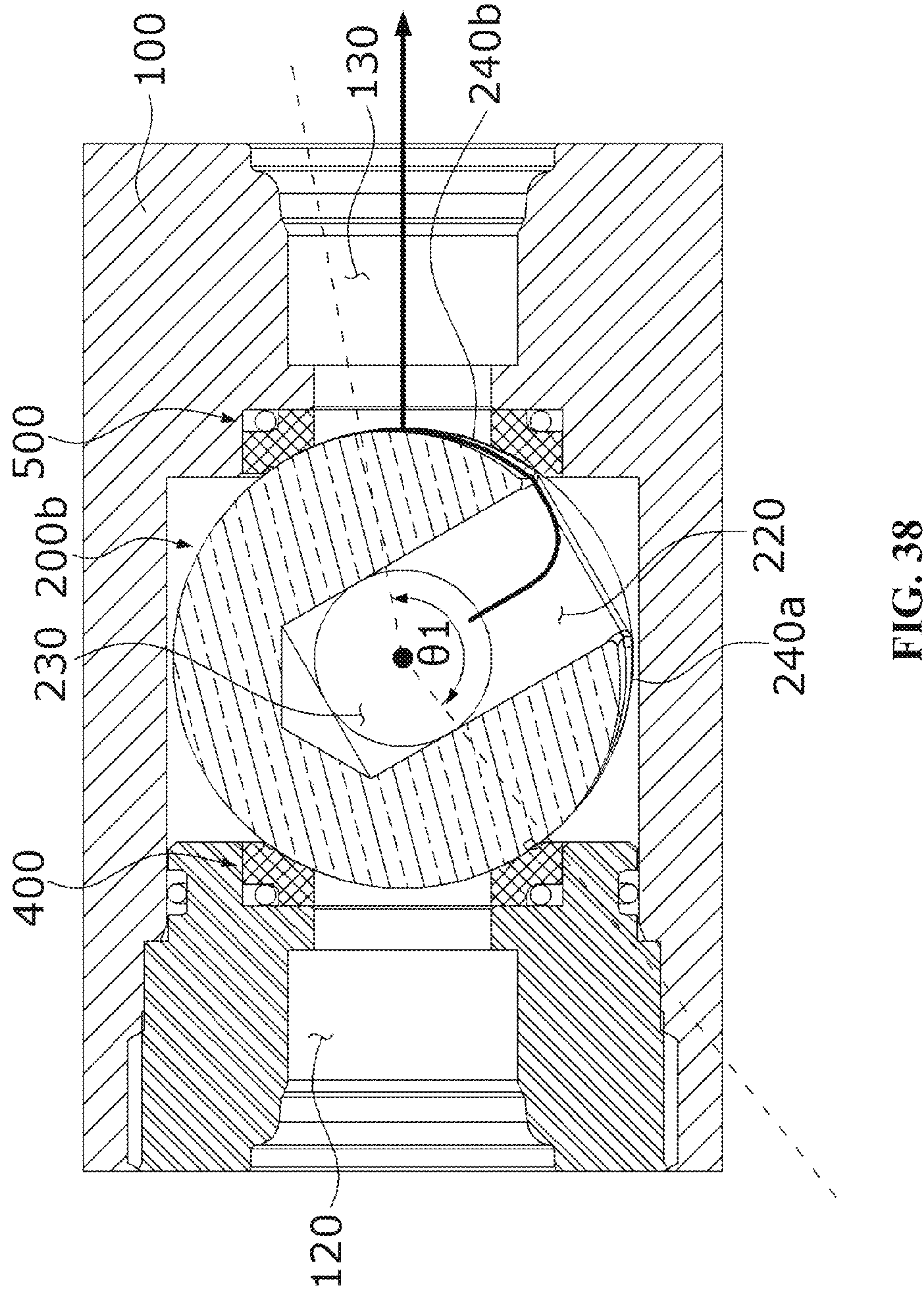
FIG. 38 is a view illustrating a second heat absorption position of the ball disposed in the ball valve according to the second embodiment.

FIG. 37 is a view illustrating a waste heat absorption mode of the vehicle thermal management device according to the second embodiment, and FIG. 38 is a view illustrating a second heat absorption position of the ball disposed in the ball valve according to the second embodiment. In this case, the arrow illustrated in FIG. 37 may indicate the flow of the heat exchange medium.

With reference to FIGS. 37 and 38, in the waste heat absorption mode, the first heat exchange medium having passed through the internal heat exchanger 1400 may be moved to the chiller 1700 by the valve 2.

In this case, the second outlet port 2*c* is brought into a closed state by the rotation of the ball 200*b*. As illustrated in FIG. 38, the ball 200*b* may be positioned at the second heat absorption position. Therefore, the first heat exchange medium having passed through the internal heat exchanger 1200 may be expanded by the valve 2 and then moved to the chiller 1700.

In this case, the second heat absorption position may be defined as a rotational position of the ball 200*b* at which a part of the second housing hole 130 is disposed in the first included angle θ1. Therefore, a part of an end side of the second groove 240*b* may be disposed to communicate with the second housing hole 130. Specifically, a part of the end side of the second groove 240*b* may be disposed to communicate with the second sealing part 500.

That is, the ball 200*b* may rotate to the second heat absorption position at which the second housing hole 130 and the second groove 240*b* partially face and communicate with each other, and the refrigerant is moved and expanded along the second groove 240*b*.

Therefore, the vehicle thermal management device S2 supplies the first heat exchange medium, which is expanded by the valve 2, to the chiller 1700. Further, the chiller 1700 allows the expanded first heat exchange medium and the second heat exchange medium moving along the fifth line L5 to exchange heat with each other, such that the condensed first heat exchange medium may be supplied to the accumulator 1500.

Figure 39:
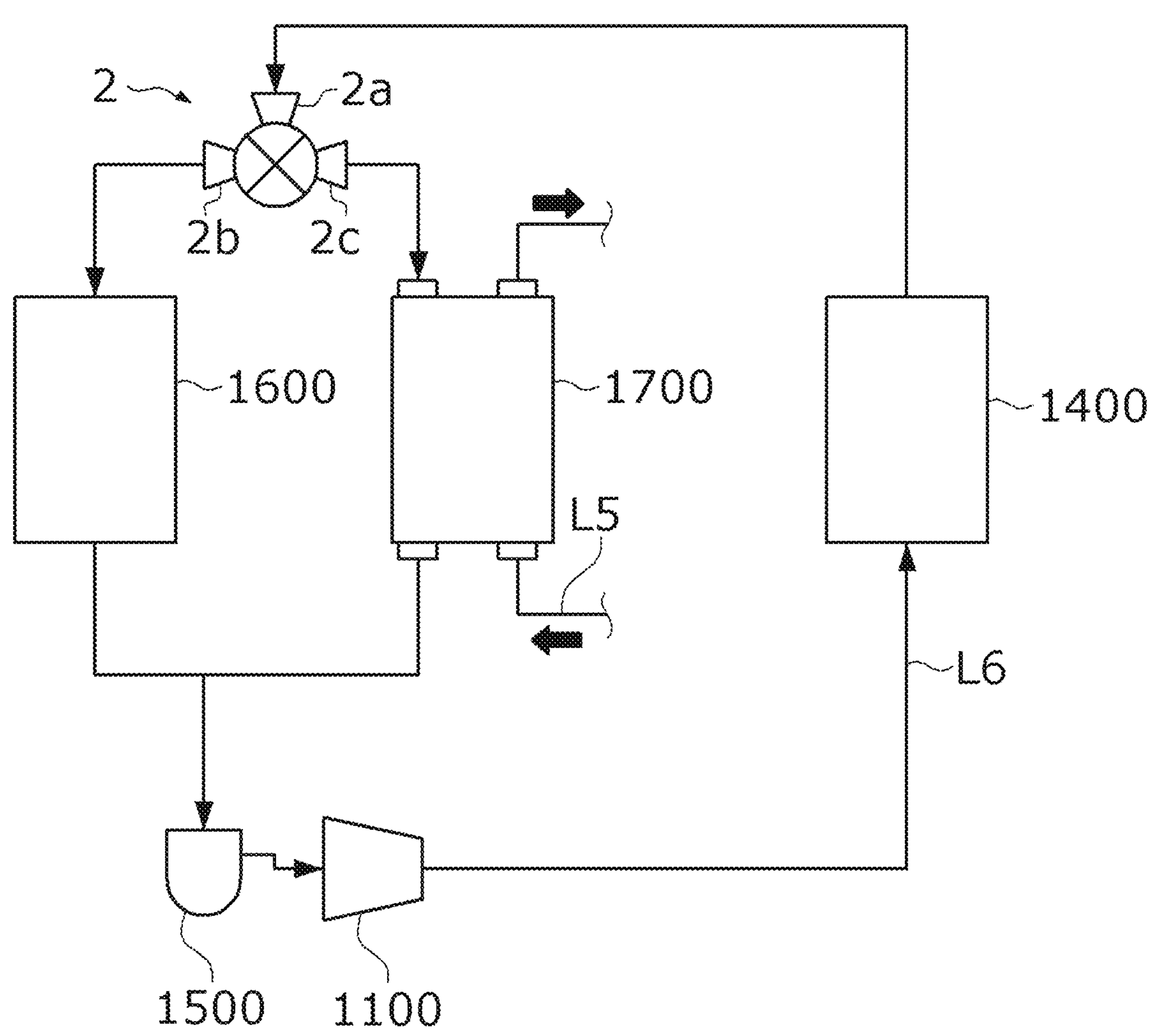
FIG. 39 is a view illustrating a parallel heat absorption mode of the vehicle thermal management device according to the second embodiment.
Figure 40:
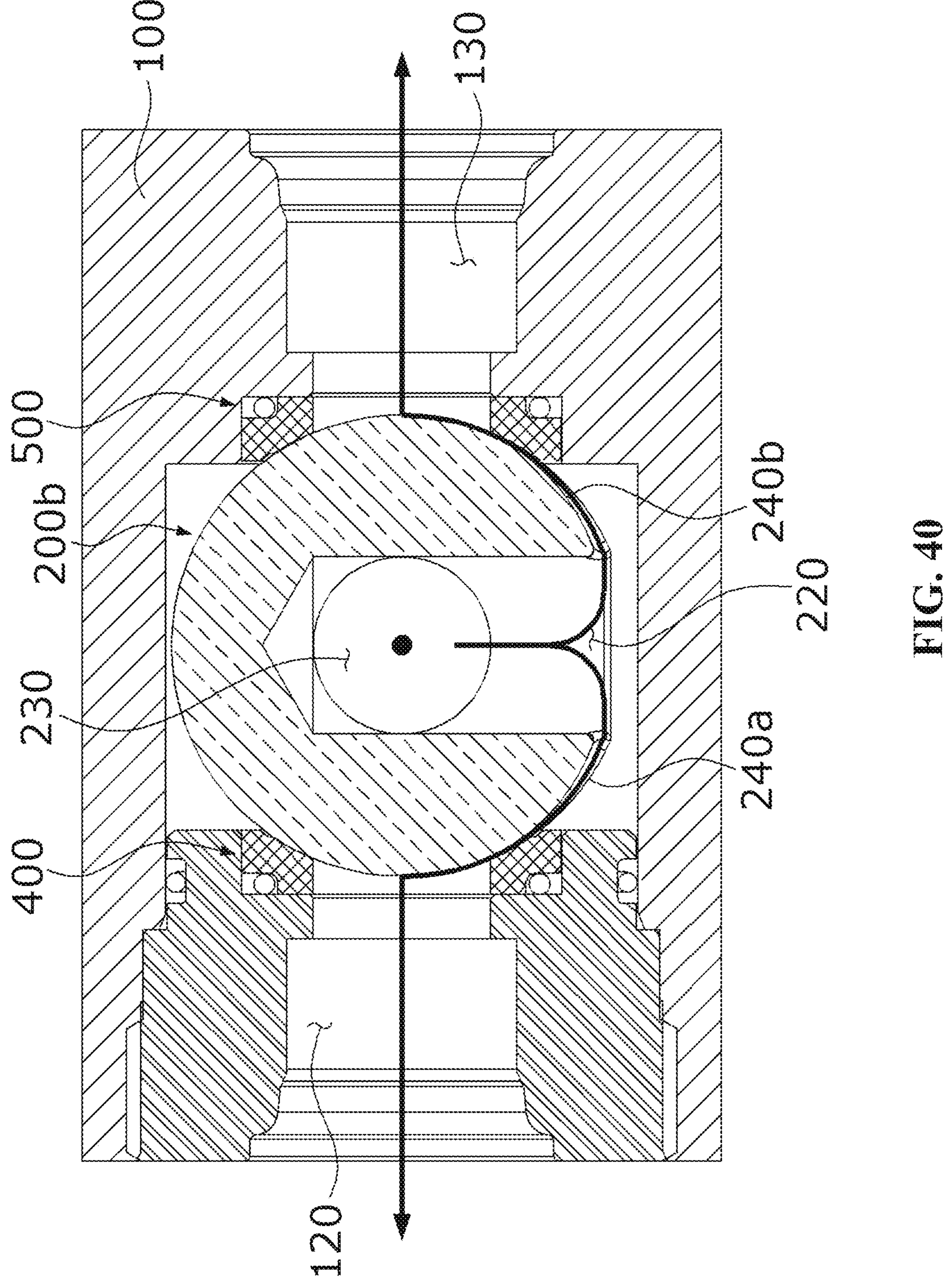
FIG. 40 is a view illustrating a third heat absorption position of the ball disposed in the ball valve according to the second embodiment.

FIG. 39 is a view illustrating a parallel heat absorption mode of the vehicle thermal management device according to the second embodiment, and FIG. 40 is a view illustrating a third heat absorption position of the ball disposed in the ball valve according to the second embodiment. In this case, the arrow illustrated in FIG. 39 may indicate the flow of the heat exchange medium.

With reference to FIGS. 39 and 40, in the parallel heat absorption mode, the first heat exchange medium having passed through the internal heat exchanger 1400 may be moved to both the external heat exchanger 1600 and the chiller 1700 by the valve 2.

In this case, the first outlet port 2*b* and the second outlet port 2*c* are brought into an open state by the rotation of the ball 200*b*. As illustrated in FIG. 40, the ball 200*b* may be positioned at the third heat absorption position. Therefore, a part of the first heat exchange medium may be supplied to the external heat exchanger 1600 by the valve 2, and the remaining part of the first heat exchange medium may be supplied to the chiller 1700 by the valve 2.

In this case, the third heat absorption position may be defined as a rotational position of the ball 200*b* at which a part of the first housing hole 120 and a part of the second housing hole 130 are disposed in the first included angle θ1. Therefore, a part of the end side of the first groove 240*a* may be disposed to communicate with the first housing hole 120, and a part of the end side of the second groove 240*b* may be disposed to communicate with the second housing hole 130. Specifically, a part of the end side of the first groove 240*a* may be disposed to communicate with the first sealing part 400, and a part of the end side of the second groove 240*b* may be disposed to communicate with the second sealing part 500.

That is, the ball 200*b* may rotate to the third heat absorption position. Further, because the refrigerant is moved and expanded along the first groove 240*a* and the second groove 240*b*, the valve 2 implements the bidirectional expansion of the refrigerant.

Therefore, the vehicle thermal management device S2 supplies the first heat exchange medium, which is expanded by the valve 2, to the external heat exchanger 1600 and supplies the expanded first heat exchange medium to the chiller 1700. Further, the external heat exchanger 1600 dissipates heat by allowing air (air present outside the interior of the vehicle) to exchange heat with the first heat exchange medium, such that the first heat exchange medium may be condensed and then supplied to the accumulator 1500. Further, the chiller 1700 allows the expanded first heat exchange medium and the second heat exchange medium moving along the fifth line L5 to exchange heat with each other, such that the condensed first heat exchange medium may be supplied to the accumulator 1500.

That is, the vehicle thermal management device S2 may implement the bidirectional expansion of the refrigerant by means of the valve 2, thereby implementing simultaneous heat absorption in both the external heat exchanger 1600 and the chiller 1700. Therefore, the thermal efficiency of the vehicle thermal management device S2 may be improved.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to modifications and changes fall within the scope of the present invention defined by the appended claims.

DESCRIPTION OF REFERENCE NUMERALS

1, 2: ball valve, 100: housing, 200, 200*a*, 200*b*: ball, 300: actuator, 400: first sealing part, 500: second sealing part, 600: support means, 1100: compressor, 1200: internal heat exchanger, 1300: vapor injection module, 1310: gas-liquid separator, 1320: first merging part, 1330: first branching part, 1340: first expansion means, 1350: second expansion means, 1360: second branching part, 1370: third expansion means, 1380: fourth expansion means, 1390: third branching part, 1400: evaporator, 1500: accumulator, 1600: external heat exchanger, 1700: chiller, 1800: fifth expansion means, 1900: fourth branching part, 2000: second merging part, B: battery, S1, S2: vehicle thermal management device

The invention claimed is:

1. A ball valve, comprising:

a housing including a first housing hole, a second housing hole, and a third housing hole disposed to communicate with one another;

a ball rotatably disposed in the housing;

an actuator configured to rotate the ball;

a ring-shaped first sealing part disposed in the first housing hole while facing the ball; and a ring-shaped second sealing part disposed in the second housing hole while facing the ball, wherein the ball comprises:

a ball body having a spherical shape;

first and second holes disposed in the ball body and configured to communicate with each other; and two grooves formed to have a predetermined length in a circumferential direction of the ball body so as to be connected to the first hole, wherein the second hole is disposed to correspond to the third housing hole, and wherein based on a rotation center, a first included angle defined between the two grooves is larger than a second included angle defined between one point disposed on an inner diameter of the ring-shaped first sealing part and one point disposed on an inner diameter of the ring-shaped second sealing part so as to be adjacent, in the circumferential direction, to the one point disposed on the inner diameter of the ring-shaped first sealing part.

2. The ball valve of claim 1, wherein the two grooves of the ball are positioned at positions that do not communicate with the first housing hole and the second housing hole.

3. The ball valve of claim 1, wherein an end of one of the two grooves is disposed to communicate with the first housing hole, and an end of a remaining groove of the two grooves is disposed to communicate with the second housing hole.

4. The ball valve of claim 1, wherein the ball comprises a groove coupled to the actuator.

5. The ball valve of claim 1, wherein the inner diameter of the ring-shaped first sealing part and the inner diameter of the ring-shaped second sealing part are equal to a diameter of the first hole.

6. The ball valve of claim 1, comprising:

a support means configured to prevent separation of the ring-shaped first sealing part, wherein the support means is detachably coupled in the first housing hole.

7. The ball valve of claim 1, wherein a connection portion of the actuator is disposed to overlap the second hole in an axial direction.

8. The ball valve of claim 1, wherein a diameter of the first hole is equal to a diameter of the second hole.

9. The ball valve of claim 1, wherein a diameter of the first hole is smaller than a diameter of the second hole.

10. The ball valve of claim 1, wherein a depth of each of the two grooves decreases toward an end side thereof.

11. A vehicle thermal management device, comprising:

a compressor configured to compress and circulate a refrigerant;

a first heat exchanger in which the compressed refrigerant is introduced and exchanges heat with another heat exchange medium;

a second heat exchanger configured to exchange heat with air present outside an occupant compartment;

a third heat exchanger mounted in an air conditioning device and configured to exchange heat with air discharged into the occupant compartment; and a vapor injection module configured to introduce a gaseous refrigerant into the compressor, wherein the vapor injection module comprises a first expansion means group, a second expansion means group, and a gas-liquid separator, wherein a first expansion means of the first expansion means group and a third expansion means of the second expansion means group each comprise:

a housing including a first housing hole, a second housing hole, and a third housing hole disposed to communicate with one another;

a ball rotatably disposed in the housing;

an actuator configured to rotate the ball;

a ring-shaped first sealing part disposed in the first housing hole while facing the ball; and a ring-shaped second sealing part disposed in the second housing hole while facing the ball, wherein the ball comprises:

a ball body having a spherical shape;

first and second holes disposed in the ball body and configured to communicate with each other; and first and second grooves formed to have a predetermined length in a circumferential direction of the ball body so as to be connected to the first hole, and wherein based on a rotation center, a first included angle defined between the first and second grooves is smaller than a second included angle defined between one point disposed on an inner diameter of the ring-shaped first sealing part and one point disposed on an inner diameter of the ring-shaped second sealing part so as to be adjacent, in the circumferential direction, to the one point disposed on the inner diameter of the ring-shaped first sealing part.

12. The vehicle thermal management device of claim 11, wherein the refrigerant having passed through the second heat exchanger is introduced into the first expansion means group in a cooling mode, and the refrigerant having passed through the first heat exchanger is introduced into the second expansion means group in a heating mode.

13. The vehicle thermal management device of claim 11, wherein the first expansion means group comprises:

the first expansion means;

a second expansion means; and a third flow path configured to connect an outlet of the first heat exchanger to the first expansion means and the second expansion means, and wherein the second expansion means group comprises:

the third expansion means;

a fourth expansion means; and a fourth flow path configured to connect an outlet of the second heat exchanger to the third expansion means and the fourth expansion means through a third branching part.

14. The vehicle thermal management device of claim 13, wherein the first expansion means and the third expansion means are connected in parallel to a liquid outlet of the gas-liquid separator, the second expansion means and the fourth expansion means are connected in parallel to an inlet of the gas-liquid separator, and a gas outlet of the gas-liquid separator is connected to the compressor.

15. The vehicle thermal management device of claim 14, comprising:

a first line configured to connect the compressor, the first heat exchanger, the vapor injection module, the third heat exchanger, and an accumulator;

a second line configured to connect the vapor injection module and the second heat exchanger;

a third line configured to connect the vapor injection module and the compressor;

a fourth line having one side connected to the first line between the third heat exchanger and the accumulator, and another side connected to the second line between the second heat exchanger and the vapor injection module; and a chiller and a fifth expansion means disposed on the fourth line, wherein the refrigerant moving along the fourth line and a coolant moving along a fifth line exchange heat with each other in the chiller.

16. A vehicle thermal management device including:

a compressor configured to compress and circulate a refrigerant;

a first heat exchanger in which the compressed refrigerant is introduced and exchanges heat with another heat exchange medium;

a second heat exchanger configured to exchange heat with air present outside an occupant compartment;

a chiller; and a ball valve configured to move the refrigerant, which passes through the first heat exchanger, to at least any one of the second heat exchanger and the chiller, wherein the ball valve comprises:

a housing including a first housing hole, a second housing hole, and a third housing hole disposed to communicate with one another;

a ball rotatably disposed in the housing;

an actuator configured to rotate the ball;

a ring-shaped first sealing part disposed in the first housing hole while facing the ball; and a ring-shaped second sealing part disposed in the second housing hole while facing the ball, wherein the ball comprises:

a ball body having a spherical shape;

first and second holes disposed in the ball body and configured to communicate with each other; and first and second grooves formed to have a predetermined length in a circumferential direction of the ball body so as to be connected to the first hole, and wherein based on a rotation center, a first included angle defined between the first and second grooves is larger than a second included angle defined between one point disposed on an inner diameter of the ring-shaped first sealing part and one point disposed on an inner diameter of the ring-shaped second sealing part so as to be adjacent, in the circumferential direction, to the one point disposed on the inner diameter of the ring-shaped first sealing part.

17. The vehicle thermal management device of claim 16, in which in an outdoor unit heat absorption mode, the ball rotates to a position at which the first housing hole and the first groove partially face and communicate with each other, and the refrigerant having passed through the first heat exchanger bypasses the chiller, is expanded in the ball valve, and then introduced into the second heat exchanger.

18. The vehicle thermal management device of claim 16, in which in a waste heat absorption mode, the ball rotates to a position at which the second housing hole and the second groove partially face and communicate with each other, the refrigerant having passed through the first heat exchanger bypasses the second heat exchanger, is expanded in the ball valve, and then introduced into the chiller, and the refrigerant and a coolant moving along a fifth line exchange heat with each other in the chiller.

19. The vehicle thermal management device of claim 16, in which in a parallel heat absorption mode, the ball rotates to a position at which the first housing hole and the first groove partially communicate with each other and the second housing hole and the second groove partially communicate with each other, the refrigerant having passed through the first heat exchanger implements bidirectional expansion in the ball valve and then is introduced into the second heat exchanger and the chiller, and the refrigerant and a coolant moving along a fifth line exchange heat with each other in the chiller.

* * * * *